US012806809B2

(12) United States Patent
Byeon et al.

(10) Patent No.: US 12,806,809 B2
(45) Date of Patent: Nov. 24, 2026

(54) TRANSFER ROBOT FOR TRANSFERRING GAS CONTAINER, GAS SUPPLY CABINET, AND GAS SUPPLY SYSTEM INCLUDING THE SAME

(71) Applicant: Samsung Electronics Co., Ltd., Suwon-si (KR)

(72) Inventors: Kyeongsup Byeon, Suwon-si (KR); Inwook Koo, Seoul (KR); Dongwon Kim, Suwon-si (KR); Minyoung Kim, Hwaseong-si (KR); Yi Jin, Seoul (KR); Jongkyu Kim, Suwon-si (KR); Jinho So, Seoul (KR); Byungjun An, Suwon-si (KR); Yinghu Xu, Suwon-si (KR); Beomsoo Hwang, Seoul (KR); Hyungho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/013,201

(22) Filed: Jan. 8, 2025

(65) Prior Publication Data

US 2025/0144821 A1 May 8, 2025

Related U.S. Application Data

(63) Continuation of application No. 17/672,081, filed on Feb. 15, 2022, now Pat. No. 12,214,491.

(30) Foreign Application Priority Data

Feb. 25, 2021 (KR) ........................ 10-2021-0025968
Jul. 30, 2021 (KR) ........................ 10-2021-0101013
Sep. 15, 2021 (KR) ........................ 10-2021-0123173

(51) Int. Cl.
*B25J 19/02* (2006.01)
*B25J 9/16* (2006.01)
(Continued)

(52) U.S. Cl.
CPC ............. *B25J 19/023* (2013.01); *B25J 11/00* (2013.01); *B25J 15/0033* (2013.01);
(Continued)

(58) Field of Classification Search
CPC ...... B25J 19/023; B25J 11/00; B25J 15/0033; B25J 9/1697; B25J 15/0052;
(Continued)

(56) References Cited

U.S. PATENT DOCUMENTS 1,933,198 A 10/1933 Watkins
3,352,146 A 11/1967 Lyssy
(Continued)

FOREIGN PATENT DOCUMENTS

CN 102581606 A 7/2012
CN 103140663 A 6/2013
(Continued)

OTHER PUBLICATIONS

KR-20190051408-A English Translation of Specification (Year: 2025).*
(Continued)

*Primary Examiner* — Craig M Schneider
*Assistant Examiner* — Stephanie A Shrieves
(74) *Attorney, Agent, or Firm* — Fish & Richardson P.C.

(57) ABSTRACT

A gas supply system includes a loading/unloading stage including a cradle loader where a cradle loaded with a gas container is loaded, a test buffer chamber is configured to test the gas container, and a loading/unloading robot configured to transfer the gas container between the cradle and the test buffer chamber. A gas supply stage includes a storage queue configured to temporarily store the gas container, a gas supply cabinet where the gas container is mounted, and a transfer robot configured to transfer the gas container
(Continued)

between the test buffer chamber and the storage queue and between the storage queue and the gas supply cabinet.

19 Claims, 32 Drawing Sheets

(51) Int. Cl.

| | |
|---|---|
| ***B25J 11/00*** | (2006.01) |
| ***B25J 15/00*** | (2006.01) |
| ***B65G 1/137*** | (2006.01) |
| ***F17C 13/04*** | (2006.01) |
| ***G06K 7/14*** | (2006.01) |

(52) U.S. Cl.

CPC .......... *F17C 13/045* (2013.01); *G06K 7/1413* (2013.01); *B25J 9/1697* (2013.01); *B25J 15/0052* (2013.01); *B65G 1/1371* (2013.01); *F17C 2201/032* (2013.01); *F17C 2201/056* (2013.01); *F17C 2205/0107* (2013.01); *F17C 2205/013* (2013.01); *F17C 2205/0188* (2013.01); *F17C 2205/0308* (2013.01); *F17C 2205/05* (2013.01); *F17C 2205/054* (2013.01); *F17C 2260/031* (2013.01); *F17C 2260/042* (2013.01); *F17C 2270/0518* (2013.01)

(58) Field of Classification Search

CPC ...... B25J 11/0025; B25J 5/007; B25J 9/0018; B25J 9/1664; F17C 13/045; F17C 2201/032; F17C 2201/056; F17C 2205/0107; F17C 2205/013; F17C 2205/0188; F17C 2205/0308; F17C 2205/05; F17C 2260/031; F17C 2260/042; F17C 2270/0518; F17C 13/084; F17C 13/00; F17C 13/023; F17C 13/025; F17C 13/04; F17C 2205/0126; F17C 2250/0421; F17C 2250/043; F17C 13/002; F17C 13/123; G06K 7/1413; B25G 1/1371

USPC .......................................................... 414/274

See application file for complete search history.

(56) References Cited

U.S. PATENT DOCUMENTS

| | | | | |
|---|---|---|---|---|
| 4,629,157 | A | 12/1986 | Tsuchiya et al. | |
| 4,738,582 | A | 4/1988 | Roberts | |
| 5,658,118 | A | 8/1997 | Luca | |
| 5,794,645 | A * | 8/1998 | Rohrberg | F17C 13/084 137/557 |
| 5,924,442 | A | 7/1999 | Vorosmarti | |
| 5,941,090 | A | 8/1999 | Knuton et al. | |
| 6,086,312 | A | 7/2000 | Ziaylek et al. | |
| 8,439,072 | B2 | 5/2013 | Bavishi, III | |
| 9,463,927 | B1 | 10/2016 | Theobald | |
| 9,765,932 | B2 | 9/2017 | Rado | |
| 11,300,249 | B2 | 4/2022 | Pareek et al. | |
| 11,364,620 | B2 * | 6/2022 | Chen | B25J 19/023 |
| 11,378,232 | B2 | 7/2022 | Kim et al. | |
| 11,927,309 | B2 | 3/2024 | Choi et al. | |
| 12,325,120 | B2 * | 6/2025 | Kim | B25J 15/0038 |
| 12,497,278 | B2 | 12/2025 | Kim et al. | |
| 2005/0039815 | A1 | 2/2005 | Tanaka et al. | |
| 2007/0187634 | A1 | 8/2007 | Sneh | |
| 2007/0240770 | A1 | 10/2007 | Yamashita et al. | |
| 2016/0123496 | A1 | 5/2016 | Buermann | |
| 2020/0277138 | A1 * | 9/2020 | Elazary | G06Q 10/087 |
| 2021/0156520 | A1 | 5/2021 | Kim et al. | |
| 2021/0190269 | A1 | 6/2021 | Choi | |
| 2021/0222834 | A1 | 7/2021 | Choi et al. | |
| 2022/0016788 | A1 | 1/2022 | Kim et al. | |
| 2025/0144820 | A1 | 5/2025 | Byeon et al. | |
| 2025/0144822 | A1 | 5/2025 | Byeon et al. | |
| 2025/0144823 | A1 | 5/2025 | Byeon et al. | |

FOREIGN PATENT DOCUMENTS

| | | | | | |
|---|---|---|---|---|---|
| CN | 208217924 | U | | 12/2018 | |
| CN | 112298894 | A | | 2/2021 | |
| EP | 3868523 | A1 | | 8/2021 | |
| JP | H11-72199 | A | | 3/1999 | |
| JP | 2019-027506 | A | | 2/2019 | |
| JP | 6745957 | B1 | | 8/2020 | |
| KR | 101461460 | B1 | | 11/2014 | |
| KR | 20180065005 | A | * | 6/2018 | B62B 3/0612 |
| KR | 101877982 | B1 | | 7/2018 | |
| KR | 101980045 | B1 | * | 5/2019 | B23P 19/002 |
| KR | 20190051408 | A | * | 5/2019 | H04W 4/00 |
| KR | 102035697 | B1 | | 10/2019 | |
| KR | 102040713 | B1 | | 11/2019 | |
| KR | 102040716 | B1 | | 11/2019 | |
| KR | 102049326 | B1 | | 11/2019 | |
| KR | 102061326 | B1 | | 12/2019 | |
| KR | 102074249 | B1 | | 2/2020 | |
| KR | 102132170 | B1 | * | 7/2020 | B66F 9/07563 |
| KR | 10-2020-0095950 | A | | 8/2020 | |
| KR | 10-2020-0095975 | A | | 8/2020 | |
| KR | 20200095074 | A | | 8/2020 | |
| KR | 10-2020-0107529 | A | | 9/2020 | |
| KR | 10-2020-0107795 | A | | 9/2020 | |
| KR | 10-2021-0014059 | A | | 2/2021 | |
| KR | 10-2022-0010965 | A | | 1/2022 | |
| TW | 201936432 | A | | 9/2019 | |
| WO | WO-9900755 | A1 | * | 1/1999 | G07F 7/0609 |
| WO | WO-2020175739 | A1 | * | 9/2020 | H10P 72/0402 |

OTHER PUBLICATIONS

KR-101980045-B1 English Translation of Specification (Year: 2025).*
WO-9900755-A1 English Translation of Specification (Year: 2025).*
KR-20180065005-A English Translation of Specification (Year: 2025).*
KR-102132170-B1 English Translation of Specification (Year: 2025).*
WO-2020175739-A1 English Translation of Specification (Year: 2021).*
Taiwanese Office Action dated Sep. 2, 2022 (corresponding to TW 111106576).
Korean Notice of Allowance dated Aug. 8, 2023 (corresponding to KR Patent Application No. 10-2021-0123173).
Chinese Office Action dated Sep. 28, 2023 (corresponding to CN 202210156009.6).
Korean Notice of Allowance dated Oct. 8, 2024 (corresponding to KR Patent Application No. 10-2021-0162604).

* cited by examiner

TRANSFER ROBOT FOR TRANSFERRING GAS CONTAINER, GAS SUPPLY CABINET, AND GAS SUPPLY SYSTEM INCLUDING THE SAME

CROSS-REFERENCE TO RELATED APPLICATIONS

This application is a continuation of U.S. patent application Ser. No. 17/672,081, filed Feb. 15, 2022, which is based on and claims priority under 35 U.S.C. § 119 to Korean Patent Application Nos. 10-2021-0025968, filed on Feb. 25, 2021, 10-2021-0101013, filed on Jul. 30, 2021, and 10-2021-0123173, filed on Sep. 15, 2021, in the Korean Intellectual Property Office, the disclosures of which are incorporated by reference herein in their entirety.

BACKGROUND

The inventive concepts relate to a transfer robot for transferring a gas container, a gas supply cabinet, and a gas supply system including the same.

A gas used in a semiconductor manufacturing process is loaded into a gas container at high pressure and brought into a gas supply system. After the gas container is mounted in a gas supply cabinet, the gas in the gas container may be supplied to other facilities performing a semiconductor manufacturing process through a gas supply line. In general, a series of processes for handling the gas container, such as transferring the gas container and mounting the gas container to the gas supply cabinet, is performed manually by an operator. The heavy gas containers can be difficult to handle, and it is desirable to prevent leakage of the gas.

SUMMARY

The inventive concepts provide a gas supply system including a transfer robot for transferring a gas container and a gas supply cabinet.

According to an aspect of the inventive concepts, there is provided a gas supply system including: a loading/unloading stage includes a cradle loader where a cradle is loaded with a gas container, a test buffer chamber configured to test the gas container, and a loading/unloading robot transfers the gas container between the cradle and the test buffer chamber; and a gas supply stage includes a storage queue for temporarily storing the gas container, a gas supply cabinet where the gas container is mounted, and a transfer robot configured to transfer the gas container between the test buffer chamber and the storage queue and between the storage queue and the gas supply cabinet, the gas supply cabinet includes, a cabinet frame having an internal space; a base plate on which the gas container is mounted; a gripper for gripping the gas container mounted on the base plate; a valve operation module configured to operate the valve structure of the gas container between an open position allowing release of gas through a valve nozzle of a valve structure of the gas container and a closed position blocking release of gas through the valve nozzle of the valve structure; and a Compressed Gas Association (CGA) holding module including an end cap holder configured to fasten and separate an end cap for opening and closing an outlet of the valve nozzle to and from the valve nozzle, and a connector holder detachably fastened to the valve nozzle and having a gas nozzle communicating with a flow path of the valve nozzle.

According to another aspect of the inventive concepts, there is provided a gas supply system including: a loading/unloading stage in which a gas container is carried in and out; and a gas supply stage including a gas supply cabinet in which the gas container is mounted and a transfer robot configured to transfer the gas container between the loading/unloading stage and the gas supply cabinet, wherein a valve structure of the gas container is covered by a valve cap detachably coupled to the gas container, wherein the loading/unloading stage includes, an end effector table on which a container gripping end effector including a gripper configured to grip the gas container and a valve cap gripping end effector configured to grip the valve cap are held; and a loading/unloading robot configured to mount one of the container gripping end effector and the valve cap gripping end effector, the loading/unloading robot performing a transfer operation of the gas container and a separation and fastening operation of the valve cap for the gas container, and wherein the loading/unloading robot includes a vision sensor and a nut runner configured to rotate the valve cap in a state engaged with an embossed structure of the valve cap.

According to another aspect of the inventive concepts, there is provided a gas supply system including: a loading/unloading stage in which a gas container is carried in and out; and a gas supply stage including a gas supply cabinet in which the gas container is mounted, and a transfer robot that transfers the gas container between the loading/unloading stage and the gas supply cabinet, wherein the gas supply cabinet includes, a cabinet frame providing an internal space; a base plate on which the gas container is mounted; a gripper configured to grip the gas container mounted on the base plate; a valve operation module configured to operate the valve structure between an open position configured to release gas through a valve nozzle of a valve structure of the gas container and a closed position configured to block release of gas through the valve nozzle; a Compressed Gas Association (CGA) holding module includes an end cap holder for fastening and separating an end cap configured to open and close an outlet of the valve nozzle to and from the valve nozzle, and a connector holder detachably fastened to the valve nozzle and having a gas nozzle in communication with a flow path of the valve nozzle; a fastening module movable within the cabinet frame and including a clamping mechanism configured to grip the CGA holding module and a power transmission shaft detachably inserted into the CGA holding module; and a shelf provided in the cabinet frame and including a plug to which the CGA holding module is detachably fastened.

BRIEF DESCRIPTION OF THE DRAWINGS

Embodiments of the inventive concepts will be more clearly understood from the following detailed description taken in conjunction with the accompanying drawings in which.

DETAILED DESCRIPTION OF THE EMBODIMENTS

Figure 1:
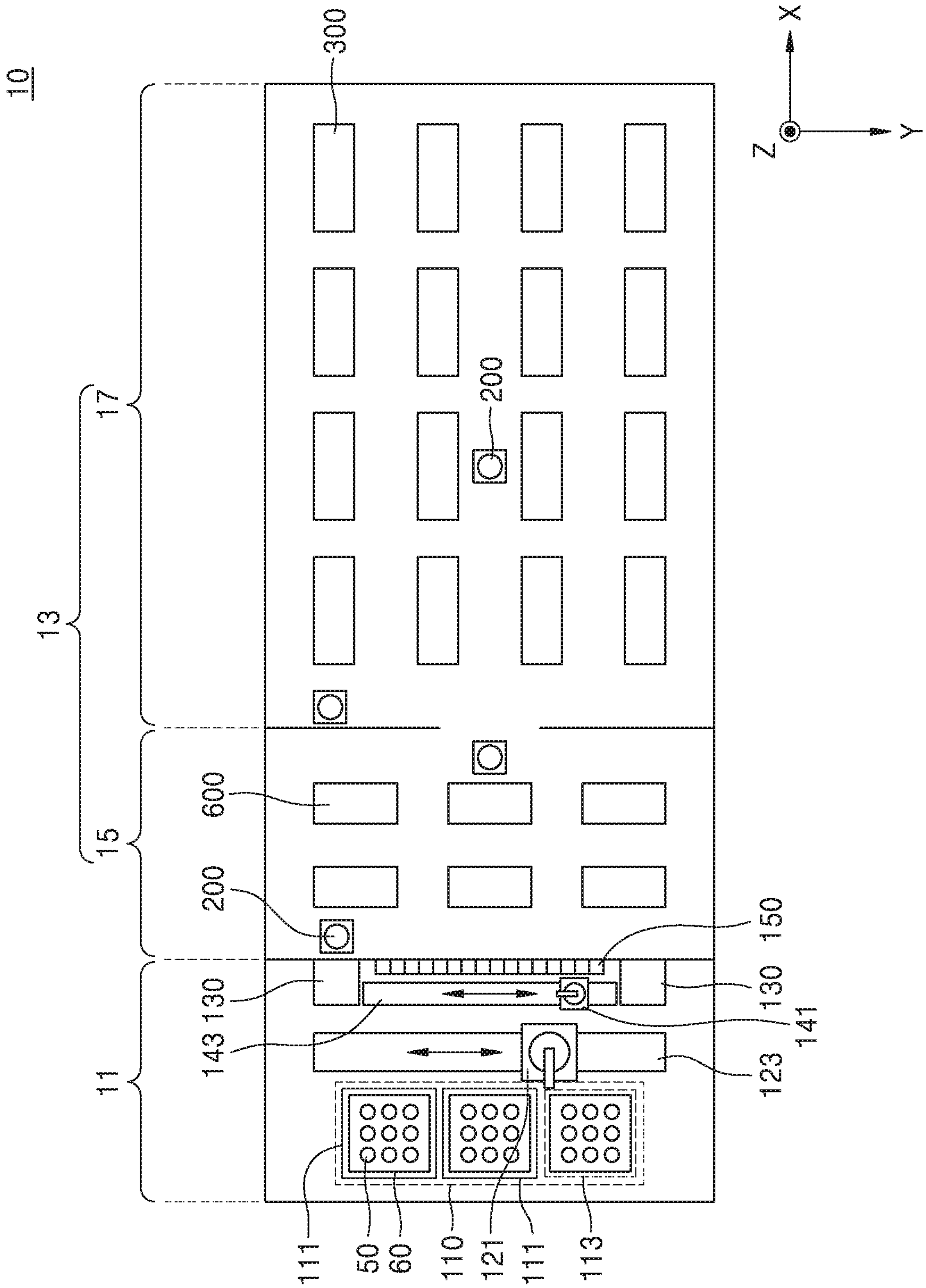
FIG. 1 is a configuration diagram schematically illustrating a gas supply system according to an example embodiment of the inventive concepts.

Hereinafter, embodiments of the technical idea of the inventive concepts will be described in detail with reference to the accompanying drawings. The same reference numerals are used for the same components in the drawings, and repeated descriptions thereof are omitted.

Figure 2:
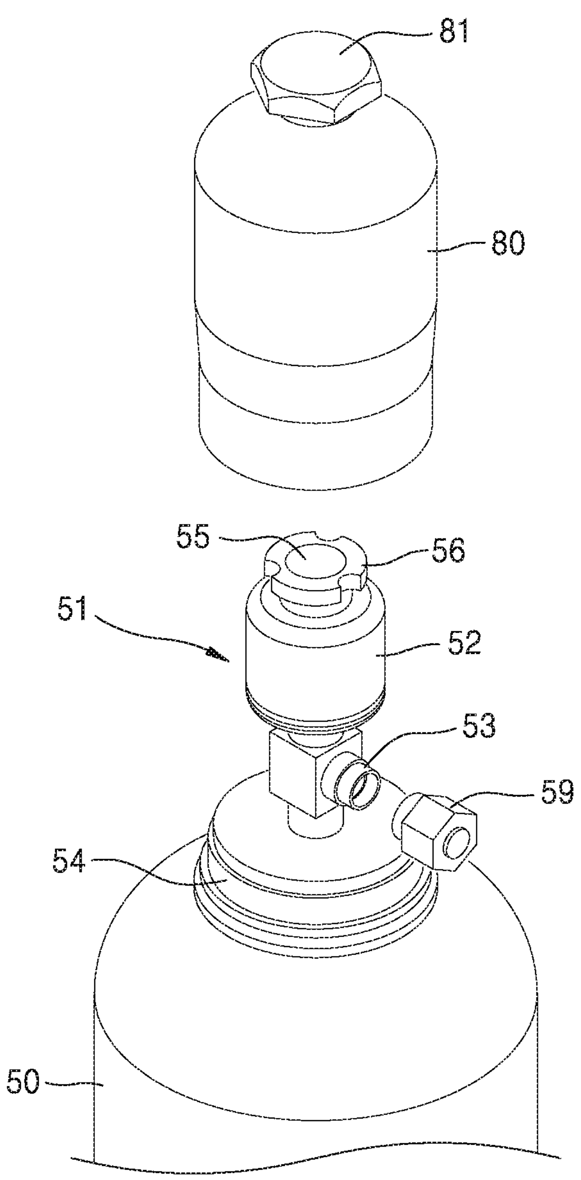
FIG. 2 is a perspective view illustrating a gas container and a valve cap.

FIG. 1 is a configuration diagram schematically illustrating a gas supply system 10 according to an example embodiment of the inventive concept. FIG. 2 is a perspective view illustrating a gas container 50 and a valve cap 80.

Referring to FIGS. 1 and 2, the gas supply system 10 may include a loading/unloading stage 11 and a gas supply stage 13. The gas supply stage 13 may include a buffer stage 15 in which one or more storage queues 600 are arranged, and a cabinet stage 17 in which one or more gas supply cabinets 300 are arranged. The buffer stage 15 may be arranged between the loading/unloading stage 11 and the cabinet stage 17. In the gas supply system 10, the cabinet stage 17 may occupy the largest area, the buffer stage 15 may occupy the second largest area after the cabinet stage 17, and the loading/unloading stage 11 may occupy the smallest area. The gas supply system 10 may be installed in a gas room of a semiconductor manufacturing facility.

The loading/unloading stage 11 is a stage in which the gas container 50 provided from the outside is loaded or the gas container 50 is unloaded to the outside. The loading/unloading stage 11 may provide the gas container 50 filled with gas to the gas supply stage 13, or may receive the gas container 50 from which gas is exhausted from the gas supply stage 13.

One or more gas containers 50 may be mounted in each gas supply cabinet 300. The number of gas containers 50 mounted in one gas supply cabinet 300 may be appropriately adjusted according to the amount and replacement cycle of various gases required for a semiconductor process. The gas supply cabinet 300 may be configured to supply gas to a semiconductor manufacturing facility (e.g., a process chamber such as a deposition chamber, an etch chamber, etc.) configured to perform a semiconductor process. The gas supply cabinet 300 may be connected to a semiconductor manufacturing facility through a gas connection pipe. The gas discharged from the gas container 50 mounted in the gas supply cabinet 300 may be supplied to the semiconductor manufacturing facility through the gas connection pipe.

The buffer stage 15 may be arranged between the cabinet stage 17 and the loading/unloading stage 11, and may include a storage queue 600 configured to temporarily accommodate the gas container 50. In other example embodiments, the cabinet stage 17 may be directly connected to the loading/unloading stage 11, and the buffer stage 15 may be omitted.

The gas supply system 10 may include a transfer robot 200 configured to transfer the gas container 50 in the gas supply stage 13. The transfer robot 200 may grip the gas container 50, and transfer the gas container 50 while gripping the gas container 50. In example embodiments, the transfer robot 200 may receive the gas container 50 from a test buffer chamber 130 of the loading/unloading stage 11, and transfer the gas container 50 to the storage queue 600 or the gas supply cabinet 300. The transfer robot 200 may load the gas container 50 to an intended loading port in the storage queue 600 through a mutual interface with the storage queue 600, or load the gas container 50 into an intended loading port of the gas supply cabinet 300 through a mutual interface with the gas supply cabinet 300. In example embodiments, the transfer robot 200 may receive the gas container 50 depleted of gas from the gas supply cabinet 300, and transfer the gas container 50 to the storage queue 600 or the test buffer chamber 130.

A gas used in a semiconductor process may be stored in the gas container 50. For example, various types of gases having inert, toxic, corrosive, and/or combustible properties may be stored in the gas container 50. The gas container 50 may have, for example, a volume between about 2.3 L and about 49 L. For example, the gas container 50 may have a volume of about 47 L. When the gas supply cabinet 300 is configured to accommodate 1 to 20 gas containers 50, in general, replacement of the gas containers 50 more than once per day may be required. Of course, the replacement cycle of the gas container 50 for the gas supply cabinet 300 may vary depending on the semiconductor process situation.

The gas container 50 may include a valve structure 51 for controlling the release of gas. The valve structure 51 of the gas container 50 may include a pneumatic valve (or an air actuated valve). For example, the valve structure 51 may be configured to pneumatically control the operation of a diaphragm configured to open and close a gas flow path within the valve structure 51. For example, the diaphragm is configured to be lifted by pneumatic pressure, and the gas flow path in the valve structure 51 may be opened and closed by the elevation of the diaphragm. For example, when the diaphragm is positioned in the first position to open the gas flow path in the valve structure 51, the discharge of the gas through the valve nozzle 53 may be allowed. When the diaphragm is positioned in the second position lowered from the first position to close the gas flow path in the valve structure 51, the discharge of the gas through the valve nozzle 53 may be blocked. Hereinafter, the open position or open state of the valve structure 51 is defined as a position or state when the gas flow path in the valve structure 51 is opened to allow the release of gas through the valve nozzle 53. In addition, the closed position or closed state of the valve structure 51 is defined as a position or state when the gas flow path in the valve structure 51 is closed and the discharge of gas through the valve nozzle 53 is blocked.

The valve structure 51 may include a valve head 52, a pneumatic connection part 55, a locking handle 56, and/or an end cap 59.

A pneumatic connection part 55 may be provided at the upper end of the valve head 52. The pneumatic connection part 55 may be connected to a pneumatic line in the valve structure 51, and may include a flow path for transmitting pneumatic pressure provided from the outside to the pneumatic line of the valve structure 51. For example, externally supplied pneumatic pressure may act on the diaphragm of the valve structure 51 through the pneumatic connection part 55 and a pneumatic line of the valve structure 51. When externally supplied pneumatic pressure acts on the diaphragm through the pneumatic connection part 55, the diaphragm closes the gas flow path in the valve structure 51, leaving the valve structure 51 in a closed state.

The locking handle 56 may selectively restrict the movement of the diaphragm. The locking handle 56 may be arranged on the upper end of the valve head 52, and may have a shape surrounding the pneumatic connection part 55. The locking handle 56 is rotatably installed on the valve head 52, and the movement of the diaphragm may be permitted or the movement of the diaphragm may be restricted by the rotation of the locking handle 56. For example, the locking handle 56 may rotate between a release position that permits lifting and lowering of the diaphragm and a restrict position that restricts the lifting and lowering of the diaphragm. When the locking handle 56 is in the release position allowing the lifting operation of the diaphragm, the position of the diaphragm may be determined by externally provided pneumatic pressure. When the locking handle 56 is in the restrict position limiting the lifting operation of the diaphragm, the diaphragm pressed by the locking handle 56 may close the gas flow path in the valve structure 51. While the locking handle 56 is in the restrict position, the valve structure 51 is in the closed position, so that gas release through the valve structure 51 is blocked. When the locking handle 56 is positioned in the restrict position, damage of the diaphragm and/or damage of an elastic body supporting the diaphragm may be prevented due to vibration generated during transferring of the gas container 50. In addition, when the locking handle 56 is positioned in the restrict position, gas leakage due to the damage of diaphragm may be prevented. Hereinafter, the forced closing position or the forced closing state of the valve structure 51 is defined as a position or state when the locking handle 56 is positioned in the restrict position to block the release of gas through the valve nozzle 53.

The end cap 59 may open and close the outlet of the valve nozzle 53. The end cap 59 may be detachably fastened to the valve nozzle 53. The end cap 59 may be screwed to the valve nozzle 53.

The valve head 52 may include an alignment structure. The alignment structure may be a protrusion, a groove, or a particular type of structure provided on the outer circumferential surface of the valve head 52. The alignment structure of the valve head 52 may be sensed by a vision sensor of an external device. The vision sensor may include a camera, an image sensor, and the like. Based on the information obtained by sensing the alignment structure of the valve head 52 in the vision sensor, the position and posture of the valve structure 51 may be detected, and alignment between the external device and the valve structure 51 may be performed. Of course, the alignment structure may be sensed by a sensor other than the vision sensor. Also, a QR code related to information on the gas container 50 (e.g., the properties of gas) may be attached to the valve head 52.

A valve cap 80 for covering and protecting the valve structure 51 may be detachably coupled to the gas container 50. The valve cap 80 is fastened to the gas container 50 provided at the loading/unloading stage 11 from the outside. Before the gas container 50 is loaded from the loading/unloading stage 11 to the gas supply stage 13, the valve cap 80 is separated from the gas container 50. In addition, when the gas container 50 is transferred from the gas supply stage 13 back to the loading/unloading stage 11, after the valve cap 80 is fastened to the gas container 50, the gas container 50 is taken out.

The valve cap 80 may be detachably fastened to the neck ring 54 provided on the neck of the gas container 50 under the valve structure 51. The valve cap 80 may be screwed to the neck ring 54. That is, the valve cap 80 may be fastened to the neck ring 54 by engaging the screw thread provided on the inner circumferential surface of the valve cap 80 with the screw thread of the neck ring 54. The neck ring 54 may have a dog point for guiding the valve cap 80 to a position where the screw thread of the valve cap 80 and the screw thread of the neck ring 54 are engaged. In addition, a hexagonal embossed structure 81 may be provided on the upper portion of the valve cap 80.

Hereinafter, an example of an operation of the gas supply system 10 is briefly described.

A cradle 60 on which the gas container 50 is loaded is carried into the loading/unloading stage 11 by an operator. In the loading/unloading stage 11, transferring the gas container 50 from the cradle 60 to the test buffer chamber 130 using the loading/unloading robot 121, separating the valve cap 80 from the gas container 50, inspecting the gas container 50 in the test buffer chamber 130, and bringing the gas container 50 that has passed the inspection into the gas supply stage 13 may be sequentially performed in turn.

The transfer robot 200 moves to the buffer stage 15 of the gas supply stage 13 and receives the gas container 50 provided by the loading/unloading stage 11, and transfers the gas container 50 to the storage queue 600 or the gas supply cabinet 300. When the gas container 50 is loaded in the gas supply cabinet 300, an operation of separating the end cap 59 from the valve structure 51 in the gas supply cabinet 300, a connection operation between the gas nozzle of the gas supply cabinet 300 and the valve nozzle 53 of the gas container 50, a gas supply preparation operation (e.g., purge, pressurization/decompression test), and an operation of supplying the gas of the gas container 50 to a manufacturing facility that is a gas consumer after the valve structure 51 is switched to the open state are performed.

When the gas of the gas container 50 loaded in the gas supply cabinet 300 is exhausted, the gas supply cabinet 300 determines the replacement time of the gas container 50 by using a weight sensor or a pressure sensor. When replacement of the gas container 50 is required, the gas supply cabinet 300 reports this to the upper-level system. By performing an operation of switching the valve structure 51 of the gas container 50 to the closed position, an operation of separating the gas nozzle of the gas supply cabinet 300 and the valve nozzle 53 of the gas container 50, and an operation of fastening the end cap 59 to the valve structure 51, the gas supply cabinet 300 prepares for the unloading operation of the gas container 50. When the preparation for unloading the gas container 50 from the gas supply cabinet 300 is completed, the upper-level system assigns the unloading operation of the gas container 50 to the transfer robot 200, and the transfer robot 200 to which the operation is assigned moves to the gas supply cabinet 300 and unloads the gas container 50 from the gas supply cabinet 300. The transfer robot 200 may transfer the gas container 50 to the storage queue 600 or the test buffer chamber 130. When the gas container 50 is transferred to the storage queue 600, the gas container 50 is temporarily stored in the storage queue 600, and transferred to the test buffer chamber 130 at an appropriate time. The loading/unloading stage 11 fastens the valve cap 80 to the gas container 50 transferred to the test buffer chamber 130, and then transfer the gas container 50 from test buffer chamber to the cradle 60.

In addition, the upper-level system is configured to control the overall process using the gas supply system 10, and may be referred to as a main controller. For example, the upper-level system may include a memory device such as Read Only Memory (ROM) or Random Access Memory (RAM) in which various programming instructions are stored, and a processor such as a microprocessor, a central processing unit (CPU), a graphics processing unit (GPU), and the like configured to process programming commands stored in the memory device and signals provided from an external source. In addition, the upper-level system may include a receiver and a transmitter for receiving and transmitting electrical signals.

The upper-level system has a series of algorithms and sequences. The upper-level system reports and receives port state information and load information of the gas container 50 from each of the facilities (i.e., the gas supply cabinet 300, the storage queue 600, and the loading/unloading stage 11). The report may be made when there is a change in the state of the facility, or may be made periodically. The upper-level system schedules an operation of transferring the gas container 50 from one facility to another when the loading/unloading condition of the gas container 50 satisfies a preset condition.

Loading/unloading conditions and communication scenarios vary according to a combination of a start facility serving as a transfer start point of the gas container 50 and an arrival facility serving as a transfer destination point of the gas container 50. From carrying in of gas container 50 to carrying out of gas container 50, there are facility combination 1 (start facility: the loading/unloading stage 11 and the arrival facility: storage queue 600), facility combination 2 (start facility: the storage queue 600, and arrival facility: the gas supply cabinet 300), facility combination 3 (start facility: the gas supply cabinet 300, and arrival facility: storage queue 600), and facility combination 4 (start facility: the storage queue 600, and arrival facility: the loading/unloading stage 11).

The loading/unloading conditions for each facility combination are as follows.

In the case of facility combination 1 (start facility: the loading/unloading stage 11, and arrival facility: the storage queue 600), if there is free space in the storage queue 600 and there is a transfer request of the gas container 50 from the loading/unloading stage 11, a transfer operation of the gas container 50 is generated.

In the case of facility combination 2 (start facility: the storage queue 600, and arrival facility: the gas supply cabinet 300), when one or more loading ports of the gas supply cabinet 300 are empty and all loading ports of the gas supply cabinet 300 are in an inoperative state, a transfer operation of the gas container 50 is generated. At this time, when two or more loading ports are empty in the gas supply cabinet 300, the gas container 50 is transferred to the loading port for which the period of the empty is longer. When there are several suppliable gas containers 50, the gas container 50 with the shortest expiration date is used first.

In the case of facility combination 3 (start facility: the gas supply cabinet 300, and arrival facility: the storage queue 600), when one or more loading ports of the gas supply cabinet 300 correspond to a discharged event of the gas container 50 and all loading ports of the gas supply cabinet 300 are in an inoperative state, a transfer operation of the gas container 50 is generated. Here, the discharged event of the gas container 50 is that the unloading operation of the gas container 50 is in progress from the loading port of the gas supply cabinet 300 or the unloading operation of the gas container 50 is completed. At this time, if two or more loading ports in the gas supply cabinet 300 are the discharged events of the gas container 50, the discharged event of the gas container 50 performs the transfer operation from the oldest. In addition, when there are two or more empty loading ports of the storage queue 600, the gas container 50 is transferred to the loading port for which the loading port was empty for a longer period.

In the case of facility combination 4 (start facility: the storage queue 600, and arrival facility: the loading/unloading stage 11), when the test buffer chamber 130 is empty and there is a transfer request of the gas container 50 from the loading/unloading stage 11, a transfer operation of the gas container 50 is generated.

The loading/unloading communication scenario of each facility combination includes a loading/unloading scenario transferring the gas container 50 and a detailed scenario of each facility. The loading/unloading scenario includes an acquire scenario and a deposit scenario. The acquire scenario is a scenario in which the start facility that becomes the transfer start point of the gas container 50 checks the QR information of the gas container 50, and the transfer robot 200 receives the gas container 50 after confirming that the confirmed QR information is the same as the information of the upper-level system. The deposit scenario is a scenario in which the transfer robot 200 that has received the gas container 50 is moved to the intended loading port of the arrival facility which becomes the transfer destination point of the gas container 50, and the gas container 50 is delivered to the intended loading port of the facility after checking the information of the gas container 50. In the loading/unloading scenario, when a problem such as ID Read Fail in which the QR information check of the gas container 50 fails occurs, and/or the transfer robot 200 reports an abnormality during the transfer of the gas container 50, the gas container 50 is returned to the storage queue 600 and informs the operator about this so that the operator may check the state of the gas container 50 later.

The loading/unloading scenarios for each facility combination are as follows.

In the case of facility combination 1 (start facility: the loading/unloading stage 11, and arrival facility: the storage queue 600), the test buffer chamber 130 checks whether the gas container 50 meets the standard specifications that may be handled by the gas supply system 10, that is, "Spec In". When it is determined as "Spec in" in the test buffer chamber 130, the gas container 50 filled with gas is acquired from the test buffer chamber 130 and deposited in the storage queue 600. When it is determined as "Spec out" in the test buffer chamber 130, the corresponding gas container 50 is taken out to the cradle 60 for emergency. In the case of facility combination 2 (start facility: the storage queue 600, and arrival facility: the gas supply cabinet 300), the transfer robot 200 acquires the gas container 50 filled with gas from the storage queue 600 and deposits the gas container 50 in the gas supply cabinet 300. In the case of facility combination 3 (start facility: the gas supply cabinet 300, and arrival facility: the storage queue 600), the transfer robot 200 acquires the gas container 50 in which the gas is exhausted from the gas cabinet, and deposits the gas container 50 in the storage queue 600. In the case of facility combination 4 (start facility: the storage queue 600, and arrival facility: the loading/unloading stage 11), the gas container 50 in which the gas is exhausted from the storage queue 600 is acquired and deposited to the discharge outlet of the loading/unloading stage 11.

Figure 3:
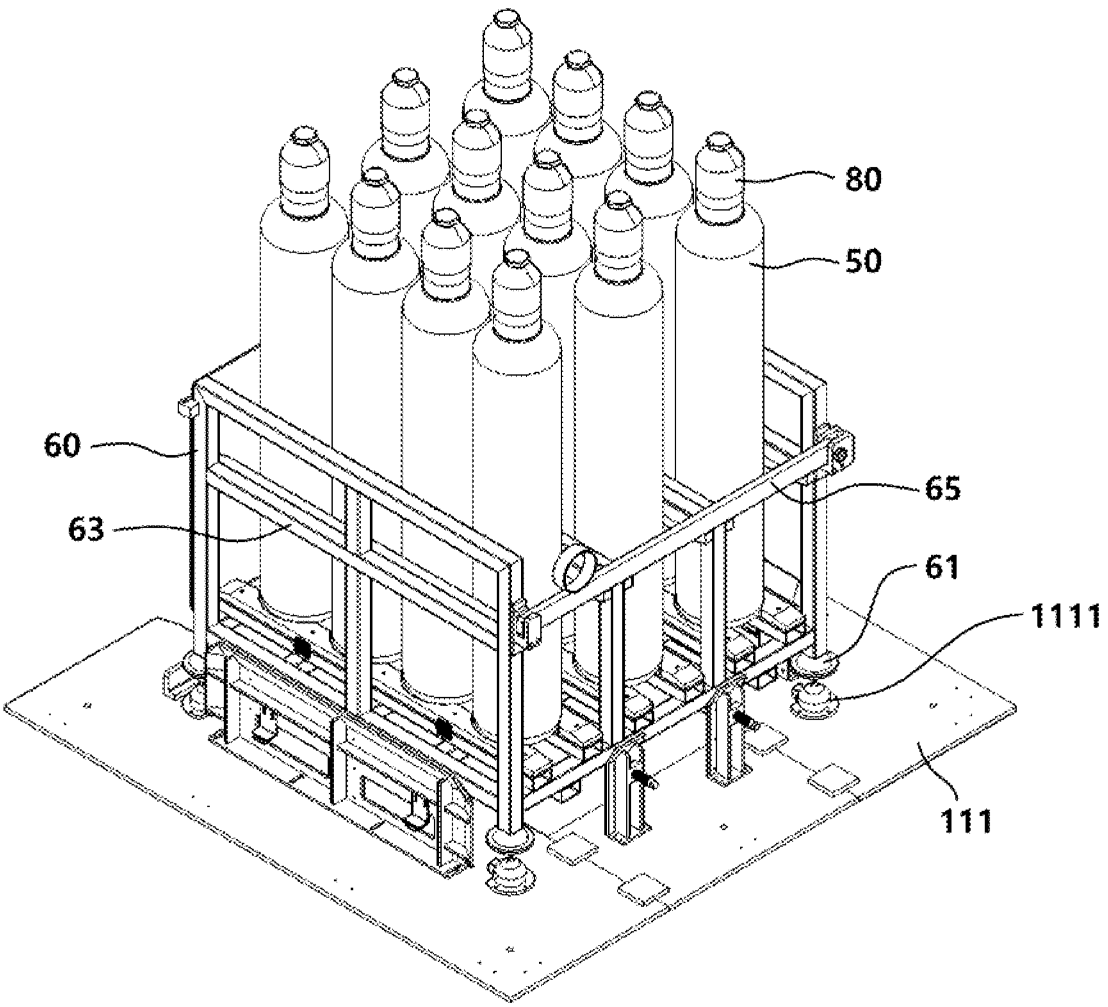
FIG. 3 is a perspective view illustrating a part of a cradle storage of a loading/unloading stage.
Figure 4:
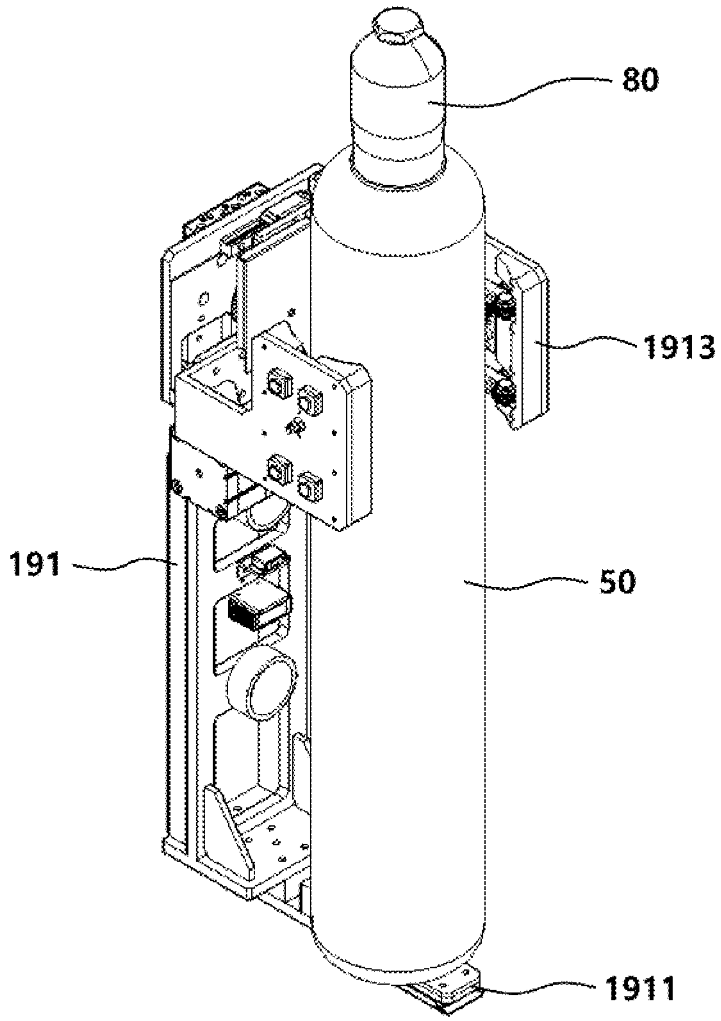
FIG. 4 is a perspective view illustrating a container gripping end effector of a loading/unloading robot of a loading/unloading stage.
Figure 5:
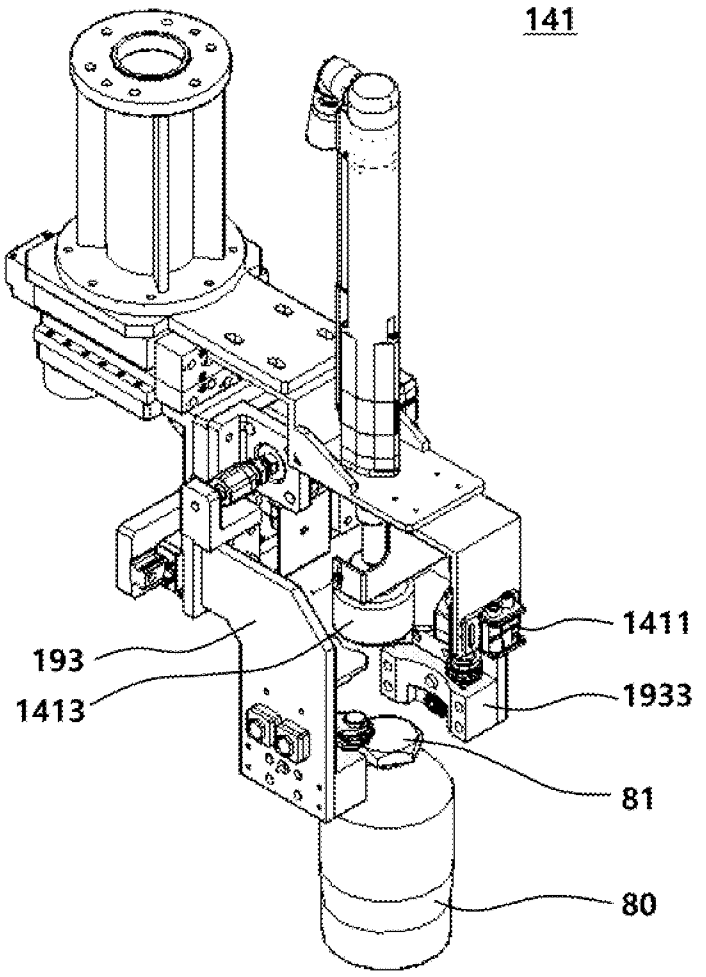
FIG. 5 is a perspective view illustrating a valve cap gripping end effector for holding the valve cap of a valve cap manipulation robot of the loading/unloading stage.
Figure 6:
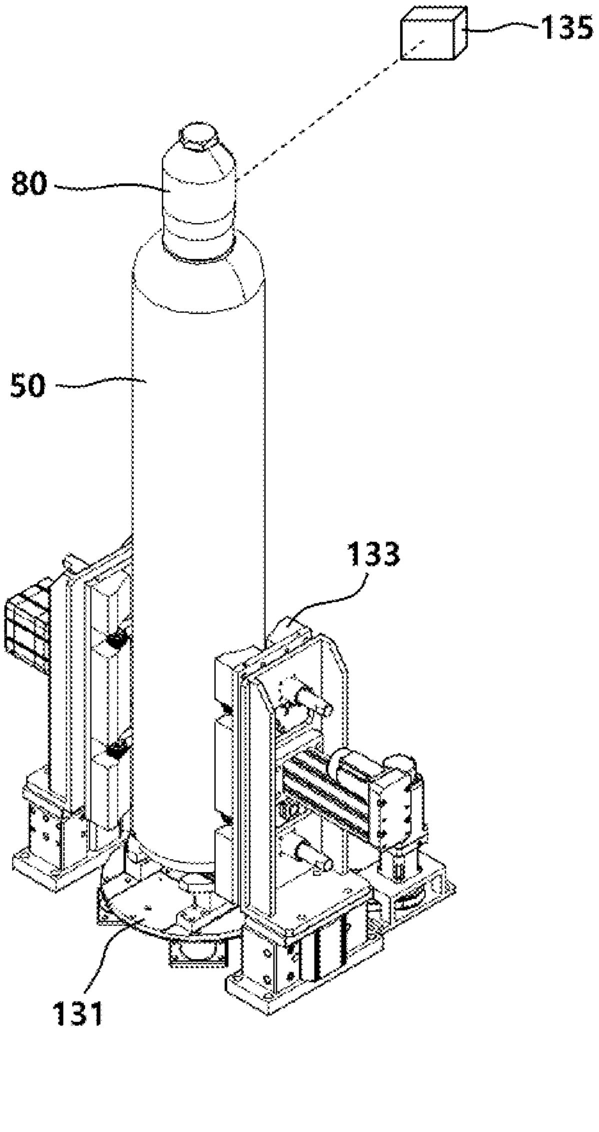
FIG. 6 is a perspective view illustrating a base plate and a gripper of a test buffer chamber.

FIG. 3 is a perspective view illustrating a part of the cradle storage 110 of the loading/unloading stage 11. FIG. 4 is a perspective view illustrating an end effector 191 for gripping the container of the loading/unloading robot 121 of the loading/unloading stage 11. FIG. 5 is a perspective view illustrating a valve cap gripping end effector 193 of a valve cap manipulation robot 141 of the loading/unloading stage 11. FIG. 6 is a perspective view illustrating a base plate 131 and a gripper 133 of the test buffer chamber 130.

Hereinafter, a detailed configuration of the loading/unloading stage 11 is described in detail with reference to FIGS. 1 to 6.

The loading/unloading stage 11 may include a cradle storage 110, a loading/unloading robot 121, a test buffer chamber 130, a valve cap manipulation robot 141, and/or a valve cap storage box 150.

With reference to FIG. 3, the gas container 50 is loaded in the cradle 60 and carried in and out of the loading/unloading stage 11. The number of gas containers 50 loaded in the cradle 60 may be between 1 and 30 or between 4 and 20. The cradle 60 includes a door 65 that opens and closes an inlet/outlet. The loading/unloading robot 121 raises or lowers the door 65 to open and close the inlet/outlet of the cradle 60. The cradle 60 can be transported by a forklift and is seated on a cradle loader 111 of the cradle storage 110, and a mounting guide 61 may be provided at the foot of the cradle 60 so that the cradle 60 may be seated at a preset position. An opening into which a bottom support structure 1911 of a container gripping end effector 191 fastened to a loading/unloading robot 121 may be inserted is formed at the bottom of the cradle 60 on which the gas container 50 is placed. In addition, the cradle 60 may include a position guide 63 capable of supporting the side of the gas container 50 so that the gas container 50 does not fall over while guiding the position at which the gas container 50 is seated.

The cradle storage 110 may include a cradle loader 111 on which the cradle 60 is mounted. The cradle 60 may be transported by a forklift and seated on the cradle loader 111 of the cradle storage 110. One or more cradle loaders 111 are provided in the cradle storage 110, and one cradle 60 may be mounted in one cradle loader 111. For example, a plurality of cradle loaders 111 may be arranged along a traveling path of the loading/unloading robot 121. The cradle loader 111 may include a mounting guide 1111 to help align the cradle 60 to a preset seating position of the cradle loader 111. The cradle 60 may be aligned and seated at a preset seating position of the cradle loader 111 by the mounting guide 61 of the cradle 60 and the mounting guide 1111 of the cradle loader 111. In addition, the cradle loader 111 may include a sensor in the form of a bumper. When an unintentional impact is detected from the bumper-shaped sensor of the cradle loader 111, the operation of the loading/unloading robot 121 may be temporarily stopped. In addition, the cradle loader 111 is provided with a motion detection sensor such as a laser curtain that may detect the operator's approach, and when an operator's approach is detected by the motion detection sensor, the operation of the loading/unloading robot 121 may be stopped.

In some example embodiments, the cradle storage 110 may include a cooling chamber 113 for maintaining a storage temperature of the gas container 50 loaded in the cradle 60. For example, the cooling chamber 113 has an internal space in which at least one cradle 60 may be stored, and may include a cooling module for adjusting the temperature of the internal space (e.g., a device configured to perform a cooling cycle using a refrigerant). The cooling chamber 113 may be configured to adjust the internal temperature of the cooling chamber 113 to an appropriate storage temperature according to the type of gas contained in the gas container 50. In particular, in the case of the cradle 60 in which the gas container 50 filled with combustible gas is loaded, the gas container 50 may be stored in the cooling chamber 113 of the cradle storage 110 until the gas container 50 is transferred by the loading/unloading robot 121. For example, the temperature of the internal space of the cooling chamber 113 may be set in a range of about 2° C. to about 5° C.

The loading/unloading robot 121 may be in charge of transferring the gas container 50 between the cradle 60 and the test buffer chamber 130. The loading/unloading robot 121 may be movably mounted on a first guide rail 123, and may be configured to move linearly along the extending direction of the first guide rail 123. In addition, a loading/unloading robot 121 may be configured to perform an operation of opening and closing the door 65 of the cradle 60, an operation of gripping the gas container 50, and an operation of transporting the gas container 50 to a target position.

In example embodiments, the loading/unloading robot 121 may include a vertical articulated robot, and a container gripping end effector 191 mounted through an end effector adapter provided at the end of the robot arm of the vertical articulated robot. With reference to FIG. 4, the container gripping end effector 191 may include a bottom support structure 1911 supporting the bottom surface of the gas container 50 and a gripper 1913 configured to grip the side surface of the gas container 50. The gripper 1913 may include a finger (or a gripper body) capable of contacting and supporting the side surface of the gas container 50, and an actuator for driving the finger. The loading/unloading robot 121 may adjust the posture and position of the container gripping end effector 191 so that the gas container 50 may be gripped in a posture suitable for transfer.

In embodiments, the loading/unloading robot 121 may perform a full-grip function, a semi-grip function, and an un-grip function by using the gripper 1913 of the container gripping end effector 191. The full-grip function (full-grip posture) is to maintain a posture in which the fingers of the gripper 1913 are in close contact with the side surface of the gas container 50. During transport of the gas container 50, the gripper 1913 may be maintained in a full-grip posture to prevent falling of the gas container 50. The semi-grip function (semi-grip posture) is to maintain a posture maintaining a preset small distance (e.g., between about 5 mm and about 30 mm) from the gas container 50 so that the fingers of the gripper 1913 prevent falling of the gas container 50. The un-grip function (un-grip posture) maintains a posture in which the fingers of the gripper 1913 are sufficiently spaced apart from the gas container 50 to allow the detachment of the gas container 50 from the gripper 1913. To perform the full-grip function, the semi-grip function, and the un-grip function, the motion and posture of the fingers of the gripper 1913 may be controlled by an actuator.

The description of the full-grip function, the semi-grip function, and the un-grip function may be applied substantially the same or similar to a gripper configured to grip the gas container 50, for example, a gripper 133 of the test buffer chamber 130, a gripper 216 of the transfer robot 200, a gripper 623 of the storage queue 600, a gripper 352 of a first container support module 350 of the gas supply cabinet 300, and an upper gripper 383 and a lower gripper 384 of a second container supporting module 350*a*, which are described later.

The loading/unloading robot 121 may include a vision sensor and a distance sensor for detecting the position of the cradle 60 and/or the position of the gas container 50 stored in the cradle 60. The vision sensor may include a camera, an image sensor, and the like. Based on the position of the cradle 60 and the position of the gas container 50 detected using the vision sensor and/or the distance sensor, the loading/unloading robot 121 may move the container gripping end effector 191 in a posture suitable for gripping the gas container 50, and then grip the gas container 50 using the container gripping end effector 191. In addition, the loading/unloading robot 121 may move according to a position value calculated based on the result detected by the vision sensor, or move the door 65 of the cradle 60 based on the result detected by the vision sensor. The loading/unloading robot 121 may include a load detection sensor configured to sense whether the gas container 50 is loaded in the loading/unloading robot 121, and it is possible to prevent accidents such as double loading of the gas container 50 through the load detection sensor. In addition, a proximity sensor is installed in the gripper 1913 of the loading/unloading robot 121, thereby preventing the end effector of the loading/unloading robot 121 from colliding with another structure while the loading/unloading robot 121 is interfaced with another structure. In addition, the loading/unloading robot 121 may include a safety device for preventing the gas container 50 from falling in an emergency situation. For example, as a safety device to prevent the gas container 50 from falling in an emergency situation, the gripper 1913 of the loading/unloading robot 121 may be designed to operate by a normally closed type actuator so as to grip the gas container 50 even in an emergency situation, and a linear motion brake may be applied to the gripper 1913 of the loading/unloading robot 121 so as not to drop the gas container 50 in an emergency situation.

With reference to FIG. 1, the test buffer chamber 130 may be configured to test the gas container 50 before the gas container 50 is loaded into the gas supply stage 13. The test buffer chamber 130 may include an internal space that may accommodate the gas container 50. The test buffer chamber 130 may be arranged on one side of the traveling path of the loading/unloading robot 121 traveling along the first guide rail 123. The test buffer chamber 130 may include a front door installed on one side facing the first guide rail 123 and a rear door installed on the other side facing the gas supply stage 13. The front door and the rear door may be opened and closed automatically. The front door and the rear door may include a collision detection sensor for detecting an unintentional collision of the loading/unloading robot 121, the transfer robot 200, and the like, and are designed to stop when an unintended collision is detected.

With reference to FIG. 6, a base plate 131 on which the gas container 50 is mounted, and a gripper 133 for gripping the gas container 50 may be provided in the internal space of the test buffer chamber 130. The base plate 131 may support both side portions of the bottom surface of the gas container 50, and an opening into which a bottom support structure 1911 of the loading/unloading robot 121 or a bottom support structure 215 of the transfer robot 200 may be inserted may be formed in the base plate 131. The base plate 131 may rotate with respect to a vertical direction as a rotation axis by a rotation actuator. The gripper 133 may include a finger (or a gripper body) capable of contacting and supporting the side surface of the gas container 50, and an actuator for driving the finger. In addition, the gripper 133 of the test buffer chamber 130 includes a drive shaft movable in the vertical direction. The gripper 133 of the test buffer chamber 130 may ascend and descend a certain distance (e.g., about 50 mm to about 100 mm) in a state in which the gas container 50 is gripped by the lifting actuator.

While the gas container 50 is transferred between the gripper 133 (FIG. 6) of the test buffer chamber 130 and the gripper 1913 (FIG. 4) of the loading/unloading robot 121, at least one of the gripper 133 of the test buffer chamber 130 and the gripper 1913 of the loading/unloading robot 121 is maintained in a semi-grip posture to prevent falling of the gas container 50. In particular, when the bottom support structure 1911 of the loading/unloading robot 121 is inserted into the opening of the base plate 131 of the test buffer chamber 130 and the gas container 50 is positioned on the base plate 131 of the test buffer chamber 130, while the gripper 133 of the test buffer chamber 130 is in the semi-grip posture, the gripper 1913 of the loading/unloading robot 121 switches from the full-grip posture to the semi-grip posture, and then, while the gripper 1913 of the loading/unloading robot 121 maintains the semi-grip posture, the gripper 133 of the test buffer chamber 130 switches to the full-grip posture to grip the gas container 50. When the gas container 50 is gripped by the gripper 133 of the test buffer chamber

130, the loading/unloading robot 121 moves to another operation position after switching the gripper 1913 of the loading/unloading robot 121 to the un-grip posture. In addition, for example, as the loading/unloading robot 121 unloads the gas container 50 from the test buffer chamber 130, when the bottom support structure 1911 of the loading/unloading robot 121 is inserted into the opening of the base plate 131 of the test buffer chamber 130 and positioned under the gas container 50, while the gripper 1913 of the loading/unloading robot 121 is in the semi-grip posture, the gripper 133 of the test buffer chamber 130 switches from the full-grip posture to the semi-grip posture, and while the gripper 133 of the test buffer chamber 130 maintains the semi-grip posture, the gripper 1913 of the loading/unloading robot 121 switches to the full-grip posture to grip the gas container 50. When the gas container 50 is gripped by the gripper 1913 of the loading/unloading robot 121, the loading/unloading robot 121 transfers the gas container 50 to the target position.

In the gas supply system 10, to prevent falling of the gas container 50 during the loading/unloading operation of the gas container 50, an operation in which the gripper of the side that delivers the gas container 50 switches from the full-grip posture to the semi-grip posture while the gripper of the side that receives the gas container 50 maintains the semi-grip posture, an operation in which the gripper of the side that receives the gas container 50 switches to the full-grip posture to grip the gas container 50 while the gripper of the side that delivers the gas container 50 maintains the semi-grip posture, and an operation in which the gripper of the side that delivers the gas container 50 switches to the un-grip posture may be performed sequentially. Such a series of processes for preventing falling of the gas container 50 may be applied substantially the same or similar to a loading/unloading operation of the gas container 50 between the transfer robot 200 and the test buffer chamber 130, a loading/unloading operation of the gas container 50 between the transfer robot 200 and the storage queue 600, and a loading/unloading operation of the gas container 50 between the transfer robot 200 and the gas supply cabinet 300.

The test buffer chamber 130 may inspect the properties, information, weight, and the like of the gas container 50 before the gas container 50 is loaded into the gas supply stage 13. For example, a vision sensor 135 (FIG. 6) capable of identifying an identification tag such as a barcode or a QR code of the gas container 50 may be provided inside the test buffer chamber 130. The vision sensor 135 of the test buffer chamber 130 may read an identification tag such as a barcode or a QR code of the gas container 50 to inspect the properties and information of the gas container 50. The vision sensor 135 of the test buffer chamber 130 may include an image sensor, a camera, and the like. The vision sensor 135 of the test buffer chamber 130 is equipped with a driving shaft to move within the test buffer chamber 130. For example, the vision sensor 135 may move in vertical direction and/or horizontal direction. By moving the vision sensor 135 of the test buffer chamber 130 to an appropriate position, properties and information on the gas container 50 having different heights and shapes may be inspected.

In addition, the test buffer chamber 130 may be configured to detect the inclination of the valve structure 51 of the gas container 50. The test buffer chamber 130 detects the inclination of the valve structure 51 of the gas container 50, and for example, when the detected inclination of the valve structure 51 of the gas container 50 deviates from a preset angle (e.g., about +3 degrees) from the reference value, the gas container 50 may be taken out.

In addition, the test buffer chamber 130 may include a weight sensor capable of detecting the weight of the gas container 50. For example, the weight sensor may be provided in the base plate 131 on which the gas container 50 is seated in the test buffer chamber 130, and may be configured to detect the weight of the gas container 50 placed on the base plate 131. The test buffer chamber 130 may detect the gas filling amount of the gas container 50 using a weight sensor. If it is determined that the gas filling amount of the gas container 50 does not meet a preset standard, the gas container 50 may not be transferred to the gas supply stage 13 and may be carried out to the cradle storage 110 by the loading/unloading robot 121.

The base plate 131 of the test buffer chamber 130 is configured to be rotated by an actuator, and by rotating the gas container 50 mounted on the base plate 131, the direction of the outlet of the valve nozzle 53 of the gas container 50 may be aligned to a position that may be sensed by the vision sensor 135. In addition, the base plate 131 of the test buffer chamber 130 may align the gas container 50 to an appropriate position where the vision sensor 135 may recognize the shape or barcode of the gas container 50 stored in the test buffer chamber 130. In addition, the base plate 131 of the test buffer chamber 130 may be rotated to a position capable of interfacing with the gripper 1913 of the loading/unloading robot 121 or the gripper 216 of the transfer robot 200. An identification means such as a QR code is provided on both sides of the base plate 131 of the test buffer chamber 130. The loading/unloading robot 121 or the transfer robot 200 may sense the identification means of the base plate 131 to be aligned to a position capable of interfacing with the base plate 131 of the test buffer chamber 130.

With reference to FIG. 5, while the gas container 50 is accommodated in the test buffer chamber 130, the valve cap manipulation robot 141 may be configured to perform a separation operation of separating the valve cap 80 that is fastened to the gas container 50 from the gas container 50 and/or a fastening operation of fastening the valve cap 80 to the gas container 50. The valve cap manipulation robot 141 may rotate the valve cap 80 so that the screw coupling between the valve cap 80 and the neck ring 54 of the gas container 50 is released, or rotate the valve cap 80 so that the valve cap 80 is fastened to the neck ring 54 of the gas container 50.

The gas container 50 is loaded into the loading/unloading stage 11 in a state in which the valve cap 80 is engaged with the screw thread of the neck ring 54 of the gas container 50 and is fastened, and then, is transferred into the test buffer chamber 130. The valve cap manipulation robot 141 may separate the valve cap 80 from the gas container 50 before the gas container 50 is loaded into the gas supply stage 13. In addition, when the gas container 50 carried out from the gas supply stage 13 is waiting in the test buffer chamber 130, the valve cap manipulation robot 141 may fasten the valve cap 80 to the gas container 50 before the gas container 50 is transferred to the cradle 60 by the loading/unloading robot 121.

In example embodiments, the valve cap manipulation robot 141 may include a vertical articulated robot and a valve cap gripping end effector 193 mounted through an end effector adapter provided at the end of the robot arm of the vertical articulated robot. The valve cap gripping end effector 193 may include a gripper 1933 configured to grip the valve cap 80. The gripper 1933 may include a finger (or a gripper body) capable of contacting and supporting the side surface of the gas container 50, and an actuator for driving the finger.

In addition, the valve cap manipulation robot 141 may include a nut runner 1413 for performing the fastening and separation operation of the valve cap 80. The nut runner 1413 may be configured to be rotated by an actuator. The nut runner 1413 may have a groove having a shape that may be engaged with the embossed structure 81 of the valve cap 80. The valve cap manipulation robot 141 may perform the fastening and separation operations of the valve cap 80 using the nut runner 1413 while the gripper 1933 of the valve cap gripping end effector 193 is gripping the valve cap 80. In a state in which the nut runner 1413 is positioned to engage the embossed structure 81 of the valve cap 80, by rotating the nut runner 1413 in a fastening direction, the valve cap 80 may be fastened to the gas container 50. In addition, in a state in which the nut runner 1413 is positioned to engage the embossed structure 81 of the valve cap 80, by rotating the nut runner 1413 in a direction opposite to the fastening direction, the screw coupling between the valve cap 80 and the gas container 50 may be released.

During the separation and fastening operation of the valve cap 80, the valve structure 51 of the gas container 50 may be damaged by physical interference between the valve cap 80 and the valve structure 51 of the gas container 50. To prevent the valve structure 51 of the gas container 50 from being damaged during the separation and fastening operation of the valve cap 80, the gripper body of the gripper 1933 of the valve cap manipulation robot 141 is made of a resin-based material and may be configured to be broken when an external force above a certain level is applied. In this case, when the valve cap 80 and the valve structure 51 of the gas container 50 interfere, because the gripper body of the gripper 1933 is broken first, damage to the valve structure 51 of the gas container 50 may be prevented.

The valve cap manipulation robot 141 may include a vision sensor 1411. The vision sensor 1411 of the valve cap manipulation robot 141 may include an image sensor, a camera, and the like. The vision sensor 1411 of the valve cap manipulation robot 141 may detect the position of the valve cap 80 by recognizing the shape of a precise part of the valve cap 80. For example, the vision sensor 1411 of the valve cap manipulation robot 141 may detect the position of the valve cap 80 by recognizing the embossed structure 81 of a hexagonal shape at the upper end of the valve cap 80 or detect positional information on the neck ring 54 of the gas container 50 in which the screw thread is formed. The valve cap manipulation robot 141 may adjust the position of the gripper 1933 and/or the nut runner 1413 based on the position information of the valve cap 80 and/or the position information of the neck ring 54 of the gas container 50 detected through the vision sensor 1411. Additionally, by reading the QR code of the valve cap 80 with the vision sensor 1411, information on the valve cap 80 and whether the valve cap 80 is installed may be checked.

When separating the valve cap 80 from the neck ring 54 of the gas container 50, the QR code of the valve cap 80 may be read with the vision sensor 1411 of the valve cap manipulation robot 141, and by measuring three points on the upper portion of the valve cap 80 with the distance sensor of the valve cap manipulation robot 141, the posture (e.g., inclination) of the valve cap 80 may be detected. After correcting the position of the valve cap gripping end effector 193 based on the detected posture of the valve cap 80, the valve cap manipulation robot 141 may dock the nut runner 1413 to the valve structure 51 of the gas container 50 and separate the valve cap 80 from the gas container 50. When fastening the valve cap 80 from the neck ring 54 of the gas container 50, the central position of the neck ring 54 of the gas container 50 may be found through the vision sensor 1411 of the valve cap manipulation robot 141, and the posture (e.g., inclination) of the neck ring 54 of the gas container 50 may be detected with the distance sensor of the valve cap manipulation robot 141. The valve cap manipulation robot 141 may correct the position of the valve cap gripping end effector 193 based on the detected posture of the neck ring 54 of the gas container 50 and then, fastens the valve cap 80 to the neck ring 54 of the gas container 50 using a nut runner 1413.

The valve cap manipulation robot 141 may be movably installed on the second guide rail 143 extending in one direction. For example, the valve cap manipulation robot 141 may be configured to linearly move along the second guide rail 143. The valve cap storage box 150 may be arranged on one side of the second guide rail 143. The valve cap storage box 150 may include one or more storage positions partitioned from each other so that one or more valve caps 80 may be stored. The valve cap manipulation robot 141 may transfer the valve cap 80 to any one of the storage positions of the valve cap storage box 150 after separating the valve cap 80 from the gas container 50. Each of the one or more storage positions of the valve cap storage box 150 may be provided with an identification mark for identifying information on the corresponding storage position.

After separating the valve cap 80 from the gas container 50, the valve cap manipulation robot 141 obtains information on the empty storage position among the storage positions of the valve cap storage box 150 through the upper-level system, and determines from this the target storage position to which the valve cap 80 will be transferred. After the valve cap manipulation robot 141 moves along the second guide rail 143, the valve cap 80 is seated in the determined target storage position. The valve cap manipulation robot 141 reads the identification mark provided to the target storage position through the vision sensor 1411, and stores information on the target storage position in which the corresponding valve cap 80 is stored. When the gas container 50 taken out from the gas supply stage 13 is loaded in the test buffer chamber 130, the valve cap manipulation robot 141 may move to the target storage position where the valve cap 80 is stored and grips the valve cap 80 based on the previously stored target storage position of the valve cap 80, and thereafter, move to the test buffer chamber 130 and fasten the valve cap 80 to the gas container 50.

Hereinafter, a process in which the gas container 50 is transferred to the gas supply stage 13 in the loading/unloading stage 11 is briefly described as follows.

First, with reference to FIG. 1, the cradle 60 on which one or more gas containers 50 are mounted is loaded into the cradle storage 110. The gas container 50 may be loaded and transported in the cradle 60 in a state in which the valve cap 80 covering the valve structure 51 of the gas container 50 is fastened to the gas container 50. The loading/unloading robot 121 grips one gas container 50 mounted on the cradle 60, and then transfers the gripped gas container 50 into the test buffer chamber 130.

Next, the test buffer chamber 130 checks the suitability of the corresponding gas container 50. The test buffer chamber 130 may read the barcode of the gas container 50 and inspect the type of gas contained in the gas container 50, and may measure the weight of the gas container 50 to determine whether the gas filling amount of the gas container 50 is equal to or greater than a preset reference value.

If it is determined that the gas container 50 is suitable in the test buffer chamber 130, the valve cap manipulation robot 141 separates the valve cap 80 from the gas container 50 waiting in the test buffer chamber 130, and then transfers the valve cap 80 to the empty storage position of the valve cap storage box 150. After separating the valve cap 80 from the gas container 50, the rear door of the test buffer chamber 130 is opened, and the gas container 50 is transported to the transfer robot 200 through the mutual interface between the gripper 216 of the transfer robot 200 and the gripper 133 of the test buffer chamber 130. If it is determined that the gas container 50 is inappropriate in the test buffer chamber 130, the loading/unloading robot 121 transfers the gas container 50 in the test buffer chamber 130 to the cradle 60.

Hereinafter, a process in which the gas container 50 carried out from the gas supply stage 13 is transferred to the cradle 60 is briefly described as follows.

The transfer robot 200 of the gas supply stage 13 loads the gas container 50 into the test buffer chamber 130. The valve cap manipulation robot 141 may move to the storage position of the valve cap storage box 150 in which the valve cap 80 corresponding to the gas container 50 is stored and grip the valve cap 80, and may move toward the test buffer chamber 130 again and fasten the valve cap 80 to the gas container 50 waiting in the test buffer chamber 130. When the valve cap 80 is fastened to the gas container 50, the front door of the test buffer chamber 130 is opened, and the loading/unloading robot 121 grips the gas container 50 and then transfers the gripped gas container 50 to the cradle 60.

Figure 7:
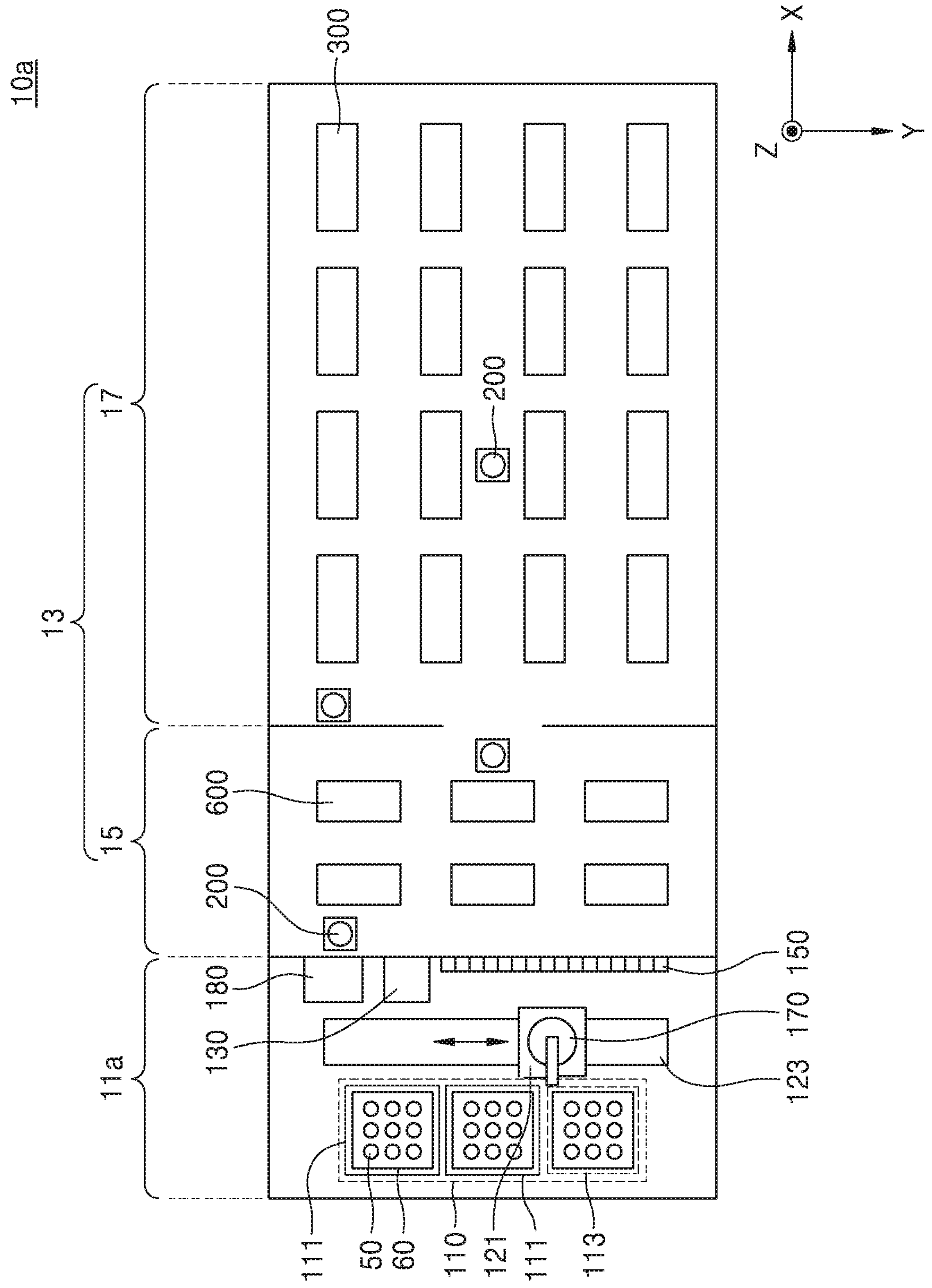
FIG. 7 is a configuration diagram schematically illustrating a gas supply system according to an example embodiment of the inventive concepts.
Figure 8:
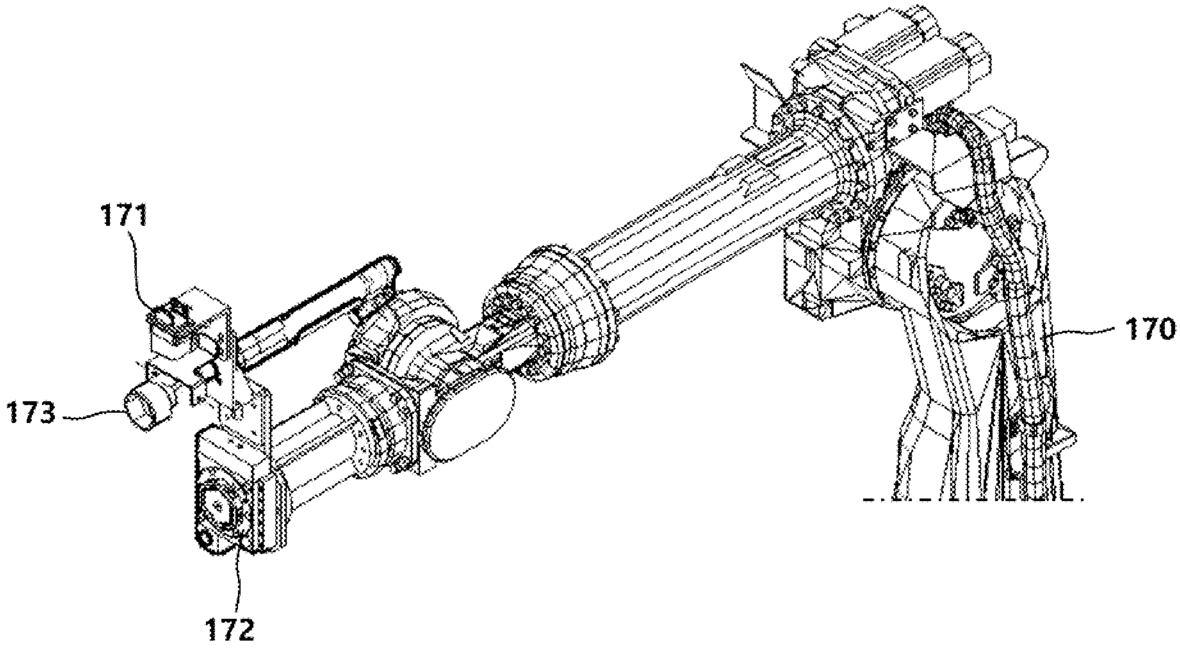
FIG. 8 is a perspective view illustrating the loading/unloading robot of FIG. 7.

FIG. 7 is a configuration diagram schematically illustrating a gas supply system 10*a* according to an example embodiment of the inventive concepts. FIG. 8 is a perspective view illustrating the loading/unloading robot 170 of FIG. 7.

Except that the loading/unloading robot 170 in the loading/unloading stage 11*a* is configured to further perform the function of the valve cap manipulation robot 141 (see FIG. 1) and the end effector table 180 is provided on the loading/unloading stage 11*a*, the gas supply system 10*a* shown in FIGS. 7 and 8 may be substantially the same as or similar to the gas supply system 10 described with reference to FIGS. 1 to 6. Hereinafter, repeated descriptions will be omitted or simplified.

Referring to FIGS. 7 and 8 together with FIGS. 2 to 6, the loading/unloading robot 170 may be in charge of an operation of transferring the gas container 50 between the cradle 60 and the test buffer chamber 130, and an operation of fastening/separating the valve cap 80 to/from the gas container 50. The loading/unloading robot 170 may use end effectors suitable for performing different operations. The loading/unloading robot 170 may include an auto tool changer 172 for mounting and detaching an end effector suitable for each operation. When performing a transfer operation of the gas container 50, the loading/unloading robot 170 may be equipped with a container gripping end effector 191 (shown in FIG. 4). When performing the fastening/separating operation of the valve cap 80, the loading/unloading robot 170 may be equipped with a valve cap gripping end effector 193 (shown in FIG. 5). The loading/unloading robot 170 may travel along the first guide rail 123 and move to the end effector table 180, the test buffer chamber 130, or the valve cap storage box 150. The loading/unloading robot 170 may include a vision sensor 171, a distance sensor, an auto tool changer 172 for mounting and detachment of the end effector, and a nut runner 173.

The container gripping end effector 191 and the valve cap gripping end effector 193 may be stored in the end effector table 180 provided at one side of the test buffer chamber 130. The end effector table 180 may include a loading detection sensor configured to check whether various end effectors are loaded. The loading/unloading robot 170 may move to the end effector table 180 according to a preset position value, and use the auto tool changer 172 to mount and detach the end effector suitable for each operation.

Hereinafter, a process in which the gas container 50 is transferred to the gas supply stage 13 in the loading/unloading stage 11*a* will be briefly described as follows.

The operator transfers the cradle 60 to the cradle loader 111 of the storage unit using a forklift. The transferred cradle 60 is seated at a target position through the position guide 63 provided in the cradle loader 111. When the operator applies a loading command to the loading/unloading robot 170 through a manipulation device such as a teaching pendant, the loading/unloading robot 170 moves to the cradle loader 111.

The vision sensor 171 of the loading/unloading robot 170 may detect the number of gas containers 50 stored in the cradle 60, position information of the gas containers 50, and position information of the cradle 60. The loading/unloading robot 170 may read the QR code provided to the valve cap 80 of the gas container 50 with the vision sensor 171 while moving along a designated path above the cradle 60.

To take out the gas container 50 from the cradle 60, an operation of moving the loading/unloading robot 170 to the end effector table 180, an operation of mounting the container gripping end effector 191 to the loading/unloading robot 170 using the automatic tool changer 172, an operation of opening the door 65 of the cradle 60 by moving the container gripping end effector 191 based on the position information detected from the vision sensor 171 or preset position information, an operation of gripping the gas container 50 with the container gripping end effector 191 after entering the bottom support structure 1911 of the container gripping end effector 191 into the opening provided at the bottom of the cradle 60, and an operation of taking out the gripped gas container 50 from the cradle 60 may be sequentially performed.

The loading/unloading robot 170 transfers the gas container 50 taken out from the cradle 60 to the test buffer chamber 130. The gripper 1913 of the container gripping end effector 191 mounted on the loading/unloading robot 170 interfaces with the gripper 133 of the test buffer chamber 130 to load the gas container 50 into the test buffer chamber 130. After that, the loading/unloading robot 170 separates the container gripping end effector 191 from the robot arm using the auto tool changer 172, and mounts the valve cap gripping end effector 193 to the loading/unloading robot 170 using the auto tool changer 172.

When the valve cap gripping end effector 193 is mounted on the loading/unloading robot 170, the loading/unloading robot 170 moves to the test buffer chamber 130. The vision sensor 171 of the loading/unloading robot 170 detects the embossed structure 81 provided at the upper portion of the valve cap 80 to determine the position of the valve cap 80, and the loading/unloading robot 170 separates the valve cap 80 from the gas container 50 using a nut runner 173 in a state in which the valve cap 80 is gripped with the valve cap gripping end effector 193. The loading/unloading robot 170 stores the separated valve cap 80 in a designated position of the valve cap storage box 150.

The test buffer chamber 130 closes the front door, and performs an inspection operation on the gas container 50 using the vision sensor 135 provided inside the test buffer chamber 130. The test buffer chamber 130 may inspect the entire shape of the gas container 50 while rotating the base plate 131. The vision sensor 135 senses the valve structure 51 of the gas container 50 and checks whether the gas container 50 corresponds to a container suitable for use in the gas supply system 10*a*.

In addition, the test buffer chamber 130 checks the exit direction of the valve nozzle 53. Only when the exit direction of the valve nozzle 53 in the test buffer chamber 130 is aligned with the preset direction, when the gas container 50 is stored in the storage queue 600, the QR code of the valve nozzle 53 may be read with the barcode reader 625 of the storage queue 600. Therefore, before the transfer robot 200 takes out the gas container 50 from the test buffer chamber 130, the test buffer chamber 130 may adjust the exit direction of the valve nozzle 53 of the gas container 50 by rotating the base plate 131.

Moreover, in the process of rotating the base plate 131 to adjust the exit direction of the valve nozzle 53, the rotational position of the base plate 131 is changed, so that the rotational position of the base plate 131 may be at a position where the interface between the gripper 133 of the test buffer chamber 130 and the gripper 216 of the transfer robot 200 is impossible. In this case, after lifting the gas container 50 from the base plate 131 using the gripper 133 of the test buffer chamber 130 capable of lifting and lowering, the position of the base plate 131 in the rotation direction may be adjusted to a position where the interface between the gripper 216 of the transfer robot 200 and the gripper 133 of the test buffer chamber 130 is possible. In this case, when the gas container 50 is seated on the base plate 131 by lowering the gripper 133 of the test buffer chamber 130, the exit direction of the valve nozzle 53 is aligned with the preset direction, and the position of the base plate 131 in the rotation direction may be adjusted to a position where the interface between the gripper 216 of the transfer robot 200 and the gripper 133 of the test buffer chamber 130 is possible.

When the inspection of the gas container 50 is completed, the test buffer chamber 130 calls the transfer robot 200, and the gripper 216 of the transfer robot 200 interfaces with the gripper 133 of the test buffer chamber 130 to receive the gas container 50. The transfer robot 200 transfers the gas container 50 to the storage queue 600 or the gas supply cabinet 300.

Hereinafter, a process in which the gas container 50 carried out from the gas supply stage 13 is transferred to the cradle 60 will be briefly described as follows.

The gas container 50 in which the gas is exhausted is transferred to the test buffer chamber 130 by the transfer robot 200. The gripper 133 of the test buffer chamber 130 interfaces with the gripper 216 of the transfer robot 200 to receive the gas container 50. When the gas container 50 is loaded into the test buffer chamber 130, the loading/unloading robot 170 grips the valve cap 80 stored in the valve cap storage box 150 and brings the gripped valve cap 80 to the test buffer chamber 130. The loading/unloading robot 170 may find the central position of the neck ring 54 of the gas container 50 through the vision sensor 171, and detect the posture (e.g., inclination) of the neck ring 54 of the gas container 50 with a distance sensor of the loading/unloading robot 170. The loading/unloading robot 170 aligns the valve cap 80 at a position where the screw thread of the valve cap 80 and the screw thread of the neck ring 54 of the gas container 50 may engage based on the detected posture of the neck ring 54 of the gas container 50, and fastens the valve cap 80 to the neck ring 54 of the gas container 50 using a nut runner 173. When the valve cap 80 is fastened to the neck ring 54 of the gas container 50, the loading/unloading robot 170 replaces the valve cap gripping end effector 193 with a container gripping end effector 191, and transfers the gas container 50 to which the valve cap 80 is fastened to the cradle 60 using the container gripping end effector 191.

Figure 9:
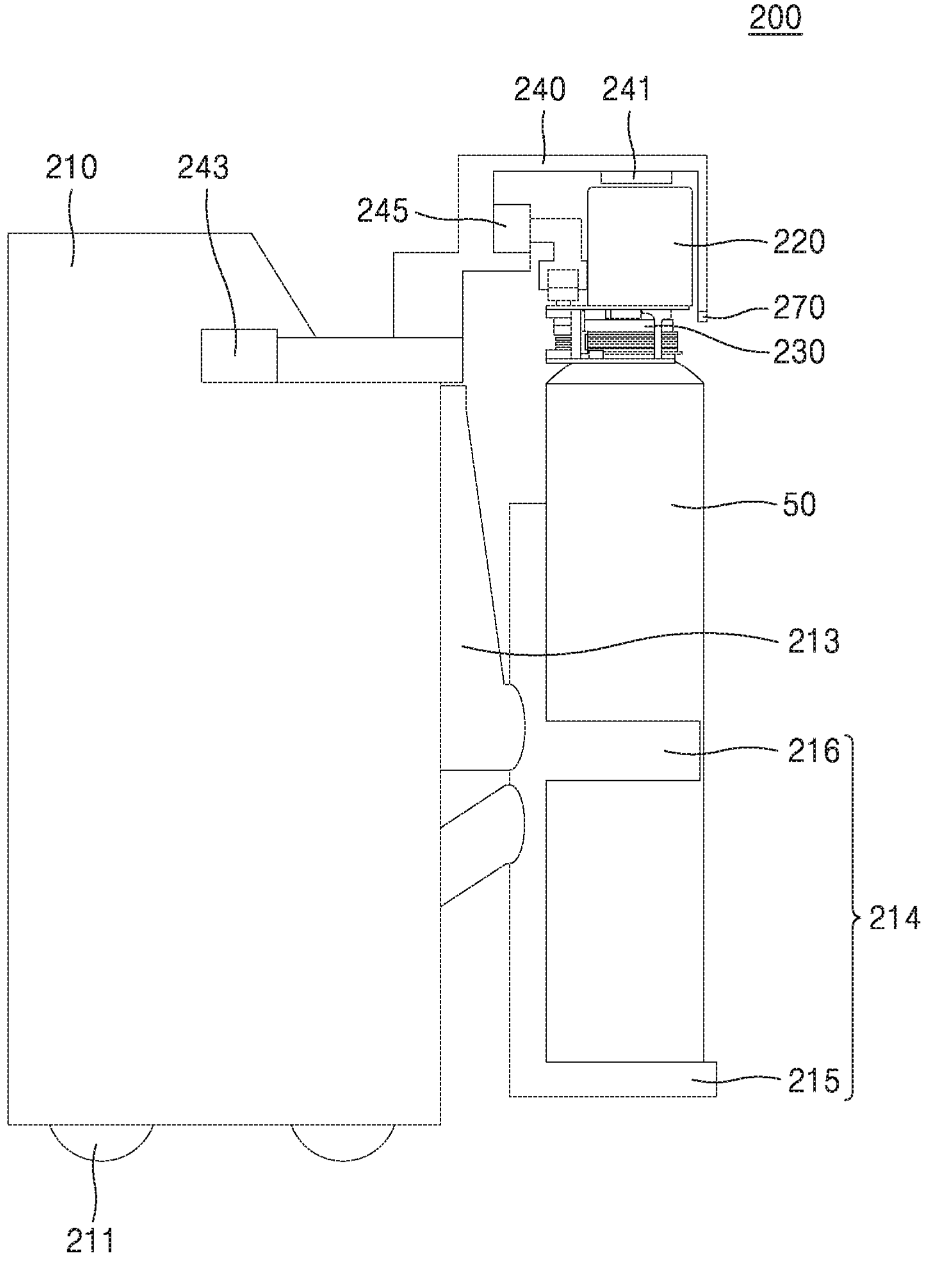
FIG. 9 is a configuration diagram schematically illustrating a transfer robot for transferring a gas container according to an example embodiment of the inventive concepts.
Figure 10A:
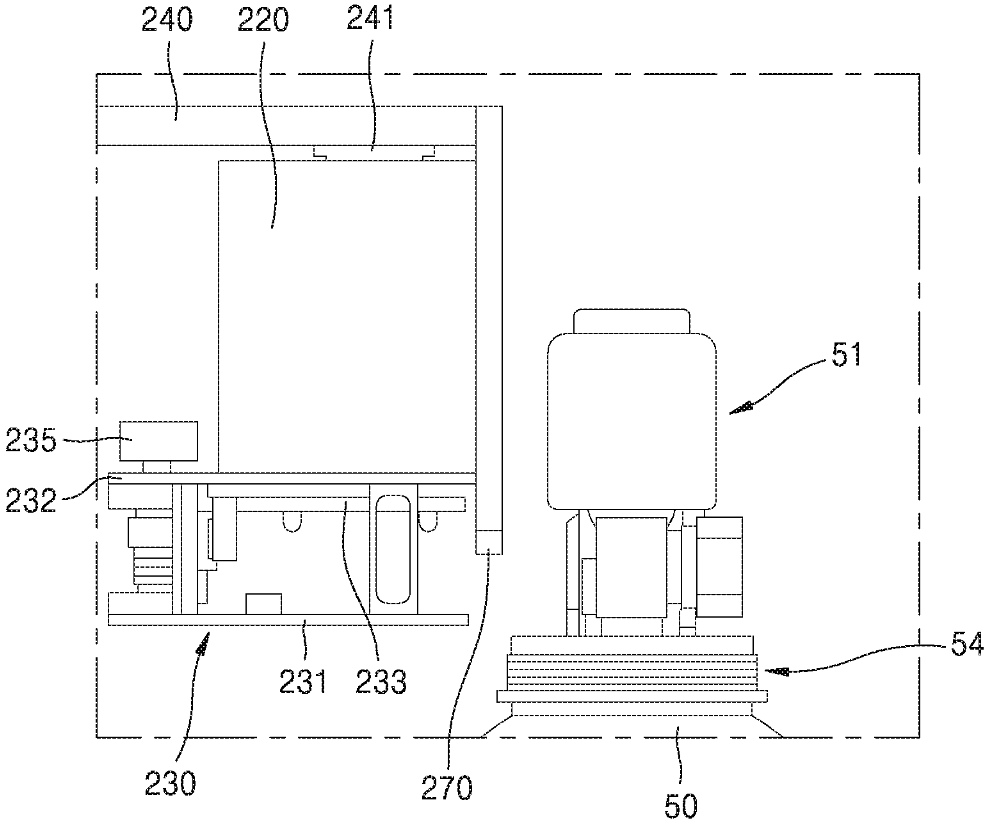
FIG. 10A is a side view illustrating a state in which a valve protection cover of the transfer robot of FIG. 9 is mounted on the gas container.
Figure 10B:
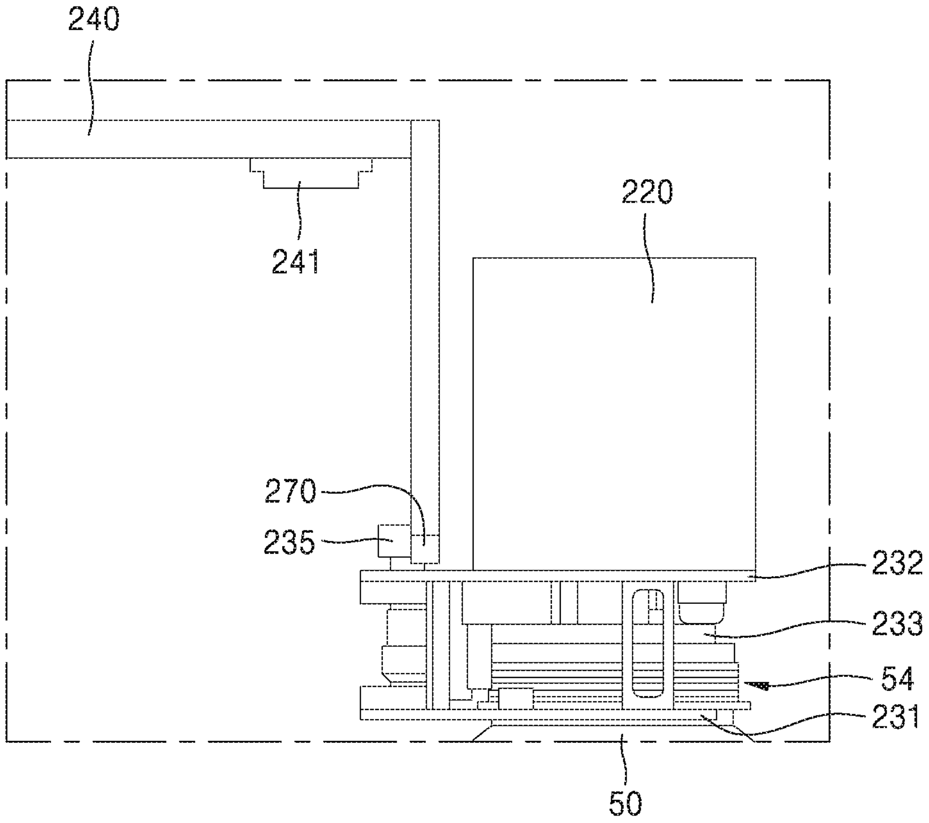
FIG. 10B is a side view illustrating a state in which the valve protection cover of the transfer robot of FIG. 9 is separated from the gas container.
Figure 11:
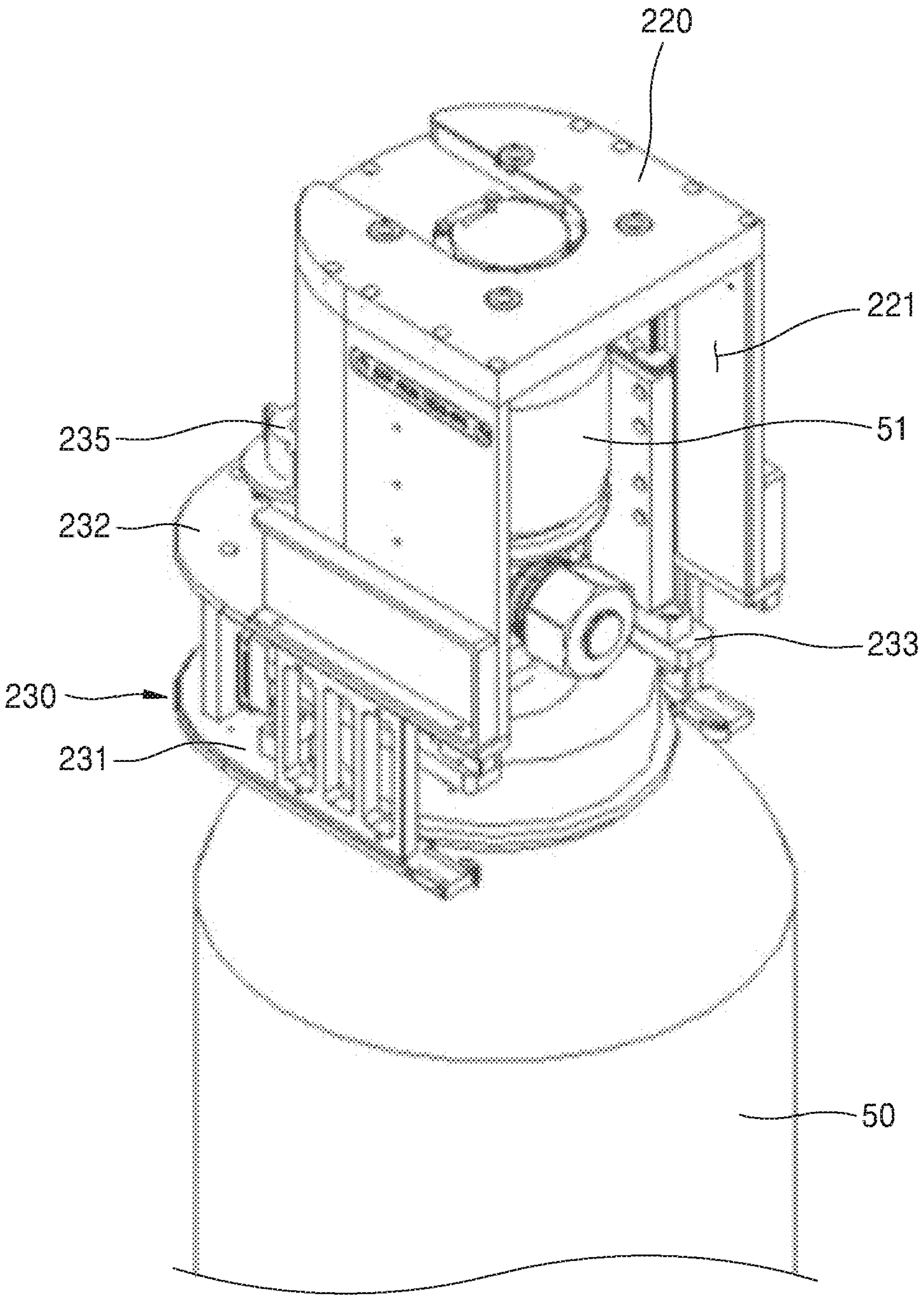
FIG. 11 is a perspective view illustrating a state in which the valve protection cover of the transfer robot of FIG. 9 is mounted on the gas container.

FIG. 9 is a configuration diagram schematically illustrating a transfer robot 200 for transferring a gas container 50 according to example embodiments of the inventive concepts. FIG. 10A is a side view illustrating a state in which the valve protection cover 220 of the transfer robot 200 of FIG. 9 is mounted on the gas container 50, and FIG. 10B is a side view illustrating a state in which the valve protection cover 220 of the transfer robot 200 of FIG. 9 is separated from the gas container 50. FIG. 11 is a perspective view illustrating a state in which the valve protection cover 220 of the transfer robot 200 of FIG. 9 is mounted on the gas container 50.

Referring to FIGS. 9, 10A, 10B, and 11 together with FIGS. 1 to 6, the transfer robot 200 configured to transfer the gas container 50 may be arranged on the gas supply stage 13. The transfer robot 200 may serve to transfer the gas container 50 from the loading/unloading stage 11 to the gas supply cabinet 300 provided in the gas supply stage 13, or transfer the gas container 50 in which the gas is exhausted from the gas supply cabinet 300 to the loading/unloading stage 11.

The transfer robot 200 may include a robot body 210 configured to travel within a gas supply stage 13. In example embodiments, a driving wheel 211 connected to a driving motor may be provided on a bottom portion of the robot body 210.

The robot body 210 may support the gas container 50. The robot body 210 may include a robot arm 213 and a support structure 214 connected to the robot arm 213. The robot arm 213 may be connected to an actuator and configured to move in a horizontal and/or vertical direction. The support structure 214 may be configured to support the gas container 50 while the transfer robot 200 transfers the gas container 50. In addition, the support structure 214 includes a tilting driving actuator, and the support structure 214 may be tilted if necessary to compensate for the inclination of the gas container 50 or the inclination due to a manufacturing error of the transfer robot 200.

The support structure 214 may include, for example, a bottom support structure 215 for supporting the bottom surface of the gas container 50 and a gripper 216 for gripping the gas container 50. The gripper 216 may include a finger (or a gripper body) capable of contacting and supporting the side surface of the gas container 50, and an actuator for driving the finger. As described above, the gripper 216 may perform the full-grip function, the semi-grip function, and the un-grip function. The gripper 216 may be configured to grip the side surface of the gas container 50. The gripper 216 of the support structure 214 is driven by an actuator and may be configured to switch between the full-grip posture that is in close contact with the gas container 50 and supports the gas container 50 in contact, the semi-grip posture that is spaced apart from the gas container 50 by a preset small distance to prevent falling of the gas container 50, and the un-grip posture spaced apart from the gas container 50 to allow the gas container 50 to be brought in and out. In addition, the driving direction of the transfer robot 200 and the direction in which the support structure loads the gas container 50 may be perpendicular to each other. In this case, even when the transfer robot 200 moving in the driving direction stops suddenly, the gas container 50 loaded on the support structure 214 may be prevented from being separated from the support structure 214.

The transfer robot 200 may include a valve protection cover 220 configured to cover and protect the valve structure 51 provided on the upper side of the gas container 50, a fixing frame 230 for fixing the valve protection cover 220 to the gas container 50, and a moving block 240 for moving the valve protective cover 220.

The valve protection cover 220 may cover and protect the valve structure 51 of the gas container 50 while the transfer robot 200 transfers the gas container 50. By covering the valve structure 51 of the gas container 50, the valve protection cover 220 may prevent an impact from being applied to the valve structure 51 of the gas container 50 during transfer of the gas container 50. The valve protection cover 220 may have a shape surrounding the gas container 50. For example, the valve protection cover 220 may include a sidewall covering a side part of the valve structure 51 of the gas container 50 and an upper wall covering an upper portion of the valve structure 51. The valve protection cover 220 may be mounted on the gas container 50 to protect the valve structure 51 during the transfer of the gas container. The valve protection cover 220 may be stored in an appropriate position of the robot body 210 and wait when the gas container 50 is not being transferred.

The moving block 240 may move the valve protection cover 220. The moving block 240 may be configured to move linearly by an actuator 243. The moving block 240 may include a fixing pad 241 to which the valve protection cover 220 is detachably coupled. For example, the valve protection cover 220 may stand by in a state attached to the fixing pad 241 of the moving block 240 when the gas container 50 is not transferred. When the valve protection cover 220 is attached to the fixing pad 241, the moving block 240 may linearly move the valve protection cover 220 by linear movement (e.g., forward or backward).

For example, the valve protection cover 220 may move between a standby position spaced apart from the valve structure 51 of the gas container 50 loaded on the support structure 214 and a mounting position positioned to cover the valve structure 51 of the gas container 50. An opening 221 may be formed in the sidewall of the valve protection cover 220. While the valve protection cover 220 moves together with the moving block 240, a portion of the gas container 50 and/or the valve structure 51 of the gas container 50 may pass through the opening 221 of the valve protection cover 220. The opening 221 of the valve protection cover 220 may be formed in a size suitable for preventing the gas container 50 and/or the gas container 50 from interfering with the valve structure 51.

With reference to FIGS. 10A and 10B, the fixing frame 230 may be coupled to the lower portion of the valve protection cover 220, and may move together with the valve protection cover 220. The fixing frame 230 is selectively fixed to the gas container 50. As the fixing frame 230 is fixed to the gas container 50, the valve protection cover 220 may be fixed to the gas container 50 through the fixing frame 230. When the fixing frame 230 is detached from the gas container 50, the valve protection cover 220 may move with respect to the gas container 50. For example, the fixing frame 230 may include an upper frame 232 connected to the valve protection cover 220, a lower frame 231 fixed to the lower side of the neck ring 54 of the gas container 50, and a pressure slider 233 configured to vertically move between the upper frame 232 and the lower frame 231. For example, the pressure slider 233 is installed movably along a vertical guide extending between the upper frame 232 and the lower frame 231, and a position of the pressure slider 233 in the vertical direction may be controlled by the actuator 245. For example, the operation body connected to the actuator 245 may rotate the operation lever 235 to raise or lower the pressure slider 233. When the valve protection cover 220 is placed in the mounting position and the lower frame 231 is fixed to the stopping protrusion on the lower side of the neck ring 54 of the gas container 50, as the pressure slider 233 moves downward and presses the upper side of the neck ring 54 of the gas container 50, the fixing frame 230 and the valve protection cover 220 may be fixed to the gas container 50.

In some embodiments, the valve protection cover 220 may include a position detection sensor 270 for detecting the position of the gas container 50. The position detection sensor 270 may detect a horizontal position and/or a vertical position of the gas container 50. The position detection sensor 270 may include, for example, an optical sensor, an image sensor, or the like.

In example embodiments, the position detection sensor 270 may be configured to detect the height of the gas container 50 supported on the support structure 214. For example, before mounting the valve protection cover 220 to the gas container 50 using the fixing frame 230, the position detection sensor 270 may detect the vertical position of the gas container 50 supported by the support structure 214 and the transfer robot 200 may adjust the vertical position of the support structure 214 using the robot arm 213 connected to the support structure 214 based on the detected vertical position of the gas container 50. The vertical position of the support structure 214 may be adjusted to a position suitable for mounting the valve protection cover 220 to the gas container 50.

In example embodiments, the position detection sensor 270 may detect a horizontal position and/or a vertical position of the neck ring 54 of the gas container 50. The position detection sensor 270 may detect the vertical position of the neck ring 54 to mount the valve protection cover 220 to the neck ring 54 of the gas container 50. The vertical position of the support structure 214 may be adjusted to a position suitable for mounting the valve protection cover 220 to the neck ring 54 of the gas container 50 based on the detected vertical position of the neck ring 54.

The transfer robot 200 may include a safety device for safe transfer of the gas container 50. The transfer robot 200 may include a sensor capable of detecting a collision. For example, the transfer robot 200 may include a bumper-type collision detection sensor mounted on a frame constituting the exterior of the transfer robot 200. In addition, the transfer robot 200 may include an obstacle detection sensor capable of detecting an obstacle in the vicinity. The obstacle detection sensor may include, for example, a scanner sensor. If collision detection or obstacle detection lasts a certain amount of time (e.g., 5 to 10 seconds or more), the transfer robot 200 stops the operation, and may resume the operation by an external command. An imaging device such as a closed-circuit television (CCTV) or a sensor may be installed in the transfer robot 200 to check the collision detection situation or obstacle detection situation of the transfer robot 200 in real time or later. The imaging device may record or sense an external situation in the forward/backward and loading/unloading operation directions of the transfer robot 200. When a collision occurs during the transfer operation of the gas container 50 of the transfer robot 200, the support structure 214 may sense this through a change in torque/acceleration of the actuator. When a collision is detected in the support structure 214, except for the situation in which the carrying-in/carrying-out operation of the gas container 50 between facilities is in progress, the support structure 214 may include a function to restore to a pre-designated standby position. A load detection sensor capable of detecting whether the gas container 50 is loaded may be provided on the support structure 214 of the transfer robot 200.

The transfer robot 200 may include an additional safety device for explosion-proof. In this case, the transfer robot 200 may be used in the gas supply stage 13 even without a separate explosion-proof design for the transfer robot 200. When the gas container 50 is loaded on the support structure 214 of the transfer robot 200, a ventilation device may be installed that blows wind toward the gas container 50 to prevent gas condensation and improve the ventilation function. The transfer robot 200 is equipped with a power cut-off function that cuts off the power by an external command. If there is a risk of gas leakage in the loading/unloading stage 11 or gas supply stage 13, the upper-level system controlling the transfer robot 200 may remove the ignition source by shutting down the power of the transfer robot 200. When the power of the transfer robot 200 is turned off by the power cut-off function, the power of a particular part of the transfer robot 200 that may serve as an ignition source for combustible gas may be cut off. Thus, the transfer robot 200 separates the explosive situation in space and time, so that in the gas supply stage 13 for handling the gas container 50 filled with combustible gas, the possibility that the transfer robot 200 may act as an ignition source and cause an explosion may be blocked.

To mount the gas container 50 provided from the loading/unloading stage 11 to the gas supply cabinet 300, an operation in which the transfer robot 200 grips the gas container 50 provided in the test buffer chamber 130, an operation of mounting the valve protection cover 220 to the gas container 50 so that the valve structure 51 of the gas container 50 is covered, an operation of moving to the gas supply cabinet 300 in the state holding the gas container 50, an operation of separating the valve protection cover 220 from the gas container 50, and an operation of bringing the gas container 50 into the gas supply cabinet 300 may be sequentially performed.

In addition, to transfer the gas container 50 from the gas supply cabinet 300 to the loading/unloading stage 11, an operation in which the transfer robot 200 grips the gas container 50 in the gas supply cabinet 300, an operation of mounting the valve protection cover 220 to the gas container 50 so that the valve structure 51 of the gas container 50 is covered, an operation of moving to the test buffer chamber 130 of the loading/unloading stage 11 in a state holding the gas container 50, an operation of separating the valve protection cover 220 from the gas container 50, and an operation of bringing the gas container 50 into the test buffer chamber 130 may be sequentially performed.

The transfer robot 200 performs an operation of loading and unloading the gas container 50 with respect to the gas supply cabinet 300, the storage queue 600, and the test buffer chamber 130. The operation in which the transfer robot 200 loads the gas container 50 into the gas supply cabinet 300, the storage queue 600, and the test buffer chamber 130 may be referred to the load interface, and meanwhile, the operation in which the transfer robot 200 unloads the gas container 50 from the gas supply cabinet 300, the storage queue 600, and the test buffer chamber 130 may be referred to the unload interface.

The two interfaces (i.e., the load interface and the unload interface) may include checking the loading state of the gas container 50 by using a load detection sensor, a sensor for detecting double loading, and the like in common at each time before, during, and after the interface. The two interfaces may include detecting the position of the gas container 50 mounted in the container loading port of each of the gas supply cabinet 300, the storage queue 600, and the test buffer chamber 130 when interfacing using a QR code reader, distance sensor, and the like. In addition, to prevent excessive restraint of the gas container 50 by a grip means such as a gripper, the two interfaces may include a gripper's semi-grip function. The two interfaces are performed while confirming each other's operation through communication between the gas supply cabinet 300, the storage queue 600, and the test buffer chamber 130 and the transfer robot 200, respectively, and may utilize a parallel input/output (PIO) sensor or the like for such communication. When an alarm occurs in the gas supply cabinet 300, the storage queue 600, and the test buffer chamber 130 during both interfaces, the transfer robot 200 also recognizes the situation through communication. If the corresponding alarm requires on-site confirmation and operator determination, the progress of both interfaces is stopped and no other transfer operation is started.

In both interfaces, the transfer robot 200 checks the QR code provided on each door of the gas supply cabinet 300, the storage queue 600, and the test buffer chamber 130. A QR code containing destination information is attached to each door of the gas supply cabinet 300, the storage queue 600, and the test buffer chamber 130. Before starting the loading/unloading operation of the gas container 50, the transfer robot 200 compares the destination information obtained by checking the QR code with the destination information received from the upper-level system, thereby checking whether it has arrived at the target operation position.

The transfer robot 200 detects the position of the base plate on which the gas container 50 is seated in the facility (i.e., any one of the gas supply cabinet 300, the storage queue 600, and the test buffer chamber 130) interfaced with the transfer robot 200 by using the QR reader and/or distance sensor provided in the robot arm 213 and/or the support structure 214 of the transfer robot 200, and corrects the position of the robot arm 213 of the transfer robot 200 based on the detected position of the base plate. When the door of the facility is opened, the distance from the sensing plate of the base plate of the facility is sensed and the misaligned angle of the base plate is measured using a distance sensor installed on the robot arm 213 and/or the support structure 214 of the transfer robot 200. An alarm may be generated when the interface between the support structure 214 and the base plate is impossible because the deviation of the base plate is out of the allowable angle range (e.g., ±10 degrees). The robot arm 213 of the transfer robot 200 may check the QR code provided on the base plate and detect position information (e.g., position information on a horizontal direction and position information on a vertical direction) on a mounting position in which the gas container 50 is mounted. A position correction value of the support structure 214 may be determined based on the detected position information on the mounting position of the gas container 50.

The load interface goes through the following process. An operation of checking the safety state such as the driving safety of the transfer robot, the position of the robot arm 213 of the transfer robot 200, and the like, an operation of recognizing the QR code of the door of the facility where the loading operation of the gas container 50 is performed and checking whether it has arrived at the target operation position, an operation of opening the door of the facility, an operation of detecting the position of the base plate on which the gas container 50 is mounted in the facility, an operation of correcting the position of the support structure 214 of the transfer robot 200 based on the detected position of the base plate, an operation of applying a semi-grip posture to the gripper of the facility, an operation of applying a semi-grip posture to the transfer robot 200, an operation of applying a full-grip posture to the gripper of the facility, an operation of applying the un-grip posture to the gripper 216 of the transfer robot 200, an operation of returning the robot arm 213 of the transfer robot 200 to the standby position, an a safety check operation such as the position of the transfer arm 213 of the transfer robot 200 and the loading state of the gas container 50 may be sequentially performed.

The unload interface goes through the following process. An operation of checking the safety state such as the driving safety of the transfer robot 200 or the position of the robot arm 213 of the transfer robot 200, an operation of recognizing the QR code of the door of the facility where the unloading operation of the gas container 50 is performed and checking whether it has arrived at the target operation location, an operation of opening the door of the facility, an operation of detecting the position of the base plate on which the gas container 50 is mounted in the facility, an operation of correcting the position of the support structure 214 of the transfer robot 200 based on the detected position of the base plate, an operation of applying the semi-grip posture to the gripper 216 of the transfer robot 200, an operation of applying a semi-grip posture to the gripper of the facility, an operation of applying a full-grip posture to the gripper 216 of the transfer robot 200, an operation of applying an un-grip posture to the gripper of the facility, an operation of returning the robot arm 213 of the transfer robot 200 to the standby position, and a safety check operation such as the position of the transfer arm 213 of the transfer robot 200 and the loading state of the gas container 50 may be sequentially performed.

When the remaining battery level of the transfer robot 200 falls below a certain value (e.g., 10% or less), the transfer robot 200 may be configured to automatically move to a charging station provided in the gas supply stage 13. The transfer robot 200 may be configured to perform a transfer operation of the gas container 50 after remaining battery level is greater than or equal to a certain value (e.g., greater than or equal to 90%). When the transfer robot 200 moves to the charging station, it is possible to check whether the transfer robot 200 has moved to the correct position that may be docked to the charging station using a sensor or the like. When it is confirmed that the transfer robot 200 is docked in the correct position, a charging arm extends from the charger of the charging station and is connected to the charging electrode of the transfer robot 200 to start charging the battery of the transfer robot 200. The electrode of the transfer robot 200 is opened and closed by the electrode cover, and the electrode cover is opened only when charging. A flexible structure may be applied to the charging arm. Thus, even if there is a position error between the transfer robot 200 and the charger, the connection between the flexible charging arm and the electrode of the transfer robot 200 may be realized through deformation of the flexible charging arm. The charger may include an emergency stop function for overcurrent, overvoltage, and/or overtemperature. The charging arm may include a blocking structure configured to block the exposure of the terminals of the charging arm when the transfer robot 200 is docked, thereby preventing electric shock accidents caused by contact with unknown objects or operators.

Figure 12:
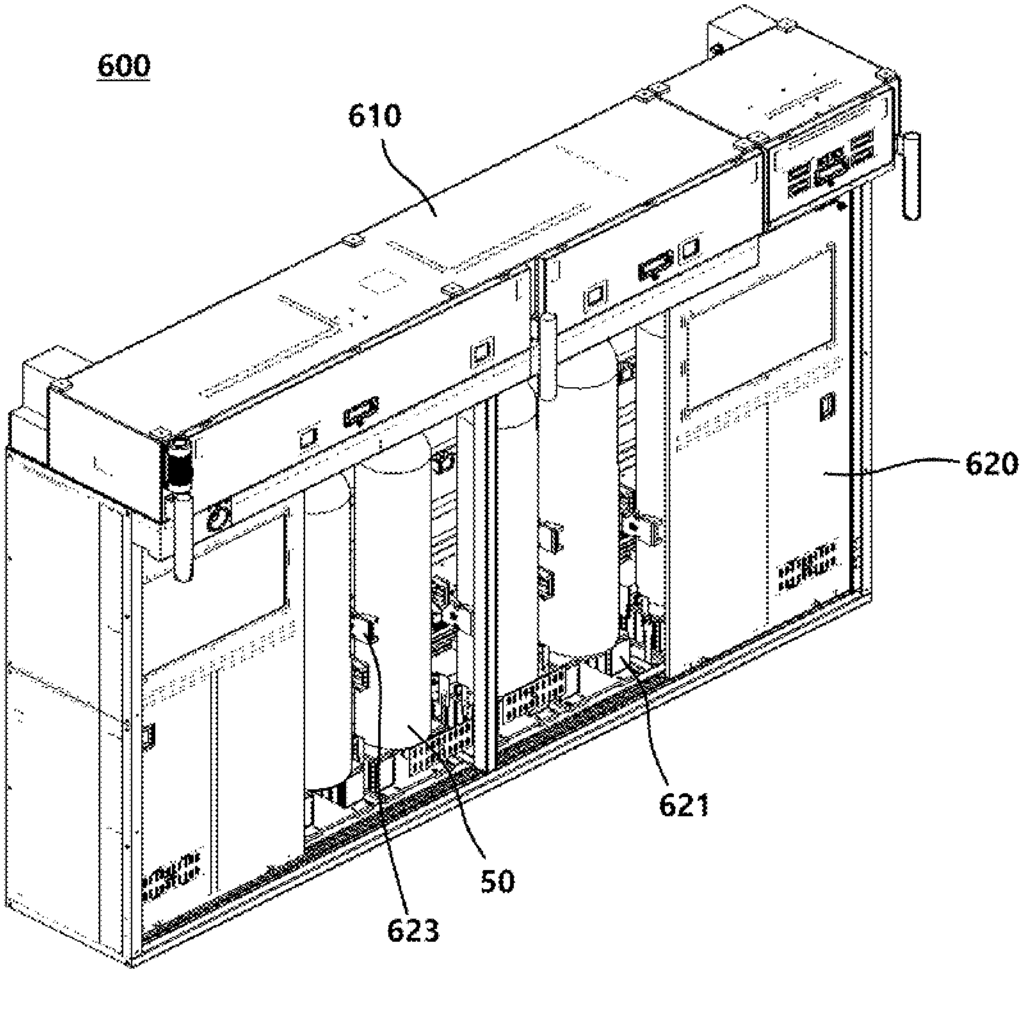
FIG. 12 is a perspective view illustrating a storage queue of a buffer stage according to an example embodiment of the inventive concepts.
Figure 13:
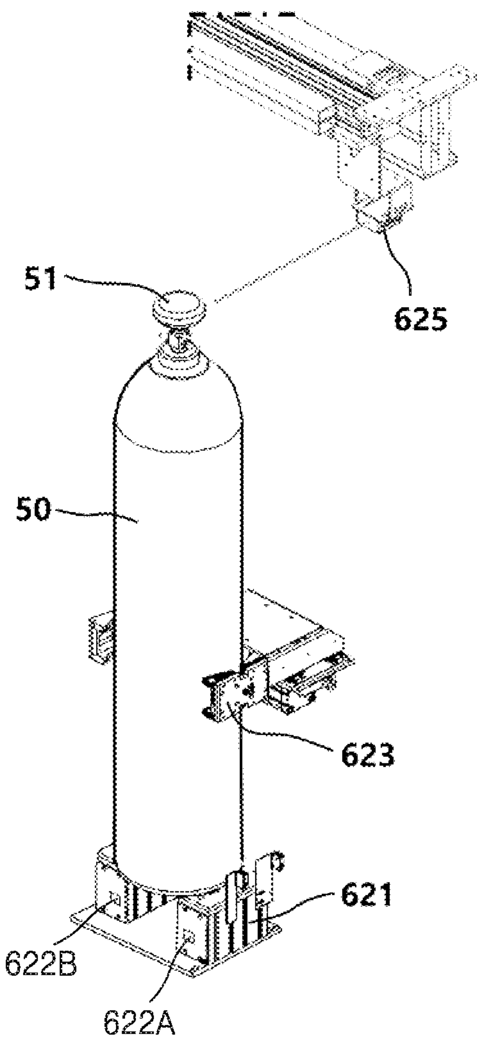
FIG. 13 is a perspective view illustrating a base plate, a gripper, and a barcode reader of a storage queue.

FIG. 12 is a perspective view illustrating a storage queue 600 of a buffer stage 15 according to example embodiments of the inventive concept. FIG. 13 is a perspective view illustrating a base plate 621, a gripper 623, and a barcode reader 625 of the storage queue 600.

Referring to FIGS. 12 and 13 together with FIGS. 1 and 2, the storage queue 600 may be a storage in which the gas container 50 brought in from the loading/unloading stage 11 and/or the gas container 50 in which gas is exhausted from the gas supply cabinet 300 are/is stored. The gas container 50 transferred from the test buffer chamber 130 may be temporarily stored in the storage queue 600 before being transferred to the gas supply cabinet 300. In addition, the gas container 50 in which gas is exhausted in the gas supply cabinet 300 may be temporarily stored in the storage queue 600 before being taken out to the loading/unloading stage 11.

The storage queue 600 may include a frame 610 that provides an internal space in which one or more gas containers 50 may be accommodated. For example, the storage queue 600 frame 610 may provide a plurality of loading ports, and one gas container 50 may be loaded in each of the plurality of loading ports. The storage queue 600 may include one or more sliding doors 620 that operate to automatically open and close the internal space. For example, the storage queue 600 may include a plurality of sliding doors 620, and one loading port of the plurality of loading ports of the storage queue 600 may be opened and closed by any one of the plurality of sliding doors 620. The sliding door 620 may include a safety device that may detect a change in pressure, and the like to detect a collision with the transfer robot 200 or an operator, and quickly control the operation of the sliding door 620 according to the detected result.

The storage queue 600 may include a base plate 621, a gripper 623, and a barcode reader 625.

The base plate 621 of the storage queue 600 may support the bottom of the gas container 50. The base plate 621 may have a structure capable of interfacing with the support structure 214 of the transfer robot 200. The base plate 621 of the storage queue 600 may support both sides of the bottom of the gas container 50, and an opening into which the bottom support structure 215 of the transfer robot 200 may be inserted may be provided in the center of the base plate 621 of the storage queue 600. Sensing plates 622A and/or QR codes 622B sensed by the distance sensor of the transfer robot 200 are attached to both sides of the base plate 621 to help align the transfer robot 200 and the base plate 621.

The gripper 623 of the storage queue 600 may grip the gas container 50 so that the gas container 50 does not fall over. The gripper 623 may be mounted on the inner wall of the storage queue 600. The gripper 623 may perform the full-grip function, the semi-grip function, and the un-grip function as described above. In addition, the gripper 623 may include a load detection sensor capable of detecting whether the gas container 50 is loaded.

The barcode reader 625 may be movably mounted on the frame 610. The barcode reader 625 includes a drive shaft, and may move in the internal space of the storage queue 600 by an actuator. The barcode reader 625 may move in a horizontal and/or vertical direction. One barcode reader 625 may sense an identification tag such as a barcode or a QR code of one or more gas containers 50. The barcode reader 625 senses the identification tag of the gas container 50 to check information of the gas container 50. Movement of the barcode reader 625 may be realized by a pneumatic actuator.

The pneumatic actuator may move the barcode reader 625 between a plurality of loading ports provided in the storage queue 600. The barcode reader 625 reads the QR codes of the gas containers 50 loaded in the plurality of loading ports of the storage queue 600 while moving the plurality of loading ports of the storage queue 600. Proximity sensors for detecting the movement of the barcode reader 625 may be installed at a start position (i.e., a boundary between two neighboring loading ports) and an end position (i.e., a boundary between two neighboring loading ports) of each of a plurality of loading ports provided in the storage queue 600. A stroke section of the pneumatic actuator may be divided into a section between adjacent proximity sensors. The barcode reader 625 attempts to read the QR code of the gas container 50 from the start position to the end position of one loading port of the storage queue 600.

The process of the transfer robot 200 loading the gas container 50 into the loading port of the storage queue 600 is briefly described as follows. When the transfer robot 200 arrives at the target loading port of the storage queue 600, the storage queue 600 opens the sliding door 620 corresponding to a target loading port. The transfer robot 200 adjusts the position of the transfer robot 200 by checking the QR code attached to the base plate 621 of the storage queue 600. The gripper 216 of the transfer robot 200 and the gripper 623 of the storage queue 600 interface to load the gas container 50 into the target loading port of the storage queue 600. When the gas container 50 is loaded into the target loading port of the storage queue 600, the storage queue 600 closes the sliding door 620 corresponding to the target loading port, and drives the barcode reader 625 to check the QR code of the entered gas container 50.

A process of the transfer robot 200 unloading the gas container 50 from the loading port of the storage queue 600 is briefly described as follows. To load the gas container 50 filled with gas into the gas supply cabinet 300 or to take the gas container 50 from which the gas is exhausted into the test buffer chamber 130, the gas container 50 is taken out from the storage queue 600. The storage queue 600 checks the QR code of the gas container 50 to be taken out by driving the barcode reader 625. When the transfer robot 200 arrives at the target port, the storage queue 600 opens the sliding door 620 of the target port. The gripper 216 of the transfer robot 200 and the gripper 623 of the storage queue 600 interface to transfer the gas container 50 to the transfer robot 200. When the gas container 50 is unloaded from the target loading port of the storage queue 600, the storage queue 600 closes the sliding door 620 of the target loading port.

Figure 14:
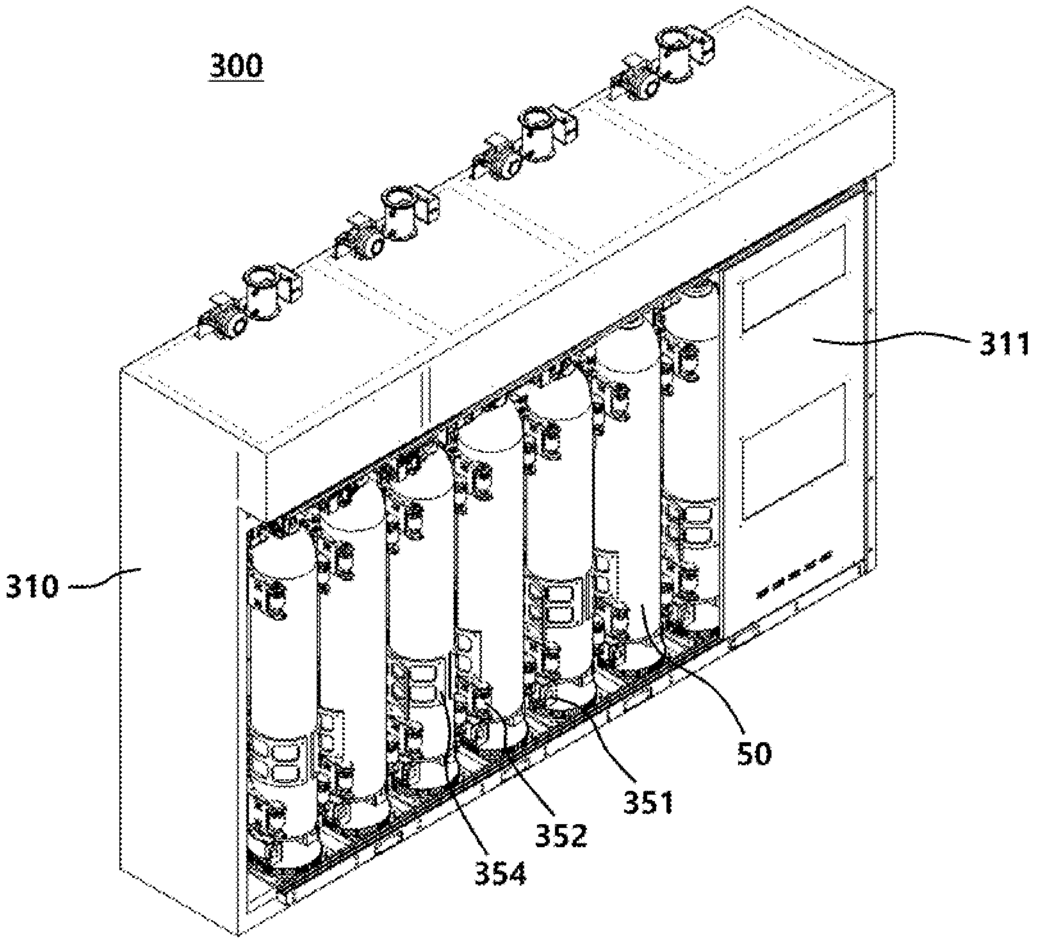
FIG. 14 is a perspective view illustrating a gas supply cabinet of a gas supply stage according to an example embodiment of the inventive concepts.
Figure 15:
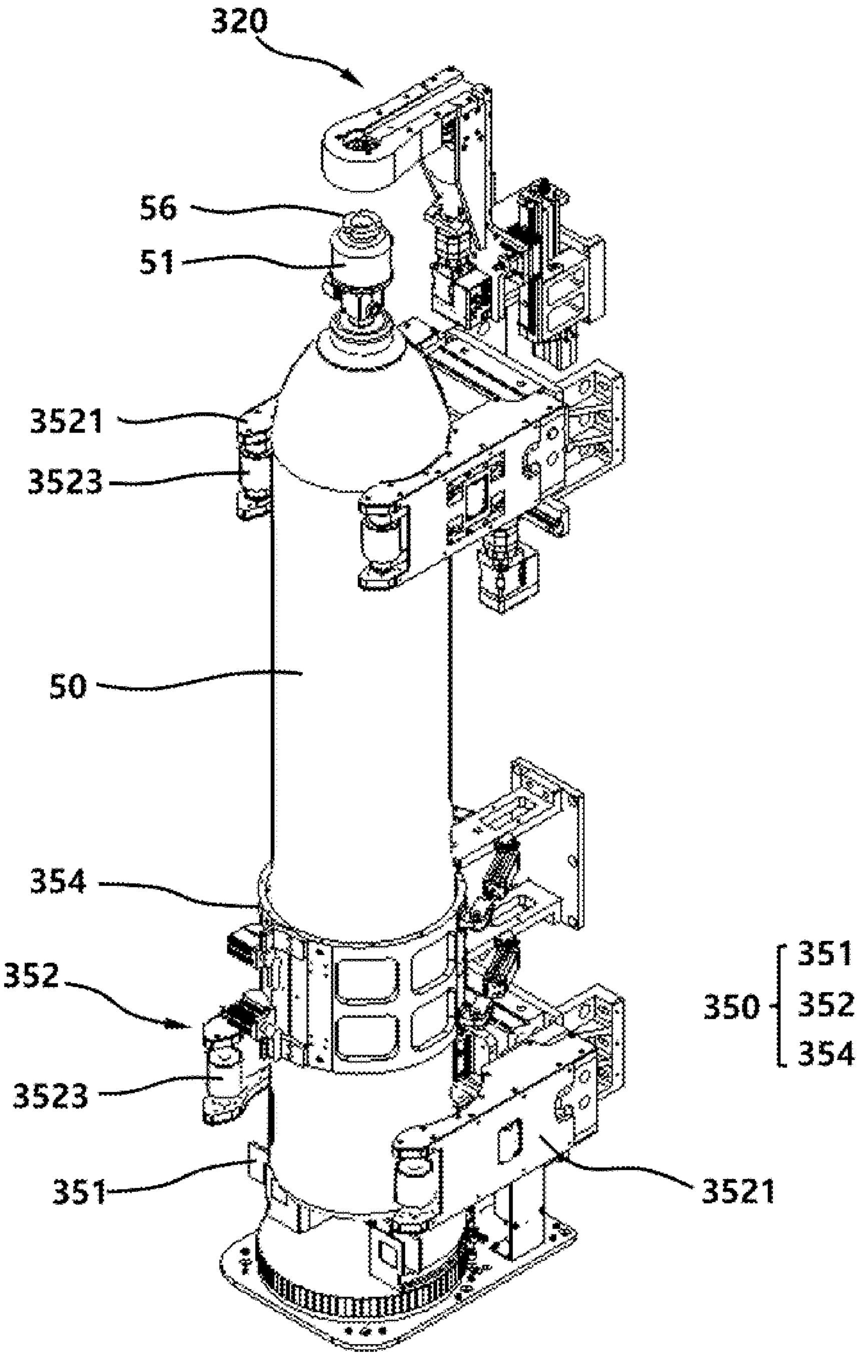
FIG. 15 is a perspective view illustrating a first container support module and a valve operation module of the gas supply cabinet.

FIG. 14 is a perspective view illustrating a gas supply cabinet 300 of a gas supply stage 13 according to example embodiments of the inventive concept. FIG. 15 is a perspective view illustrating the first container support module 350 and the valve operation module 320 of the gas supply cabinet 300.

Figure 25:
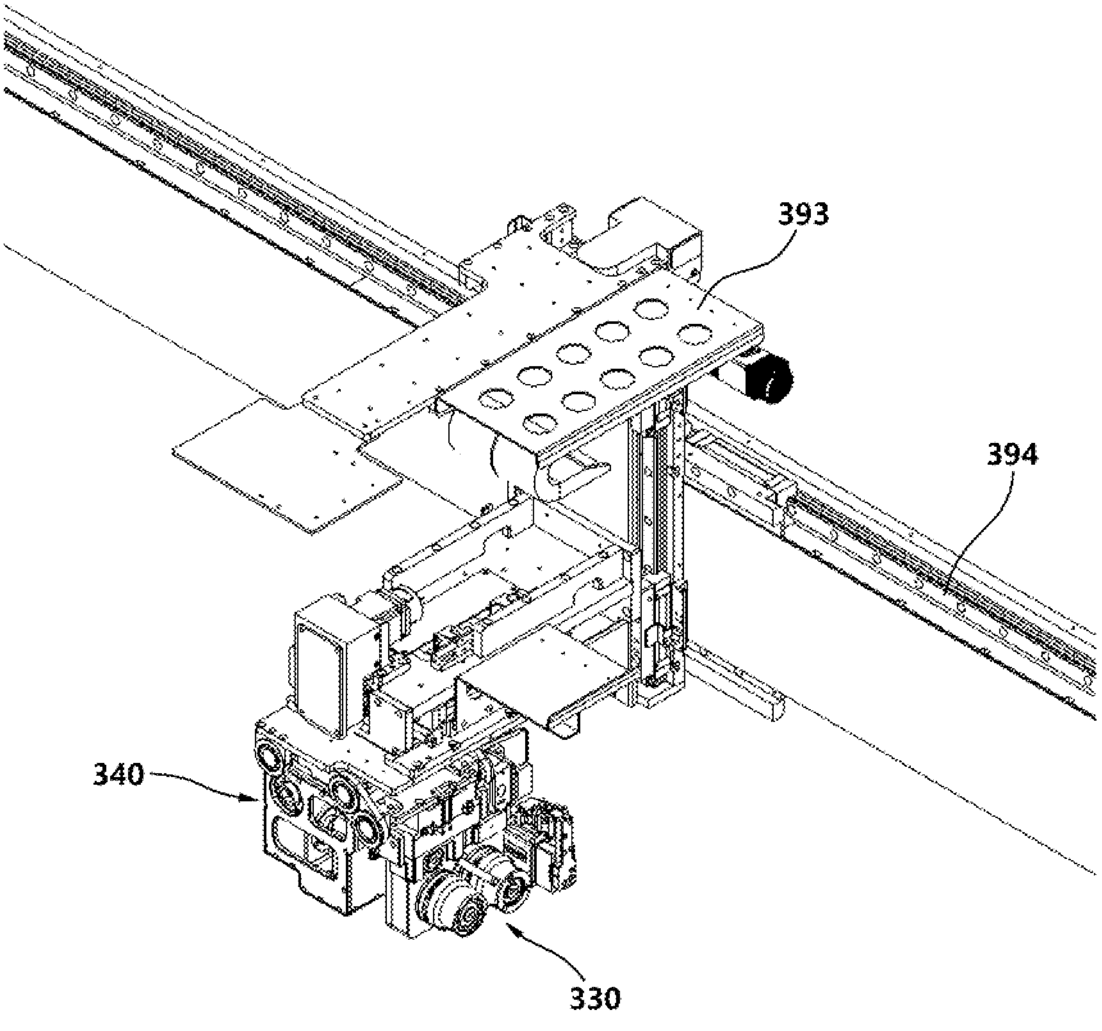
FIG. 25 is a perspective view illustrating a fastening module and a CGA holding module provided in a gas supply cabinet.

Referring to FIGS. 14 and 15 together with FIGS. 1 and 2, the gas supply cabinet 300 may include a cabinet frame 310, a first container support module 350, a valve operation module 320, a Compressed Gas Association (CGA) holding module 330 (see FIG. 25), and a fastening module 340 (see FIG. 25).

The cabinet frame 310 may provide an internal space in which one or more gas containers 50 may be accommodated. For example, the cabinet frame 310 may provide a plurality of loading ports, and one gas container 50 may be loaded in each of the plurality of loading ports. A plurality of gas containers 50 may be arranged in a column in the cabinet frame 310. The cabinet frame 310 may include one or more sliding doors 311 that automatically open and close the internal space. One or more sliding doors 311 may be installed on the front portion of the cabinet frame 310. One or more sliding doors 311 may be driven by an actuator. For example, the cabinet frame 310 may include a plurality of sliding doors 311, and one loading port among the plurality of loading ports of the cabinet frame 310 may be opened and closed by any one of the plurality of sliding doors 311. When the gas container 50 is brought in and out, the sliding door 311 for opening and closing the corresponding loading port may be automatically opened. A guide rail 394 (see FIG. 25) may be installed near the ceiling of the cabinet frame 310. The guide rail 394 may extend linearly in the horizontal direction and may be configured to guide the linear movement of the fastening module 340.

The sliding door 311 may include a safety device that may detect a change in pressure, and the like to detect a collision with the transfer robot 200 or an operator, and quickly control the operation of the sliding door 311 according to the detected result. For example, the sliding door 311 may include sensing means such as a pressure sensor for detecting a collision with the transfer robot 200 or an operator by detecting a change in pressure or the like.

Also, the sliding door 311 may be operated by a pneumatic actuator. By controlling the operating pressure of the pneumatic actuator, the position of the sliding door 311 may be precisely controlled. By controlling the operating pressure of the pneumatic actuator, the sliding door 311 may be stopped at a particular point in the movement path of the sliding door 311. In addition, to quickly stop the sliding door 311 at a particular point in the movement path of the sliding door 311, the sliding door 311 may be further connected to a stopper actuator.

Figure 16:
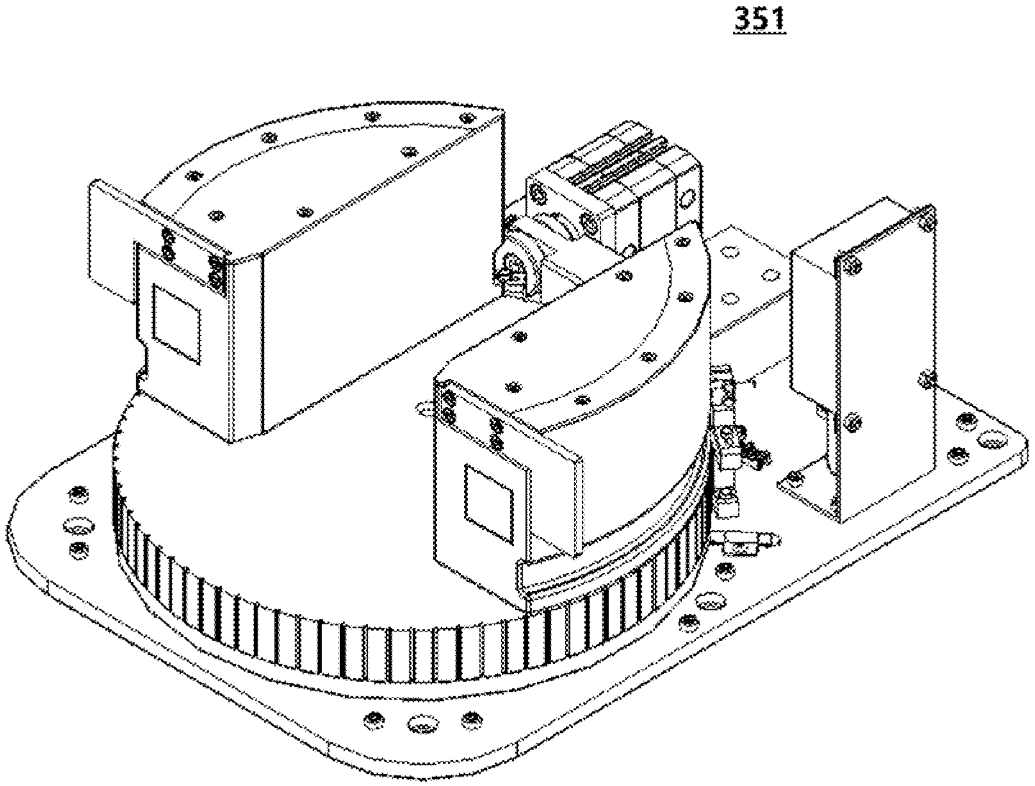
FIG. 16 is a perspective view illustrating the base plate of the first container support module.
Figure 17:
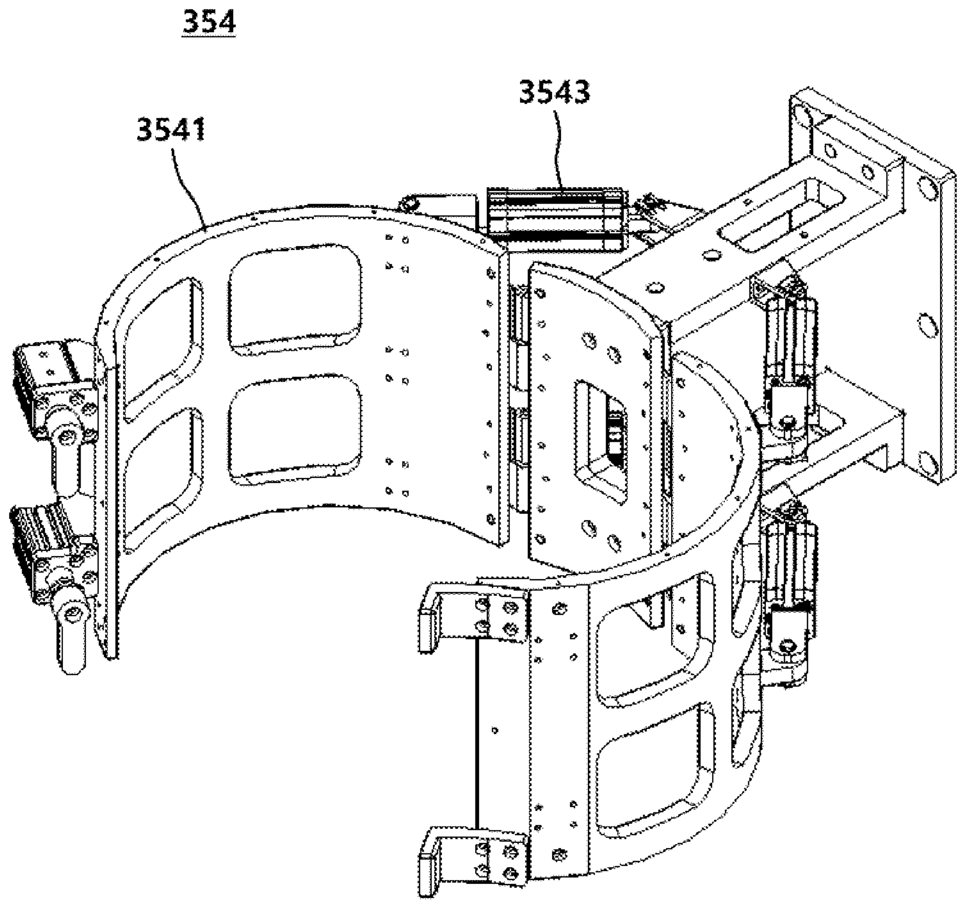
FIG. 17 is a perspective view illustrating a heating jacket mechanism of the first container support module.
Figure 18:
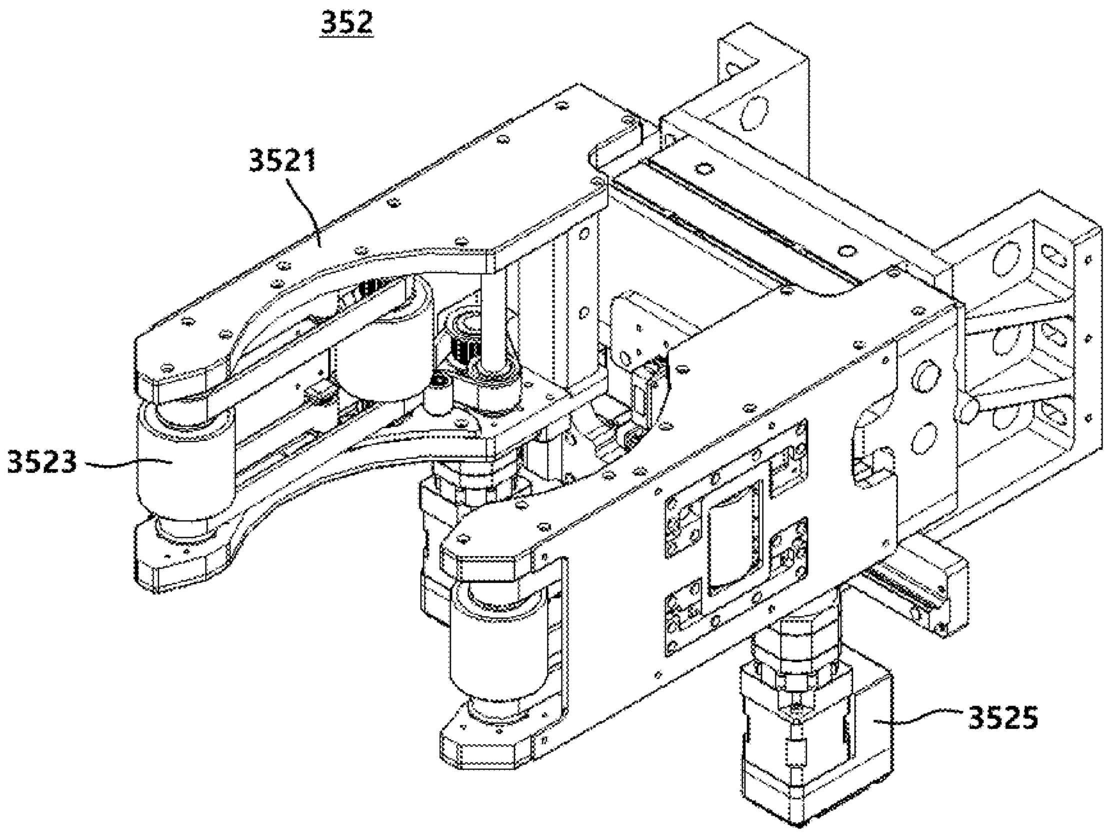
FIG. 18 is a perspective view illustrating a gripper of the first container support module.

FIG. 16 is a perspective view illustrating the base plate 351 of the first container support module 350. FIG. 17 is a perspective view illustrating a heating jacket mechanism 354 of the first container support module 350. FIG. 18 is a perspective view illustrating the gripper 352 of the first container support module 350.

Referring to FIGS. 16 to 18 together with FIGS. 1 and 2, the first container support module 350 may include the base plate 351, the gripper 352, and the heating jacket mechanism 354.

The base plate 351 may support the bottom surface of the gas container 50. The base plate 351 may be arranged on the bottom portion of the cabinet frame 310, and the gas container 50 may be seated on the upper surface of the base plate 351. The base plate 351 may support both side parts of the bottom surface of the gas container 50, and an opening into which the bottom support structure 215 of the transfer robot 200 may be inserted may be formed in the base plate 351. A weight sensor such as a load cell may be provided in the base plate 351. The weight sensor is configured to measure the weight of the gas container 50, and the amount of gas remaining in the gas container 50 may be detected based on the weight of the gas container 50 obtained by the weight sensor. In addition, alignment marks may be further provided on the base plate 351. When the gas container 50 is brought into the first container support module 350 by the transfer robot 200, the transfer robot 200 may align the gas container 50 and the base plate 351 by sensing the alignment mark provided on the base plate 351.

The base plate 351 may be configured to passively rotate. The base plate 351 may passively rotate in association with the rotation of the gas container 50. For example, when the position of the gas container 50 in the rotation direction is detected by the vision sensor 343 of the fastening module 340, the gripper 352 may rotate the gas container 50 so that the rotational position of the gas container 50 is adjusted. At this time, the base plate 351 may be passively rotated in association with the rotation of the gas container 50. In example embodiments, as the base plate 351 includes a rotation locking function, when it is necessary to limit the rotation of the base plate 351 or when the rotation angle of the base plate 351 is out of the allowable range, rotation of the base plate 351 may be restricted by the rotation locking function. In example embodiments, the base plate 351 may be connected to a rotation actuator and configured to actively rotate.

The gripper 352 may grip the gas container 50 accommodated in the cabinet frame 310, thereby preventing the gas container 50 from falling. The first container support module 350 may include one or more grippers 352. For example, the first container support module 350 may include a gripper 352 for gripping the lower portion of the gas container 50 and a gripper 352 for gripping the upper portion of the gas container 50. The gripper 352 may include a pair of gripping arms 3521 and gripping rollers 3523. The gripping arms 3521 are connected to an actuator such as an air cylinder to move. The gripping rollers 3523 may be rotatably installed on the gripping arms 3521, respectively. The gripping rollers 3523 may contact and support the gas container 50. When gripping the gas container 50 using the gripper 352, the gripping rollers 3523 may be in close contact with the outer surface of the gas container 50 to stably grip the gas container 50.

The gripper 352 may perform the full-grip function, the semi-grip function, and the un-grip function as described above. When the gripping arms 3521 are in the full-grip posture, the gripping arms 3521 may be in close contact with the side surface of the gas container 50. When the gripping arms 3521 are in the un-grip posture, the gripping arms 3521 may be sufficiently spaced apart from the gas container 50 to allow the separation of the gas container 50 with respect to the gripper 352. When the gripping arms 3521 are in the semi-grip posture, the gripping arms 3521 may be spaced apart from the gas container 50 by a preset small distance (e.g., between about 5 mm and about 30 mm) to prevent falling of the gas container 50.

The rotational operation of the gripping roller 3523 of the gripping arm 3521 may be controlled by the actuator 3525. The gripping roller 3523 may rotate in a state in contact with the gas container 50 to rotate the gas container 50. For example, when the position of the gas container 50 in the rotation direction is detected by the vision sensor 343 of the fastening module 340, by rotating the gripping roller 3523, the position of the gas container 50 in the rotation direction may be adjusted. In addition, the gripper 352 may include a load detection sensor capable of detecting whether the gas container 50 is loaded.

The heating jacket mechanism 354 may be arranged to surround at least a portion of the outer surface of the gas container 50. The heating jacket mechanism 354 may be configured to heat the gas container 50. The heating jacket mechanism 354 may selectively heat the gas container 50 to vaporize the liquefied gas in the gas container 50. The heating jacket mechanism 354 may include a pair of heating jacket bodies 3541 and an actuator 3543 configured to rotate the pair of heating jacket bodies 3541.

The heating jacket body 3541 may include a heating element such as a heating wire. For example, the heating jacket body 3541 may include an electric resistance type heater. The heating jacket body 3541 may have a form that partially surrounds the outer surface of the gas container 50. The pair of heating jacket bodies 3541 may be configured to rotate with respect to a vertical direction as a rotation axis by an actuator 3543. The pair of heating jacket bodies 3541 may be moved to be closed or opened by an actuator 3543. For example, the pair of heating jacket bodies 3541 may switch between a closed position and an open portion. When the pair of heating jacket bodies 3541 are in the closed position, the pair of heating jacket bodies 3541 are in contact with the gas container 50. When the pair of heating jacket bodies 3541 are in the open position, the pair of heating jacket bodies 3541 are spaced apart from the gas container 50 so that the carrying-in and carrying-out of the gas container 50 are allowed. When the pair of heating jacket bodies 3541 are in the closed position, the pair of heating jacket bodies 3541 may be in close contact with the gas container 50 by the actuator 3543. When the pair of heating jacket bodies 3541 are in the closed position, the gas container 50 may be heated by driving a heating element in the pair of heating jacket bodies 3541.

Figure 19A:
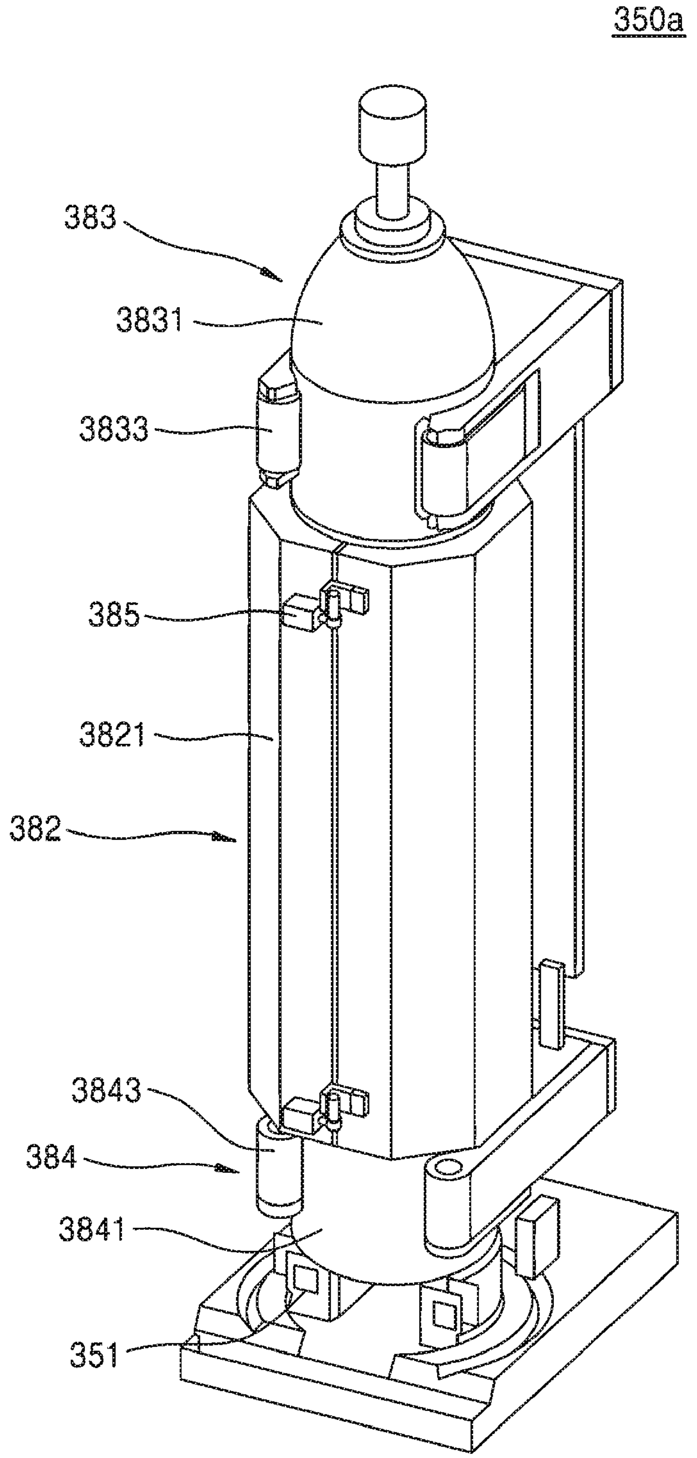
FIG. 19A is a perspective view illustrating a second container support module of the gas supply cabinet.
Figure 19B:
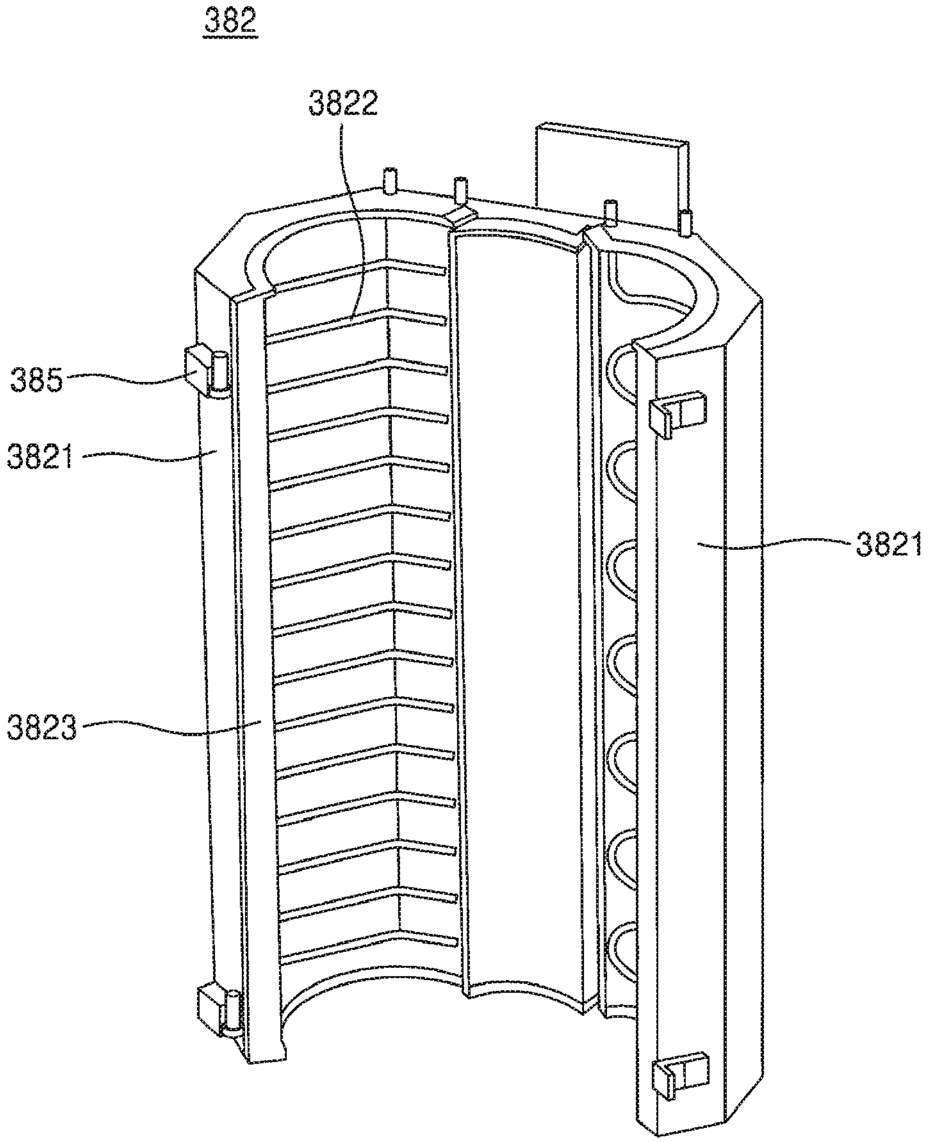
FIG. 19B is a perspective view illustrating a cooling jacket mechanism of the second container support module of FIG. 19A.

FIG. 19A is a perspective view illustrating a second container support module 350*a* of the gas supply cabinet 300. FIG. 19B is a perspective view illustrating the cooling jacket mechanism 382 of the second container support module 350*a* of FIG. 19A.

Unlike the first container support module 350 shown in FIGS. 15 to 18, the second container support module 350*a* illustrated in FIGS. 19A and 19B may be substantially similar except that it includes a cooling jacket mechanism 382 configured to cool the gas container 50 in place of the heating jacket mechanism 354. Hereinafter, repeated descriptions will be omitted or simplified.

Referring to FIGS. 19A and 19B together with FIGS. 1, 2, and 14, the second container support module 350*a* may include a base plate 351 on which the gas container 50 is mounted, a cooling jacket mechanism 382, an upper gripper 383, and a lower gripper 384.

The cooling jacket mechanism 382 may be arranged to surround at least a portion of the gas container 50. The cooling jacket mechanism 382 may cool the gas container 50 so that the temperature of the gas charged in the gas container 50 is maintained within a preset target temperature range. In particular, when the flammable gas is filled in the gas container 50, the cooling jacket mechanism 382 cools the gas container 50 to a preset temperature or less, thereby maintaining the temperature of the gas in the gas container 50 at an appropriate temperature required for process conditions.

The cooling jacket mechanism 382 may include a pair of cooling jacket bodies 3821 and an actuator configured to rotate the pair of cooling jacket bodies 3821. The cooling jacket body 3821 may include, for example, a heat insulating material. The cooling jacket body 3821 may include a cooling coil 3822 through which a refrigerant flows. The cooling jacket mechanism 382 may cool the gas container 50 by circulating the refrigerant through the cooling coil 3822 provided in the cooling jacket body 3821. For example, the second container support module 350*a* may include a device for performing a cooling cycle for circulating the refrigerant to the cooling coil 3822. For example, the second container support module 350*a* includes a cooling module configured to perform a cooling cycle, which includes a compressor, a condenser, an expansion valve, and an evaporator, and the cooling coil 3822 may function as an evaporator of a refrigerant cycle.

The rotational operation of the pair of cooling jacket bodies 3821 may be substantially the same as or similar to the rotational operation of the pair of heating jacket bodies 3541 (see FIG. 17) described above. For example, the pair of cooling jacket bodies 3821 may switch between a closed position and an open position. When the pair of cooling jacket bodies 3821 are in the closed position, the pair of cooling jacket bodies 3821 are in contact with the gas container 50. When the pair of cooling jacket bodies 3821 are in the open position, the pair of cooling jacket bodies 3821 are spaced apart from the gas container 50 so that the carrying-in and carrying-out of the gas container 50 are allowed. When the pair of cooling jacket bodies 3821 are in the closed position, the gas container 50 may be cooled by circulating the refrigerant through the cooling coils 3822 of the pair of cooling jacket bodies 3821.

The cooling jacket mechanism 382 may include a locking device 385 for engaging the pair of cooling jacket bodies 3821 when the pair of cooling jacket bodies 3821 are in the closed position. The locking device 385 may include a first segment provided in any one of the pair of cooling jacket bodies 3821, and a second segment provided on the other of the pair of cooling jacket bodies 3821 to be engaged with the first segment. For example, when the pair of cooling jacket bodies 3821 are switched from the open position to the closed position by the actuator, ends of the pair of cooling jacket bodies 3821 may be positioned to contact each other. At this time, since the first segment of the locking device 385 is fastened to the second segment, the pair of cooling jacket bodies 3821 may be firmly fixed in a closed state.

In example embodiments, the ends of the pair of cooling jacket bodies 3821 may be respectively provided with packings 3823. When the pair of cooling jacket bodies 3821 are in the closed position, the packings 3823 installed at the ends of the pair of cooling jacket bodies 3821 are in close contact with each other, thereby preventing the cold air of the internal space surrounded by the pair of cooling jacket bodies 3821 from escaping to the outside. In addition, the packing 3823 may also be arranged on each of the upper edge of the pair of cooling jacket bodies 3821 in contact with the upper gripper 383 and the lower edge of the pair of cooling jacket bodies 3821 in contact with the lower gripper 384. When the pair of cooling jacket bodies 3821 are in the closed position, the packing 3823 arranged on the upper edge of the pair of cooling jacket bodies 3821 may be in close contact with the upper gripper 383, and the packing 3823 arranged on the lower edge of the pair of cooling jacket bodies 3821 may be in close contact with the lower gripper 384.

The upper gripper 383 may grip the gas container 50 seated on the base plate 351. The upper gripper 383 is arranged on the cooling jacket mechanism 382, and may surround the side of the gas container 50. The upper gripper 383 may include a pair of upper gripping bodies 3831. The pair of upper gripping bodies 3831 may be connected to an actuator to move. The upper gripper 383 may perform the full-grip function, the semi-grip function, and the un-grip function as described above. When the upper gripping bodies 3831 are in the full-grip posture, the upper gripping bodies 3831 may be in close contact with the side surface of the gas container 50. When the upper gripping bodies 3831 are in the un-grip posture, the upper gripping bodies 3831 may be sufficiently spaced apart from the gas container 50 to allow the release of the gas container 50 with respect to the upper gripper 383. When the upper gripping bodies 3831 are in the semi-grip posture, the upper gripping bodies 3831 may be spaced apart from the gas container 50 by a preset distance (e.g., between about 5 mm and about 30 mm) to prevent falling of the gas container 50.

When the surface of the gas container 50 surrounded by the cooling jacket mechanism 382 is defined as the first side surface, the upper gripping bodies 3831 may surround the surface of the gas container 50 above the first side surface of the gas container 50. The upper gripping bodies 3831 may include, for example, an insulating material.

In example embodiments, the upper gripper 383 may include an upper gripping roller 3833 arranged on the upper gripping body 3831. The upper gripping roller 3833 may be mounted on the upper gripping body 3831. When the pair of upper gripping bodies 3831 are in the full-grip posture, the upper gripping roller 3833 may be installed on the upper gripping body 3831 to be in close contact with the gas container 50. The upper gripping roller 3833 may be connected to an actuator and configured to rotate (or roll). When the pair of upper gripping bodies 3831 are in a full-grip posture, the upper gripping roller 3833 rotates in a first rotational direction or a second rotational direction opposite thereto in a state in close contact with the gas container 50, thereby rotating the gas container 50. The upper gripping roller 3833 rotates the gas container 50 to adjust a position of the gas container 50 in the rotation direction. In addition, the upper gripper 383 may include a load detection sensor capable of detecting whether the gas container 50 is loaded.

In addition, the upper gripper 383 may include an air blower (or, an air injector) that may remove the condensation generated on the surface of the gas container 50. The air blower may spray air to the surface of the gas container 50 to remove condensation on the surface of the gas container 50. When the cooling jacket mechanism 382 cools the gas container 50, condensation may occur on the surface of the gas container 50, and condensation formed on the surface of the gas container 50 weakens the frictional force between the upper gripping roller 3833 and the gas container 50, and the weakening of the friction force between the upper gripping roller 3833 and the gas container 50 makes it difficult to rotate the gas container 50 by the upper gripping roller 3833. The air blower removes condensation formed on the surface of the gas container 50 to prevent the rotation of the gas container 50 from being disturbed by the upper gripping roller 3833 due to condensation.

The lower gripper 384 may grip the gas container 50 seated on the base plate 351. The lower gripper 384 is arranged below the cooling jacket mechanism 382, and may surround the side of the gas container 50. The lower gripper 384 may include a pair of lower gripping bodies 3841, and the pair of lower gripping bodies 3841 may be connected to an actuator to move. The lower gripper 384 may perform the full-grip function, the semi-grip function, and the un-grip function as described above. When the lower gripping bodies 3841 are in the full-grip posture, the lower gripping bodies 3841 may be in close contact with the side of the gas container 50. When the lower gripping bodies 3841 are in the un-grip posture, the lower gripping bodies 3841 may be sufficiently spaced apart from the gas container 50 to allow the release of the gas container 50 with respect to the lower gripper 384. When the lower gripping bodies 3841 are in the semi-grip posture, the lower gripping bodies 3841 may be spaced apart from the gas container 50 by a preset small distance (e.g., between about 5 mm and about 30 mm) to prevent falling of the gas container 50.

When the surface of the gas container 50 surrounded by the cooling jacket mechanism 382 is defined as the first side surface, the lower gripping bodies 3841 may surround the surface of the gas container 50 below the first side surface of the gas container 50. The lower gripping bodies 3841 may include, for example, an insulating material.

In example embodiments, the entire side of the gas container 50 may be covered by the lower gripping bodies 3841 of the lower gripper 384, the cooling jacket mechanism 382, and the upper gripping bodies 3831 of the upper gripper 383. In example embodiments, the lower gripper 384, the cooling jacket mechanism 382, and the upper gripper 383 may be configured to cover the entire outer surface of the gas container 50, except for the valve structure 51.

In example embodiments, the lower gripper 384 may include a lower gripping roller 3843 arranged on the lower gripping body 3841. The lower gripping roller 3843 may be mounted on the lower gripping body 3841. When the pair of lower gripping bodies 3841 are in the full-grip posture, the lower gripping roller 3843 may be installed on the lower gripping body 3841 to be in close contact with the gas container 50. The lower gripping roller 3843 may be connected to an actuator and configured to rotate (or roll). When the pair of lower gripping bodies 3841 are in the full-grip posture, the lower gripping roller 3843 rotates in a first rotational direction or a second rotational direction opposite to the first rotational direction in a state in close contact with the gas container 50, thereby rotating the gas container 50. In addition, the lower gripper 384 may include a load detection sensor capable of detecting whether the gas container 50 is loaded, and an air blower (or, an air injector) configured to spray air to the surface of the gas container 50.

In some example embodiments, a first container support module 350 (see FIG. 15) including a heating jacket mechanism 354 (see FIG. 15) is arranged in at least one of the plurality of gas supply cabinets 300 provided in the gas supply stage 13, and a second container support module 350*a* including a cooling jacket mechanism 382 may be arranged in another one of the plurality of gas supply cabinets 300. In some example embodiments, a first container support module 350 (see FIG. 15) including a heating jacket mechanism 354 (see FIG. 15) and a second container support module 350*a* including a cooling jacket mechanism 382 may be arranged in one gas supply cabinet 300.

Figure 20:
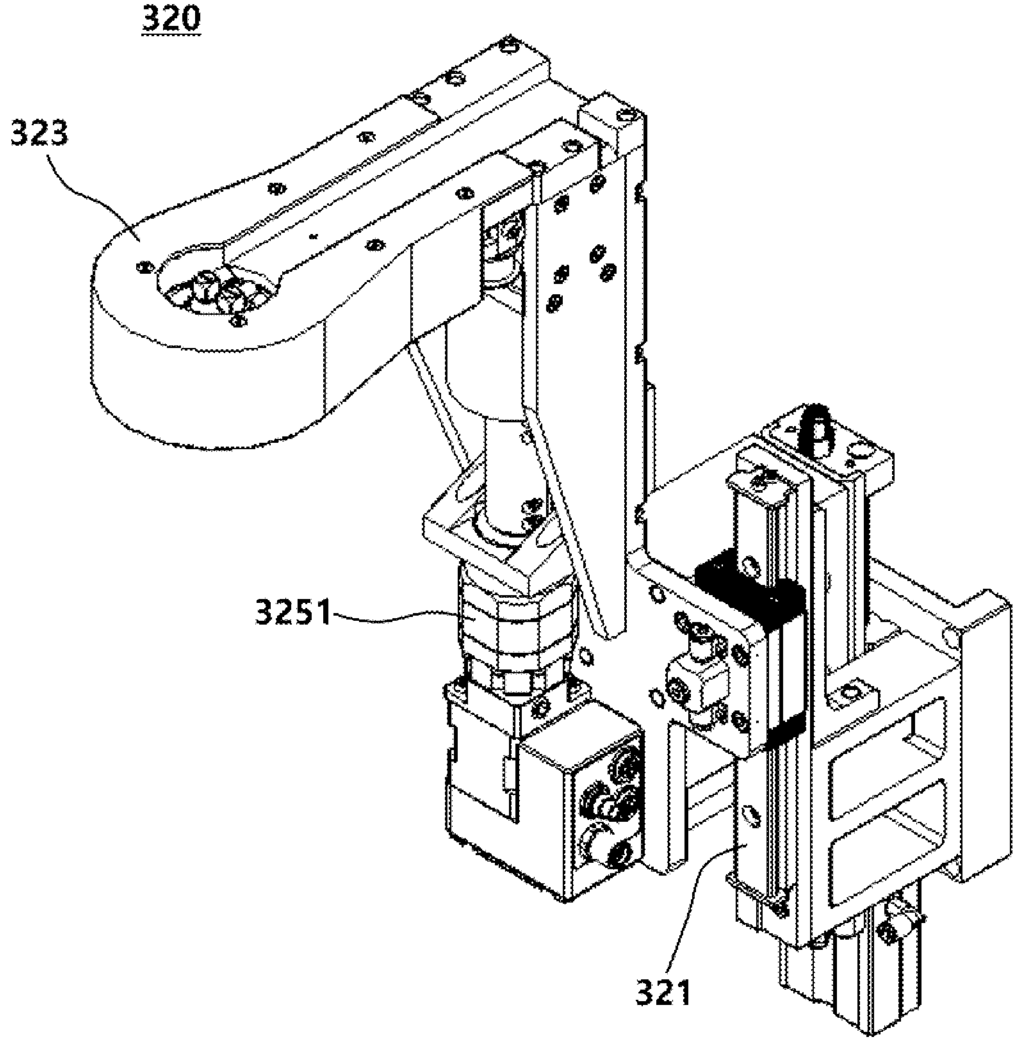
FIGS. 20 and 21 are perspective views illustrating a valve operation module of a gas supply cabinet.
Figure 21:
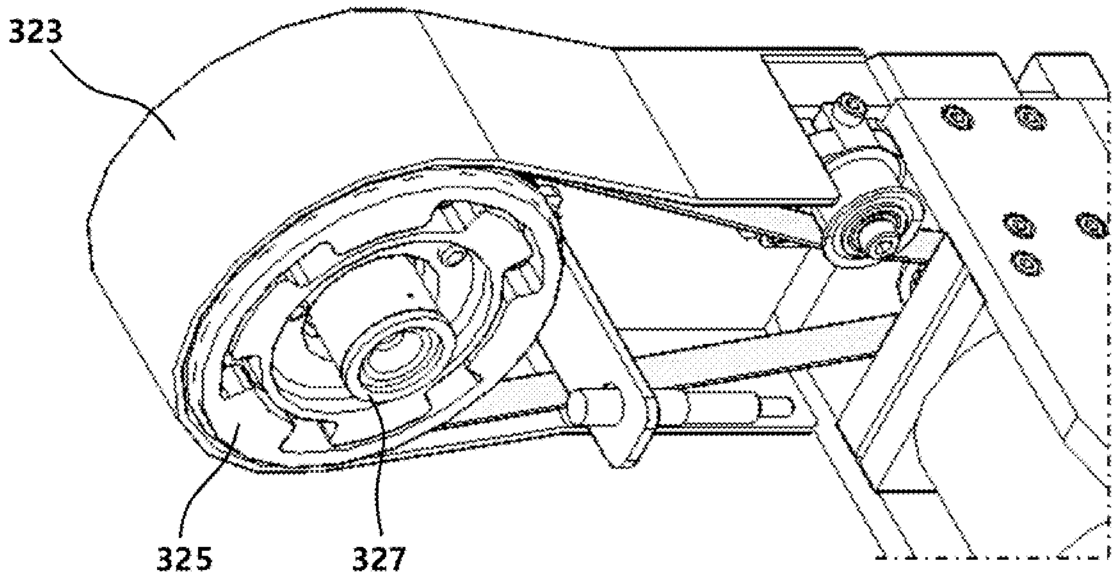
Figure 22:
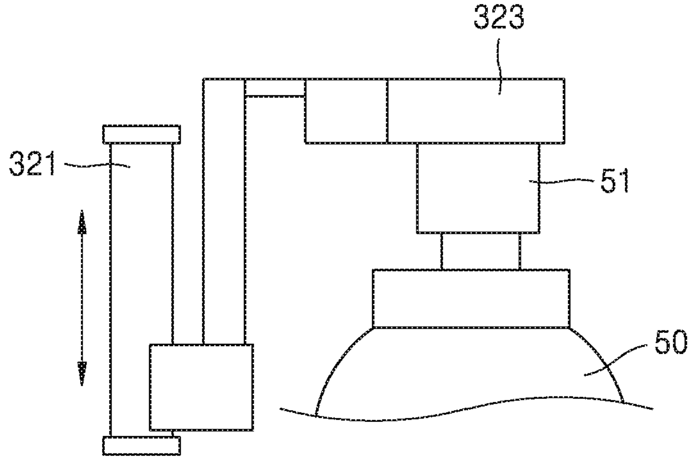
FIG. 22 is a side view schematically illustrating a state in which the valve operation module is docked to a valve structure of the gas container.

FIGS. 20 and 21 are perspective views illustrating the valve operation module 320 of the gas supply cabinet 300. FIG. 22 is a side view schematically illustrating a state in which the valve operation module 320 is docked to the valve structure 51 of the gas container 50.

Referring to FIGS. 20 to 22 together with FIGS. 1, 2, 14, and 15, the valve operation module 320 may open and close the valve structure 51 by operating the valve structure 51 of the gas container 50. The valve operation module 320 is installed in each loading port of the gas supply cabinet 300. The number of valve operation modules 320 may be the same as the number of gas containers 50 that may be accommodated in the cabinet frame 310. Each valve operation module 320 may be in charge of opening and closing the valve structure 51 of the corresponding one gas container 50.

The valve operation module 320 may operate the valve structure 51 with any one of an open position allowing the release of gas through the valve nozzle 53, a closed position in which the release of gas through the valve nozzle 53 is blocked, an open position in which the locking handle 56 is positioned in the release position to allow release of gas through the valve nozzle 53, and a forced closing position in which the locking handle 56 is positioned in the restrict position to block the release of gas through the valve nozzle 53.

The valve operation module 320 may include a guide rail 321 extending in a vertical direction, and a moving body 323 movably mounted on the guide rail 321. The moving body 323 may be configured to move up and down along the guide rail 321. For example, the moving body 323 is connected to an actuator, and may be configured to move up and down along the guide rail 321 by the actuator. A vertical position of the moving body 323 may be adjusted by an actuator.

The moving body 323 may move between a docking position in contact with or adjacent to the valve structure 51 of the gas container 50 and a standby position spaced upward from the docking position. The docking position of the moving body 323 may be a position at which the moving body 323 is docked to the valve structure 51 of the gas container 50. When the moving body 323 is in the docking position, the operation of the valve structure 51 using the valve operation module 320 may be performed. The standby position of the moving body 323 may be a position to avoid interference with other components or the gas container 50 during the carrying-in and carrying-out of the gas container 50 or during the operation of the fastening module 340.

The moving body 323 may include a pneumatic connection part 327 for providing pneumatic pressure to the pneumatic connection part 55 of the valve structure 51. The pneumatic connection part 327 of the moving body 323 may include a flow path through which pneumatic pressure is provided. When the moving body 323 is in the docked position, the pneumatic connection part 327 of the moving body 323 may be connected to the pneumatic connection part 55 of the valve structure 51. The pneumatic pressure generated by the pneumatic pump of the valve operation module 320 may be provided to the pneumatic line in the valve structure 51 through the pneumatic connection part 327 of the moving body 323 and the pneumatic connection part 55 of the valve structure 51. The diaphragm of the valve structure 51 operates by the pneumatic pressure provided from the pneumatic pump of the valve operation module 320 so that the diaphragm opens or closes the gas flow path in the valve structure 51. For example, when externally provided pneumatic pressure acts on the diaphragm, the diaphragm closes the gas flow path in the valve structure 51 to put the valve structure 51 in the closed state. When the pneumatic connection part 327 of the moving body 323 and the pneumatic connection part 55 of the valve structure 51 are interconnected, the valve operation module 320 may control the pneumatic supply for the valve structure 51 to adjust the opening and closing of the valve structure 51.

A fitting may be installed at an end of the pneumatic connection part 327 of the moving body 323 and/or at an end of the pneumatic connection part 55 of the valve structure 51. The fitting provided on the moving body 323 and/or the valve structure 51 is designed to have a certain degree of freedom with respect to the horizontal direction to compensate for misalignment along the horizontal direction between the pneumatic connection part 327 of the moving body 323 and the pneumatic connection part 55 of the valve structure 51. In addition, to prevent the moving body 323 from being pushed by the repulsive force generated when the valve operation module 320 provides pneumatic pressure to the valve structure 51 of the gas container 50, the fitting provided on the moving body 323 and/or the valve structure 51 may include a locking device that blocks separation of the moving body 323 and the valve structure 51 by the repulsive force.

The valve operation module 320 may include an actuation lever 325 that engages a locking handle 56 of the valve structure 51 and is configured to rotate the locking handle 56. The actuation lever 325 may be configured to rotate the locking handle 56 between the release position and the restrict position. As described above, when the locking handle 56 is in the restrict position limiting the movement of the diaphragm, the valve structure 51 is placed in a forced closing state to limit gas release through the valve nozzle 53 of the valve structure 51. When the locking handle 56 is in the release position allowing the movement of the diaphragm, the opening and closing of the valve structure 51 may be determined by pneumatic pressure provided through the pneumatic connection part 327 of the moving body 323.

The actuation lever 325 is provided to the moving body 323, and may be rotated by the actuator 3251. When the moving body 323 is in the docking position, the actuation lever 325 is positioned to engage the locking handle 56. When the actuation lever 325 is engaged with the locking handle 56, as the actuation lever 325 is rotated by the actuator 3251, the locking handle 56 engaged with the actuation lever 325 rotates between the release position and the restrict position.

A clutch device capable of connecting or separating power transmission between the actuation lever 325 and the actuator 3251 may be installed between the actuation lever 325 and the actuator 3251. While the actuation lever 325 of the valve operation module 320 is engaged with the locking handle 56 of the valve structure 51, when rotating the gas container 50 for an operation such as alignment of the gas container 50, the locking handle 56 may be unintentionally rotated to the release position by being pressed by the actuation lever 325 connected to the actuator 3251 in an inactive state. To prevent unintentional rotation of the locking handle 56, when the gas container 50 rotates, the clutch device may separate power transmission between the actuation lever 325 and the actuator 3251. When power transmission is separated between the actuation lever 325 and the actuator 3251, the actuation lever 325 becomes a freely rotatable state regardless of the driving state of the actuator 3251, and during the rotation of the gas container 50, the locking handle 56 is not rotated to the release position by the actuation lever 325.

Figure 23:
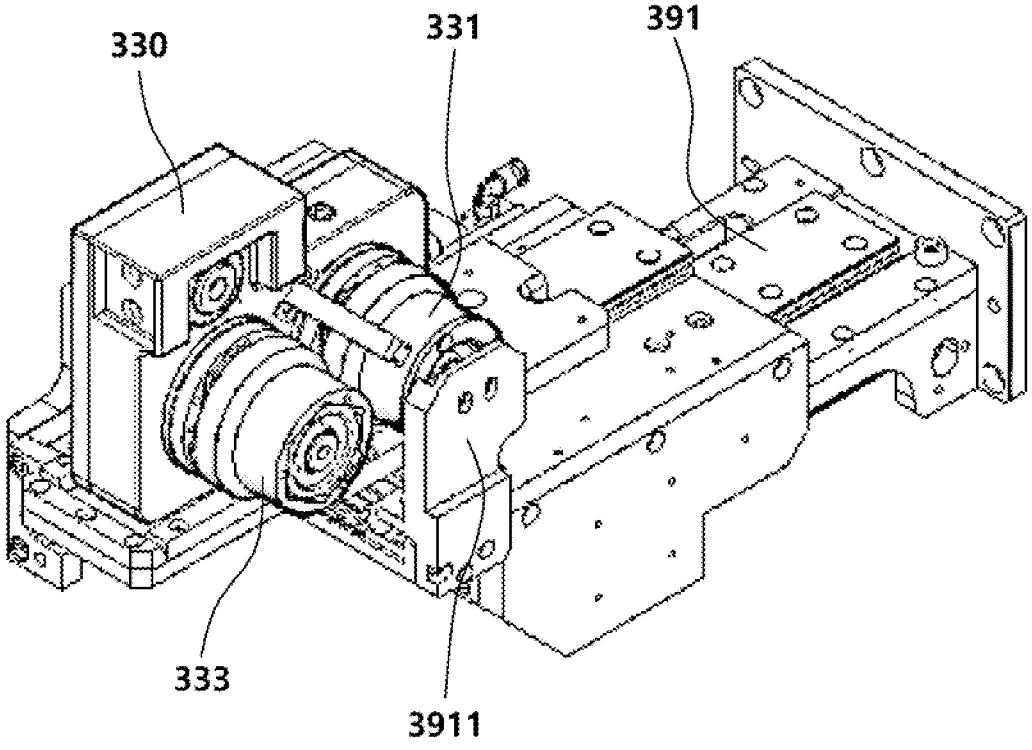
FIG. 23 is a perspective view illustrating a state in which a CGA holding module is mounted on a shelf.
Figure 24:
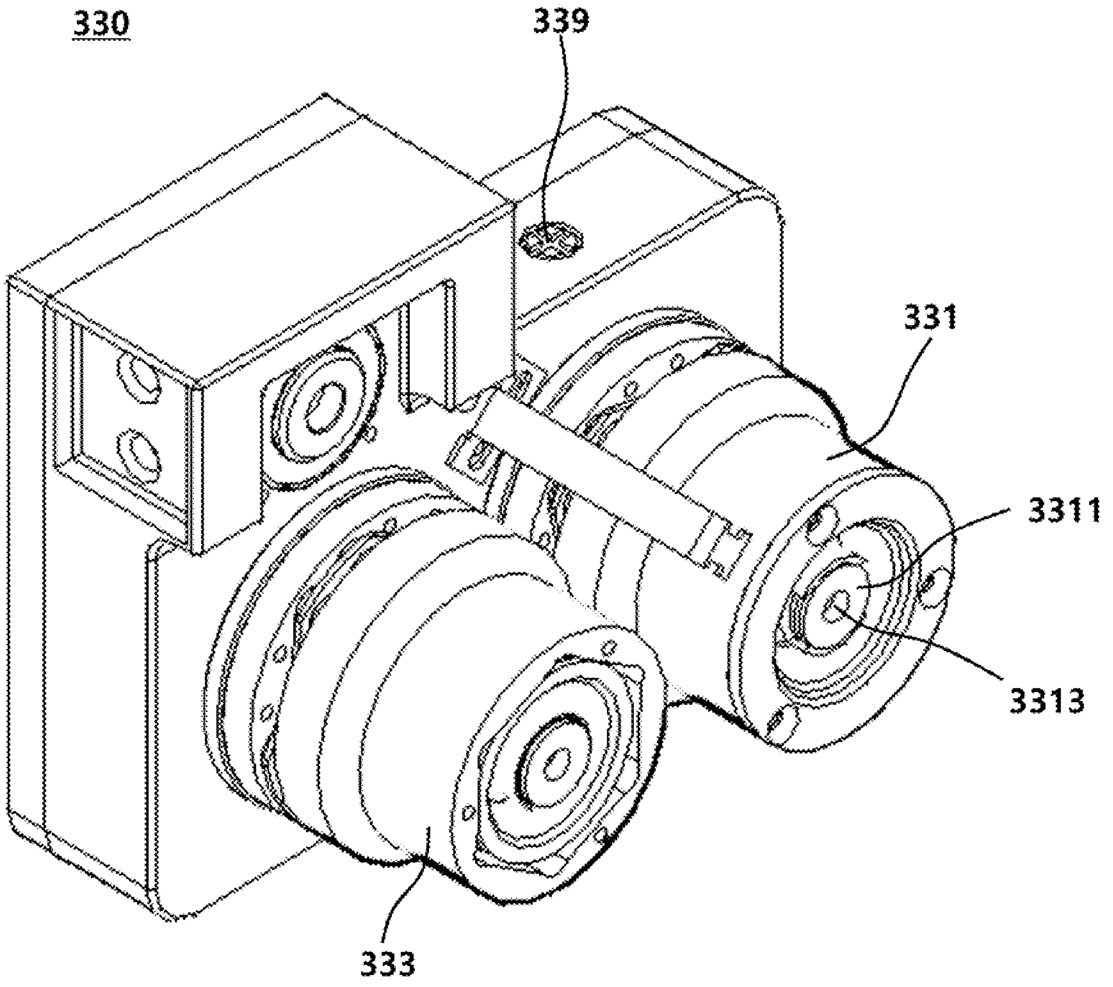
FIG. 24 is a perspective view of a CGA holding module.

FIG. 23 is a perspective view illustrating a state in which the CGA holding module 330 is mounted on the shelf 391. FIG. 24 is a perspective view of the CGA holding module 330.

Referring to FIGS. 23 and 24 together with FIGS. 1, 2, 14, and 15, the CGA holding module 330 may include a connector holder 331 and an end cap holder 333. The CGA holding module 330 is installed in each loading port of the gas supply cabinet 300. The number of CGA holding modules 330 may be the same as the maximum number of gas containers 50 that can be accommodated in the cabinet frame 310. The CGA holding module 330 may be detachably mounted to the plug 3911 of the shelf 391 installed on the inner wall of the cabinet frame 310. The CGA holding module 330 may be moved to an appropriate position by the fastening module 340.

The connector holder 331 may include a gas nozzle 3313 communicating with a flow path of the valve nozzle 53 of the valve structure 51. The gas nozzle 3313 may have a flow path through which gas flows, and may be connected to a gas connection pipe outside the gas supply cabinet 300. When the connector holder 331 is fastened to the valve nozzle 53 of the valve structure 51, the gas discharged through the valve nozzle 53 may be provided to a semiconductor manufacturing facility where the gas is consumed through the gas nozzle 3313 of the connector holder 331 and a gas connection pipe outside the gas supply cabinet 300.

As the connector holder 331 is fastened to and disconnected from the valve structure 51, the valve nozzle 53 and the gas nozzle 3313 of the valve structure 51 may communicate with each other or may be separated. A nut mechanism 3311 coupled to and disconnected from the valve nozzle 53 may be provided at an end of the connector holder 331. The nut mechanism 3311 may be rotated by power provided from the outside, and may be coupled to or separated from the valve nozzle 53. The nut mechanism 3311 may include a gas nozzle 3313. When the nut mechanism 3311 is fastened to the valve nozzle 53, the gas nozzle 3313 of the connector holder 331 and the outlet of the valve nozzle 53 may communicate. The connector holder 331 may perform a fastening and detaching operation between the valve nozzle 53 of the valve structure 51 and the gas nozzle 3313 of the connector holder 331.

To perform a fastening operation between the valve nozzle 53 of the valve structure 51 and the gas nozzle 3313 of the connector holder 331, an operation of aligning the connector holder 331 and the valve nozzle 53 in a straight line, an operation of moving the connector holder 331 so that the connector holder 331 engages the valve nozzle 53, and an operation of fastening the nut mechanism 3311 to the valve nozzle 53 by rotating the nut mechanism 3311 of the connector holder 331 in the fastening rotation direction may be sequentially performed. To perform a separation operation between the valve nozzle 53 of the valve structure 51 and the gas nozzle 3313 of the connector holder 331, an operation of separating the nut mechanism 3311 from the valve nozzle 53 by rotating the nut mechanism 3311 in the opposite direction to the fastening direction and an operation of moving the connector holder 331 in a direction away from the valve nozzle 53 may be sequentially performed. The connector holder 331 is designed to have a degree of freedom with respect to the linear movement direction of the connector holder 331 for fastening between the connector holder 331 and the valve nozzle 53 and the direction inclined to the linear movement direction, so that positional misalignment between the connector holder 331 and the valve nozzle 53 may be compensated.

The end cap holder 333 may perform an end cap fastening operation for fastening the end cap 59 to the valve nozzle 53 and an end cap separation operation for separating the end cap 59 from the valve nozzle 53. The end cap fastening operation may include fastening the end cap 59 to the valve nozzle 53 so that the outlet of the valve nozzle 53 is closed. The end cap separation operation may include separating the end cap 59 from the valve nozzle 53 by rotating the end cap 59 in the opposite direction to the fastening direction so that the outlet of the valve nozzle 53 is opened.

To perform a separation operation on the end cap 59, the end cap holder 333 may sequentially perform an operation of gripping the end cap 59 by approaching the end cap 59 fastened to the valve nozzle 53, and an operation of separating the end cap 59 from the valve nozzle 53 by rotating the end cap 59 in a gripped state. The end cap holder 333 may hold the end cap 59 separated from the valve nozzle 53 by gripping the end cap 59. In addition, to perform a fastening operation for the end cap 59, an operation of aligning the end cap 59 and the valve nozzle 53 gripped by the end cap holder 333 in a straight line, an operation of moving the end cap 59 so that the end cap 59 engages the valve nozzle 53, and an operation of fastening the end cap 59 to the valve nozzle 53 by rotating the end cap 59 in the fastening direction may be sequentially performed. The end cap holder 333 is designed to have a degree of freedom in a linear movement direction of the end cap holder 333 for fastening between the end cap holder 333 and the valve nozzle 53 and a direction inclined to the linear movement direction, so that positional misalignment between the connector holder 331 and the valve nozzle 53 may be compensated.

Figure 26:
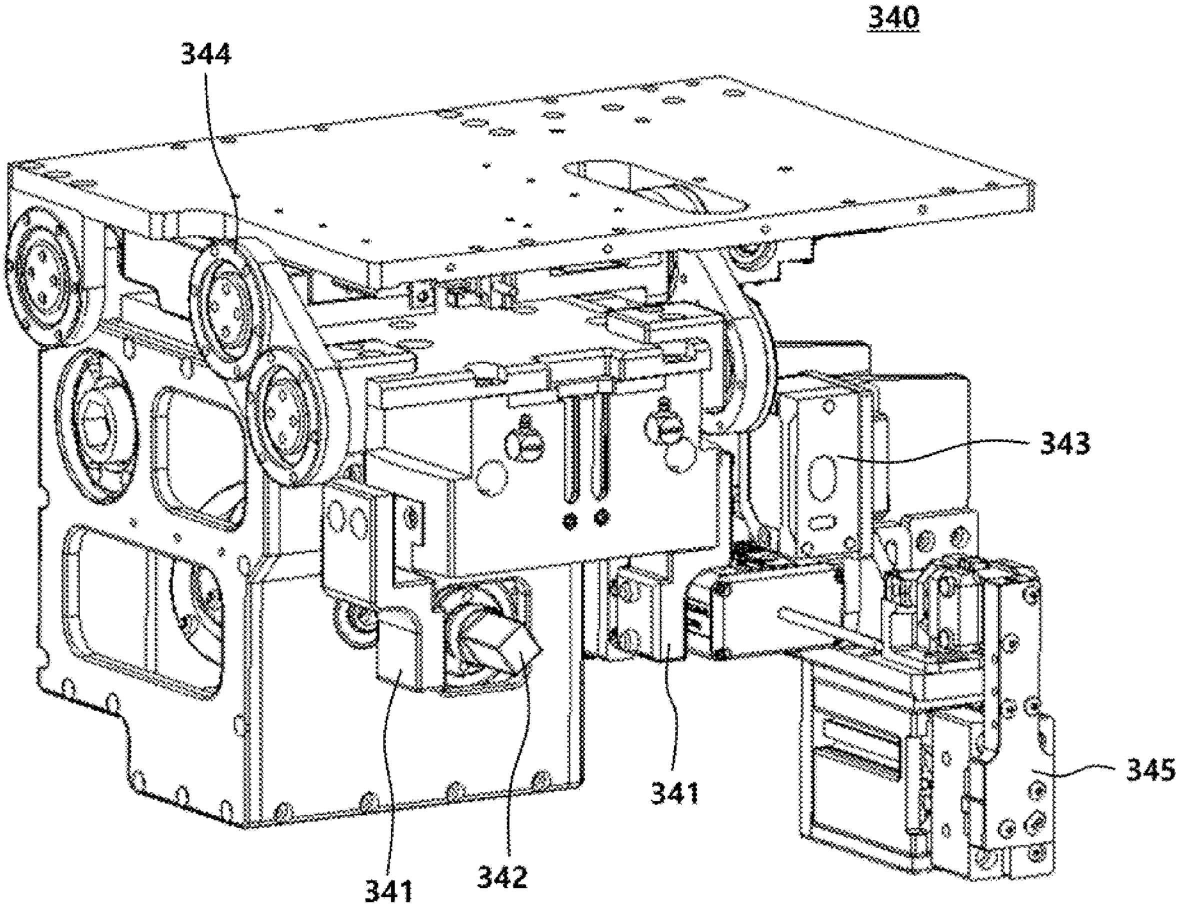
FIG. 26 is a perspective view illustrating a fastening module.
Figure 27:
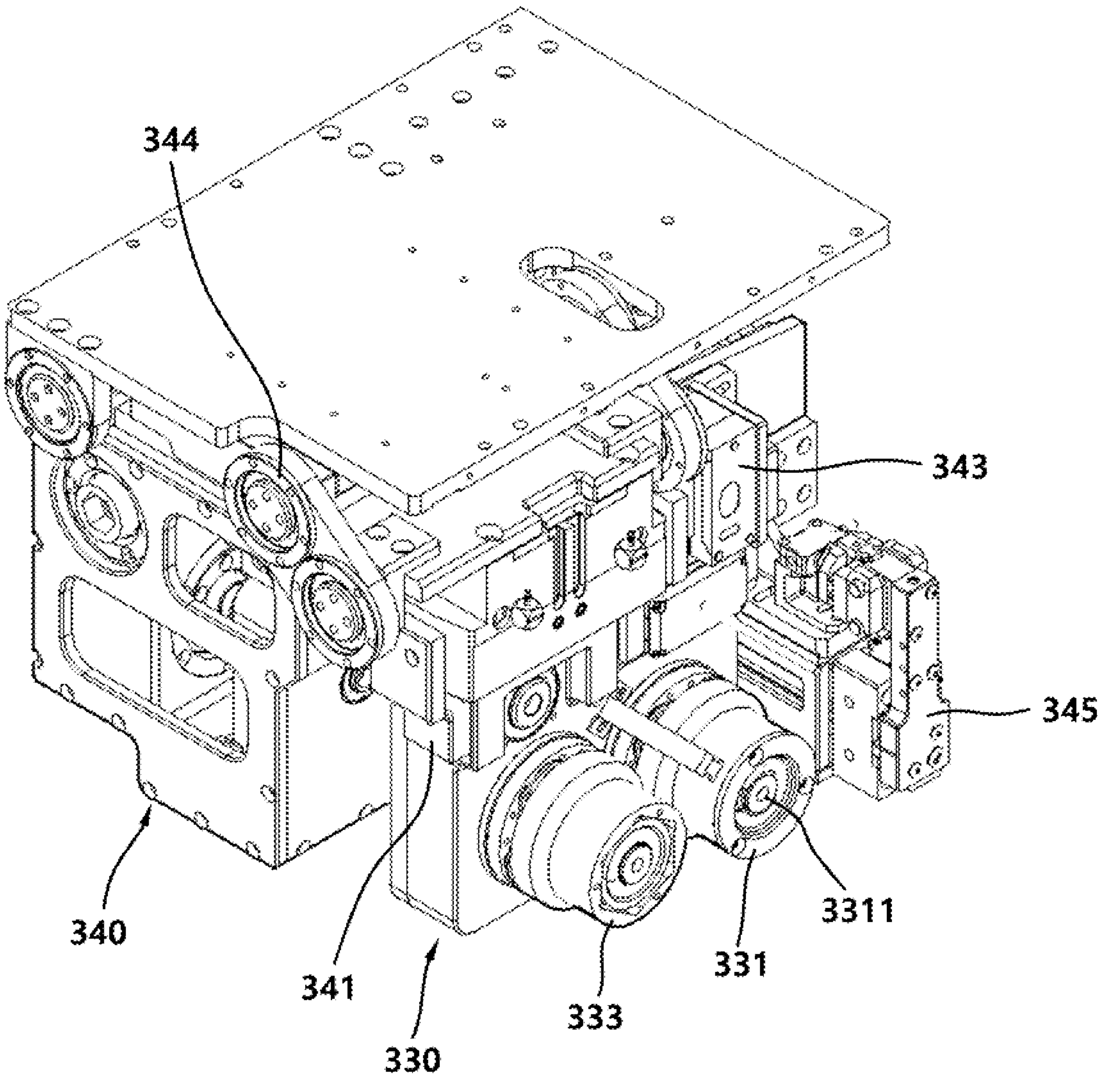
FIG. 27 is a perspective view illustrating a state in which the CGA holding module is mounted on the fastening module.
Figure 28:
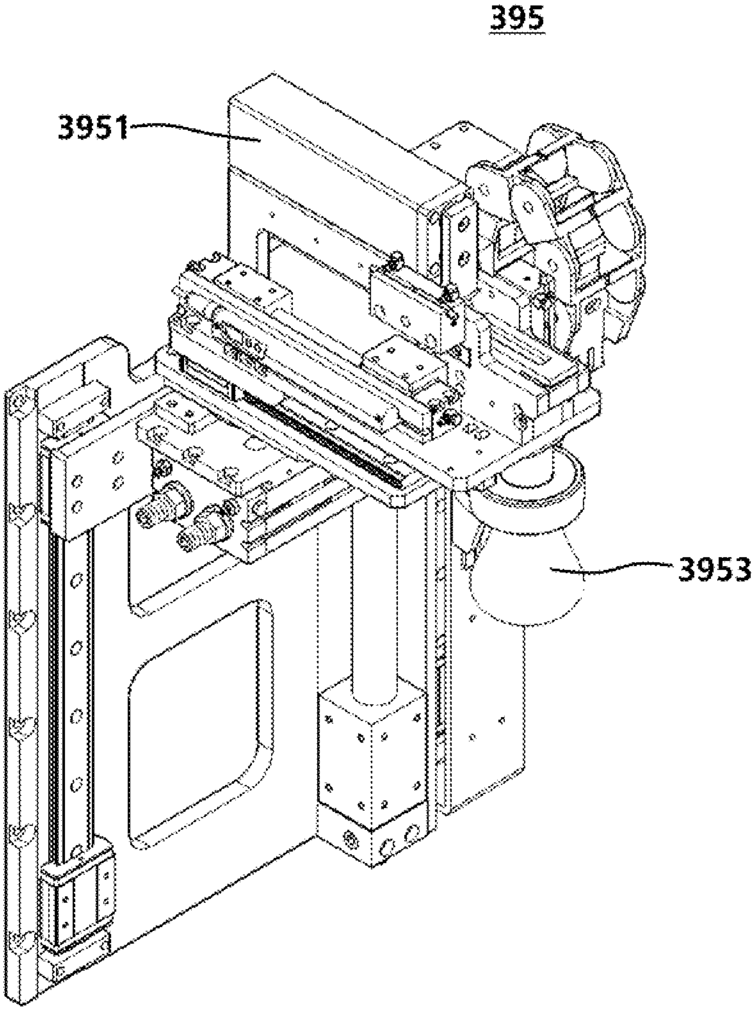
FIG. 28 is a perspective view illustrating a gasket feeder.

FIG. 25 is a perspective view illustrating the fastening module 340 and the CGA holding module 330 provided in the gas supply cabinet 300. FIG. 26 is a perspective view illustrating the fastening module 340. FIG. 27 is a perspective view illustrating a state in which the CGA holding module 330 is mounted on the fastening module 340. FIG. 28 is a perspective view illustrating the gasket feeder 395.

Referring to FIGS. 25 to 28 together with FIGS. 1, 2, 14, and 15, the fastening module 340 may be connected to a driving mechanism 393. The driving mechanism 393 may move the fastening module 340 in the horizontal direction along the guide rail 394 extending in the horizontal direction within the cabinet frame 310. Also, the driving mechanism 393 may move the fastening module 340 in a vertical direction parallel to a height direction of the cabinet frame 310. The driving mechanism 393 may include an actuator such as a driving motor.

The fastening module 340 may include a clamping mechanism 341 for gripping and holding the CGA holding module 330. The clamping mechanism 341 may include a clamping arm for gripping the CGA holding module 330 and an actuator connected to the clamping arm. The fastening module 340 may move the CGA holding module 330 gripped by the clamping mechanism 341 to an appropriate position when performing the loading operation of the gas container 50 or when starting the loading operation of the gas container 50. In addition, the fastening module 340 may include a vision sensor 343 for detecting the position of the CGA holding module 330. Before gripping the CGA holding module 330 with the clamping mechanism 341, the fastening module 340 may detect the position of the CGA holding module 330 by sensing the vision mark 339 attached to the CGA holding module 330 using the vision sensor 343.

The CGA holding module 330 may be configured to receive power required for driving from the fastening module 340. The fastening module 340 may include a power transmission shaft 342. The power transmission shaft 342 is detachably inserted into the CGA holding module 330 and transmits the power generated from the actuator in the fastening module 340 to the CGA holding module. In particular, the power transmission shaft 342 of the fastening module 340 is inserted into the CGA holding module 330, and power provided from the actuator provided in the fastening module 340 may be transmitted to the connector holder 331 and/or the end cap holder 333 of the CGA holding module 330 through the power transmission shaft 342. When the CGA holding module 330 is gripped by the clamping mechanism 341, the fastening module 340 connects the power transmission shaft 342 to the CGA holding module 330, so that power for the operation of the connector holder 331 and the end cap holder 333 of the CGA holding module 330 may be transmitted to the CGA holding module 330. The CGA holding module 330 may drive the connector holder 331 and the end cap holder 333 with the power received from the fastening module 340 to perform a fastening/separation operation between the plug 3911 and the CGA holding module 330, an end cap 59 fastening/separation operation, and a fastening/separation operation between the gas nozzle 3313 of the connector holder 331 and the valve nozzle 53. When all operations using the CGA holding module 330 are completed, the fastening module 340 may separate (or, disconnect) the power transmission shaft 342 from the CGA holding module 330, and transfer the CGA holding module 330 to another loading port in the cabinet frame 310 that requires other operation or the standby position.

In example embodiments, the fastening module 340 may include a distance sensor and a tilting mechanism 344. The distance sensor may sense the distance between one or more positions of the valve head 52 and the fastening module 340, and detect the inclination of the valve structure 51 based on the sensed distance between one or more positions of the valve head 52 and the fastening module 340. The tilting mechanism 344 may move a component of the fastening module 340 and the CGA holding module 330 gripped by the fastening module 340 in a tilting direction. The tilting mechanism 344 may include an actuator. The tilting mechanism 344 may tilt each component of the fastening module 340 and the CGA holding module 330 in an appropriate direction based on the inclination of the valve structure 51 detected from the distance sensor. According to the inclination of the bottom surface of the gas container 50 or the inclination of the outer peripheral surface of the gas container 50, the valve structure 51 may be inclined with respect to the reference position. The inclination of the gas container 50 may cause difficulty in a fastening operation between each of the connector holder 331 and the end cap holder 333 of the CGA holding module 330 and the valve structure 51. However, when detecting the position of the end cap 59 and/or the position of the valve nozzle 53, by adjusting the posture of the CGA holding module 330 according to the detected inclination of the valve structure 51, the precision of the fastening operation between each of the connector holder 331 and the end cap holder 333 of the CGA holding module 330 and the valve structure 51 may be improved.

In addition, a reference mark may be attached to the inside of the cabinet frame 310 of the gas supply cabinet 300. The vision sensor 343 of the fastening module 340 may detect the position information of the reference mark by sensing the reference mark. By comparing the position information of the detected reference mark with the initial position information of the previously detected reference mark, a distortion of the vision sensor 343 of the fastening module 340 or a change over time of the fastening module 340 may be checked. In addition, by comparing the position information of the detected reference mark with the initial position information of the previously detected reference mark, a position shift according to the change over time of the fastening module 340 may be used as a correction value for the position detection operation using the vision sensor 343.

The fastening module 340 may include a gasket gripper 345 capable of inserting/removing a gasket into/from the gas nozzle 3313. The gasket gripper 345 may grip the gasket and may be configured to move by an actuator. When the clamping mechanism 341 of the fastening module 340 is gripping the CGA holding module 330, the gasket gripper 345 may insert the gasket into the end of the gas nozzle 3313 of the connector holder 331. When the clamping mechanism 341 of the fastening module 340 is gripping the CGA holding module 330, the gasket gripper 345 may separate the gasket inserted into the end of the gas nozzle 3313 of the connector holder 331 from the gas nozzle 3313. The gasket gripper 345 may be configured to be moved by a pneumatic actuator. In this case, in the process of docking the gasket gripper 345 with the gas nozzle 3313 for insertion of the gasket, a force that continuously pushes the gas nozzle 3313 is applied to the gasket gripper 345 by the driving of the pneumatic actuator. The fingers of the gasket gripper 345 and the gas nozzle 3313 are rubbed by the force acting on the gasket gripper 345, and the fingers of the gasket gripper 345 may not be able to switch from a full-grip posture to an un-grip posture. To prevent the issue that the fingers of the gasket gripper 345 cannot switch from the full-grip posture to the un-grip posture, an exhaust type solenoid valve may be applied to the pneumatic actuator for driving the gasket gripper 345. When the gasket gripper 345 seats the gasket at the gasket insertion position of the gas nozzle 3313, by switching the pneumatic actuator to the exhaust state, the force of the gasket gripper 345 pushing the gas nozzle 3313 may be reduced. When the force that the gasket gripper 345 pushes on the gas nozzle 3313 is reduced to an appropriate level, the finger of the gasket gripper 345 may be easily converted from the full-grip posture to the un-grip posture. Also, the gasket gripper 345 may detect whether the gasket is seated on the gas nozzle 3313 in a series of sequences without a separate sensor. After inserting the gasket into the gas nozzle 3313 with the gasket gripper 345, the gasket gripper 345 docks with the gas nozzle 3313 in a state that maintains the fingers of the gasket gripper 345 in a full-grip posture. At this time, the gasket gripper 345 does not grip the gasket. If the gasket is already mounted at a preset gasket insertion position of the gas nozzle 3313, the gasket gripper 345 does not enter the gasket insertion position of the gas nozzle 3313. If the gasket is not mounted at the gasket insertion position of the gas nozzle 3313, the gasket gripper 345 may enter the gasket insertion position of the gas nozzle 3313. That is, by determining whether the gasket gripper 345 may enter the gasket insertion position of the gas nozzle 3313, it may be detected whether a gasket is mounted on the gas nozzle 3313.

The gas supply cabinet 300 may include a gasket feeder 395 provided within the cabinet frame 310. The gasket feeder 395 may supply a new gasket to the gasket gripper 345 of the fastening module 340 and store the used waste gasket. The gasket feeder 395 may be installed on the inner wall of the cabinet frame of the gas supply cabinet 300. The gasket feeder 395 may include one or more drive shafts and may be moved to a position where the gasket feeder 395 may interface with the fastening module 340. The gasket feeder 395 may include a gasket magazine 3951 that stores one or more gaskets and supplies gaskets to the gasket gripper 345. The gasket magazine 3951 may be removably mounted to the mounting position of the gasket feeder 395. The operator or robot may remove the empty gasket magazine 3951 without a gasket from the mounting position of the gasket feeder 395, and mount a new gasket magazine 3951 with a new gasket stored in the mounting position of the gasket feeder 395. The gasket magazine 3951 may have an actuator or an elastic body that moves the stored gasket to the supply position. When the gasket gripper 345 of the fastening module 340 interfaces with the gasket feeder 395, the gasket gripper 345 may grip the gasket in the supply position of the gasket magazine 3951. The gasket feeder 395 may include a sensor that checks the remaining amount of gaskets in the gasket magazine 3951 and generates an alarm when all of the gaskets are exhausted. In addition, the gasket feeder 395 may include a gasket waste box 3953 for storing the waste gasket. The waste gasket stored in the gasket waste box 3953 may be thrown out at once by an operator or a robot.

Hereinafter, a fastening and separation operation between the CGA holding module 330 and the plug 3911 will be described in more detail.

The CGA holding module 330 waits in a state fastened on the plug 3911 in the cabinet frame 310 before the gas container 50 is loaded. As the connector holder 331 of the CGA holding module 330 is fastened to or disconnected from the plug 3911, the CGA holding module 330 may be fastened to or disconnected from the plug 3911. The CGA holding module 330 and the plug 3911 are fastened or separated through a series of operations.

First, for separation of the CGA holding module 330 and the plug 3911, an operation of checking the position of the CGA holding module 330 by sensing the vision mark 339 of the CGA holding module 330 with the vision sensor 343 of the fastening module 340, an operation of gripping the CGA holding module 330 with the clamping mechanism 341 of the fastening module 340, an operation of connecting the power transmission shaft 342 of the fastening module 340 to the CGA holding module 330, and an operation of releasing the fastening between the connector holder 331 and the plug 3911 by driving the connector holder 331 through the power transmission shaft 342 may be sequentially performed. In the operation of releasing the fastening between the connector holder 331 and the plug 3911, the fastening module 340 may rotate the connector holder 331 in a direction opposite to the fastening direction with a relatively high torque to primarily release the fastening between the connector module and the plug 3911, and may further rotate the connector holder 331 in the direction opposite to the fastening direction with a relatively low torque to completely detach the connector holder 331 from the plug 3911.

The fastening module 340 transfers the CGA holding module 330 separated from the plug 3911 to the gas container 50, and performs various operations on the valve structure 51 of the gas container 50 by using the CGA holding module 330. Thereafter, when the gas container 50 in which the gas is exhausted is unloaded from the gas supply cabinet 300, the fastening module 340 fastens the CGA holding module 330 back to the plug 3911. The fastening module 340 transfers the CGA holding module 330 to the plug 3911, and moves the plug 3911 to a position where the shelf 391 including one or more actuators also interfaces with the fastening module 340. The fastening module 340 reversely rotate the nut mechanism 3311 of the connector holder 331 to engage the screw thread of the nut mechanism 3311 and the plug 3911, and then fasten the nut mechanism 3311 and the plug 3911 by rotating the nut mechanism 3311 in the forward direction. When it is recognized that the nut mechanism 3311 is almost fastened to the plug 3911 through the number of revolutions of the nut mechanism 3311, by applying a relatively high torque to the nut mechanism 3311, it is possible to complete the fastening of the nut mechanism 3311 and the plug 3911.

On the other hand, as the CGA holding module 330 is fastened to the fastening module 340, an separation operation of end cap 59, a fastening operation between the connector holder 331 and the valve nozzle 53, a separation operation between the connector holder 331 and the valve nozzle 53, and an end cap 59 fastening operation may be sequentially performed.

Hereinafter, the end cap separation operation using the CGA holding module 330 will be described in more detail.

First, the fastening module 340 senses the QR code attached to the valve structure 51 using the vision sensor 343 at a designated position, and then detects the type of the valve structure 51 and the position of another sensing required position of the gas container 50 (e.g., an alignment structure provided in the valve head 52). The vision sensor 343 of the fastening module 340 may sense the alignment structure of the valve structure 51 to detect the position and posture of the valve structure 51 (e.g., positions along vertical and horizontal directions, inclination, etc.). Based on the information on the position and posture of the detected valve structure 51, after the vision sensor 343 moves to a position where the end cap 59 may be sensed, the fastening module 340 may detect the position of the end cap 59 (e.g., the center of the end cap 59) with the vision sensor 343. The fastening module 340 aligns the end cap holder 333 and the end cap 59 based on the detected position of the end cap 59. When the position of the end cap holder 333 is detected, the sensing sequence using the vision sensor 343 may be repeatedly performed several times until the position information value for the end cap 59 converges to a particular value.

When the position detection of the end cap 59 is completed, the fastening module 340 separates the end cap 59 from the valve nozzle 53 so that the outlet of the valve nozzle 53 of the gas container 50 is opened and exposed. The fastening module 340 advances the CGA holding module 330 to surround the end cap 59 of the gas container 50 with the end cap holder 333. To enter the end cap holder 333 into an appropriate position where the end cap holder 333 surrounds the end cap 59, an operation of applying a forward torque to the end cap holder 333 while rotating the end cap holder 333 forward and an operation of removing the forward torque applied to the end cap holder 333 and rotating the end cap holder 333 in reverse direction may be repeated. When the entry of the end cap holder 333 is completed, the fastening module 340 may apply a relatively high torque to the end cap holder 333 through the power transmission shaft 342 to primarily release the fastening of the end cap holder 333 to the valve nozzle 53, and then apply a relatively low torque to the end cap holder 333 through the power transmission shaft 342 until the end cap 59 is completely disengaged from the valve nozzle 53. Even after the end cap 59 is completely separated from the valve nozzle 53, to prevent the end cap 59 from being separated from the end cap holder 333, centrifugal force may be applied to the end cap 59 by continuously rotating the end cap holder 333. In addition, to prevent the end cap 59 from being separated from the end cap holder 333 during the separation operation of the end cap 59 or other operations, an elastic body such as a rubber ring may be attached to the end cap 59.

Hereinafter, a fastening operation between the connector holder 331 and the valve nozzle 53 will be described in more detail.

First, the position of the valve nozzle 53 is detected by the vision sensor 343 of the fastening module 340. The vision sensor 343 of the fastening module 340 senses the circular shape of the outlet of the valve nozzle 53 to detect the position of the valve nozzle 53 (e.g., the central position of the outlet of the valve nozzle 53), and the connector holder 331 is aligned with the detected position of the valve nozzle 53. When the position of the valve nozzle 53 is detected, the sensing sequence using the vision sensor 343 may be repeatedly performed several times until the position information value for the valve nozzle 53 converges to a particular value.

When the position detection of the valve nozzle 53 is completed, the fastening module 340 fastens the connector holder 331 to the valve nozzle 53 so that the gas nozzle 3313 of the connector holder 331 and the flow path of the valve nozzle 53 are connected. While advancing the CGA holding module 330 to advance the connector holder 331 toward the valve nozzle 53, the fastening module 340 rotates the nut mechanism 3311 of the connector holder 331 in a direction opposite to the fastening direction. While the nut mechanism 3311 rotates in the reverse direction, when the starting point of the screw thread of the nut mechanism 3311 of the connector holder 331 and the screw thread of the valve nozzle 53 come into contact, the speed of the fastening module 340 changes By detecting a change in the rotational speed of the nut mechanism 3311, it may be detected whether the starting point of the screw thread of the nut mechanism 3311 of the connector holder 331 and the screw thread of the valve nozzle 53 contact each other. When it is confirmed that the starting point of the screw thread of the nut mechanism 3311 and the screw thread of the valve nozzle 53 are in contact, in addition, by rotating the nut mechanism 3311 in reverse to align the screw thread of the nut mechanism 3311 and the screw thread of the valve nozzle 53, thereafter, the nut mechanism 3311 is rotated in the fastening direction to fasten the nut mechanism 3311 to the valve nozzle 53. When it is recognized that the nut mechanism 3311 is almost fastened to the valve nozzle 53 through the total number of revolutions of the nut mechanism 3311, by applying a relatively high torque to the nut mechanism 3311, it is possible to complete the fastening of the nut mechanism 3311 and the valve nozzle 53. If the nut mechanism 3311 does not rotate any more in a state in which the total number of revolutions of the nut mechanism 3311 does not satisfy the completion condition, it is determined that the intermediate jamming has occurred. When the intermediate jamming occurs, the nut mechanism 3311 is reversely rotated to separate the nut mechanism 3311 from the valve nozzle 53, and then the fastening between the nut mechanism 3311 and the valve nozzle 53 is attempted again.

When the coupling between the connector holder 331 and the valve nozzle 53 is completed, the valve structure 51 of the gas container 50 is brought into an open state by using the valve operation module 320. As the valve structure 51 enters the open state, the gas discharged through the valve nozzle 53 is supplied to the gas nozzle 3313 of the connector holder 331.

Hereinafter, a separation operation between the connector holder 331 and the valve nozzle 53 will be described in more detail.

When the gas of the gas container 50 is exhausted, a change in the weight of the gas container 50 or the gas supply pressure occurs. When a change in the weight or gas supply pressure of the gas container 50 is detected, the valve operation module 320 forcibly closes the valve structure 51 to limit gas release through the valve structure 51. By sensing the vision mark 339 of the CGA holding module 330 with the vision sensor 343 of the fastening module 340 to detect the position information of the CGA holding module 330, the fastening module 330 is moved to a position suitable for gripping the CGA holding module 330 based on the detected position information of the CGA holding module 330. Thereafter, the CGA holding module 330 is gripped by the clamping mechanism 341, and the power transmission shaft 342 is connected to the CGA holding module 330. The fastening module 340 primarily releases the fastening between the connector holder 331 and the valve nozzle 53 by rotating the connector holder 331 in the reverse direction of the fastening direction with a relatively high torque, and further rotates the connector holder 331 in the reverse direction opposite to the fastening direction with a relatively low torque to completely separate the connector holder 331 from the valve nozzle 53.

Hereinafter, the fastening operation of the end cap 59 using the CGA holding module 330 will be described in more detail.

When the separation operation between the connector holder 331 and the valve nozzle 53 is completed, an operation of fastening the end cap 59 to the valve nozzle 53 is performed so that the outlet of the valve nozzle 53 is closed.

After detecting the position of the valve nozzle 53 with the vision sensor 343 of the fastening module 340, the end cap holder 333 is rotated in the reverse direction while the end cap holder 333 gripping the end cap 59 is advanced toward the valve nozzle 53. While rotating the end cap holder 333 in the reverse direction, a change in the rotation speed of the end cap holder 333 is detected to check whether the starting points of the screw thread of the end cap 59 supported by the end cap holder 333 and the screw thread of the valve nozzle 53 contact each other. When it is confirmed that the starting point of the screw thread of the end cap 59 and the screw thread of the valve nozzle 53 are in contact, in addition, the end cap holder 333 is further rotated in the reverse direction to align the screw thread of the end cap 59 with the screw thread of the valve nozzle 53, and thereafter, the end cap holder 333 is rotated in the fastening direction to fasten the end cap 59 to the valve nozzle 53. When it is recognized that the end cap 59 is almost fastened to the valve nozzle 53 through the number of revolutions of the end cap 59 (or the number of revolutions of the end cap holder 333), by applying a relatively high torque to the end cap holder 333, the coupling between the end cap 59 and the valve nozzle 53 may be completed. If the end cap 59 does not rotate abnormally in a state in which the number of rotations of the end cap 59 does not satisfy the completion condition, it is determined that the intermediate jamming has occurred. If it is determined that intermediate jamming has occurred, after the end cap 59 is separated from the valve nozzle 53 by rotating the end cap 59 in the opposite direction to the fastening direction, the fastening between the end cap 59 and the valve nozzle 53 is attempted again.

When the separation operation between the end cap 59 and the valve nozzle 53 is completed, the fastening module 340 is separated from the CGA holding module 330 by moving backward after separating the power transmission shaft 342 from the CGA holding module 330. The CGA holding module 330 separated from the fastening module 340 waits in a state coupled to the gas container 50. In this case, because the end cap is supported by the end cap holder 333, the end cap may be prevented from being separated from the valve nozzle 53.

In the gas supply cabinet 300, the automatic replacement operation of the gas container 50 may proceed in the following sequence.

When the transfer robot 200 transports the gas container 50 from the storage queue 600 or the test buffer chamber 130 to the gas supply cabinet 300, the loading operation of the gas container 50 to the gas supply cabinet 300 begins. When the transfer robot 200 arrives in front of the target loading port of the gas supply cabinet 300 and sends a signal, the gas supply cabinet 300 opens the sliding door 311 corresponding to target loading port, and the transfer robot 200 loads the gas container 50 into the target loading port. After receiving and gripping the gas container 50, the gripper 352 of the first container support module 350 performs a centering operation of aligning the position of the gas container 50 so that the central axis of the gas container 50 coincides with a preset reference direction. To allow the gas container 50 to be more precisely aligned, the gripper 352 of the first container support module 350 may repeat a posture that does not grip the gas container 50 (the un-grip posture or the semi-grip posture) and the full-grip posture that grips the gas container 50 or rotate the gas container 50 one or more times.

Before or after the gas container 50 is loaded into the gas supply cabinet 300, the fastening module 340 moves to the target loading port, grips the CGA holding module 330 mounted on the plug 3911 of the target loading port, and then separates the CGA holding module 330 from the plug 3911. If it is necessary to insert a new gasket into the gas nozzle 3313 of the connector holder 331, the fastening module 340 may receive a new gasket from the gasket feeder 395 before moving to the target loading port. After separating the CGA holding module 330 from the plug 3911, the fastening module 340 may insert a new gasket into the gas nozzle 3313 of the connector holder 331.

After centering for the gas container 50, to read the QR code attached to the valve head 52 of the valve structure 51 of the gas container 50, the valve head 52 is sensed by the vision sensor 343 of the fastening module 340 while rotating the gas container 50. By sensing the QR code attached to the valve head 52, the information on the gas container 50 is checked, and the position of the end cap 59 is detected. When the position of the end cap 59 is detected, the end cap 59 is separated from the valve nozzle 53 using the end cap holder 333 of the CGA holding module 330.

Next, after detecting the position of the exposed valve nozzle 53 from which the end cap 59 is separated, the connector holder 331 of the CGA holding module 330 is fastened to the valve nozzle 53. When the fastening operation between the connector holder 331 and the valve nozzle 53 is completed, the fastening module 340 separates the power transmission shaft 342 from the CGA holding module 330 and moves to the standby position.

After the fastening operation between the connector holder 331 and the valve nozzle 53 is completed, the moving body 323 of the valve operation module 320 is docked to the valve structure 51 of the gas container 50. As the moving body 323 is docked to the valve structure 51, the pneumatic connection part 55 of the valve structure 51 and the pneumatic connection part 327 of the moving body 323 are interconnected, so that the pneumatic pressure provided from the valve operation module 320 is in a state that may be supplied to the pneumatic line provided inside the valve structure 51. Next, after performing the gas supply preparation operation (e.g., purge, pressurization/decompression test, etc.), the valve operation module 320 places the locking handle 56 of the valve structure 51 in the release position and supplies pneumatic pressure to the pneumatic line of the valve structure 51 to put the valve structure 51 into an open state. As the valve structure 51 enters the open state, gas may be discharged through the valve nozzle 53 of the valve structure 51. The heating jacket mechanism 354 provided in the first container support module 350 or the cooling jacket mechanism 382 provided in the second container support module 350*a* may adjust the temperature of the gas container 50 to an appropriate temperature required for the semiconductor process.

Through the change in the weight of the gas container 50 detected by the weight sensor of the base plate 351 of the gas supply cabinet 300 or the pressure change of the pressure sensor installed in the gas supply line of the gas supply cabinet 300, the time of gas exhaustion may be detected. When it is determined that replacement of the gas container 50 is necessary through a weight sensor, and the like, the valve operation module 320 of the gas supply cabinet 300 shuts off the pneumatic supply to the pneumatic line of the valve structure 51 and places the locking handle 56 in the restrict position to put the valve structure 51 into the forced closing state.

When the valve structure 51 is switched to the forced closing state, the fastening module 340 of the gas supply cabinet 300 moves to the loading port where the gas container 50 to be unloaded, and confirms the position of the CGA holding module 330 by checking the vision mark 339 of the CGA holding module 330 with the vision sensor 343. When the position of the CGA holding module 330 is confirmed, the fastening module 340 grips the CGA holding module 330 with a clamping mechanism 341, and connects the power transmission shaft 342 to the CGA holding module 330. The fastening module 340 drives the connector holder 331 to separate the connector holder 331 from the valve nozzle 53.

When the connector holder 331 and the valve nozzle 53 are separated, after detecting the position of the valve nozzle 53 with the vision sensor 343, the fastening module 340 fastens the end cap 59 gripped by the end cap holder 333 to the valve nozzle 53.

When the end cap 59 is fastened to the valve nozzle 53, the position of the base plate 351 of the first container support module 350 is adjusted so that the base plate 351 and the support structure 214 of the transfer robot 200 may interface. The upper-level system assigns the unloading operation of the gas container 50 to the transfer robot 200, and the transfer robot 200 to which the operation is assigned moves to the gas supply cabinet 300. When the transfer robot 200 arrives at a target loading port of the gas supply cabinet 300, the gas supply cabinet 300 opens the sliding door corresponding to the target loading port, and the transfer robot 200 receives the gas container 50 from the gas supply cabinet 300 and grips the gas container 50. When the gas container 50 is unloaded from the gas supply cabinet 300, the gas supply cabinet 300 closes the sliding door 311 corresponding to target loading port. Also, when the gas container 50 is unloaded from the gas supply cabinet 300, the fastening module 340 removes the waste gasket from the gas nozzle 3313 of the connector holder 331, fastens the CGA holding module 330 to the plug 3911, and then moves to the gasket feeder 395 to discard the waste gasket in the gasket waste box 3953 of the gasket feeder 395.

Figure 29:
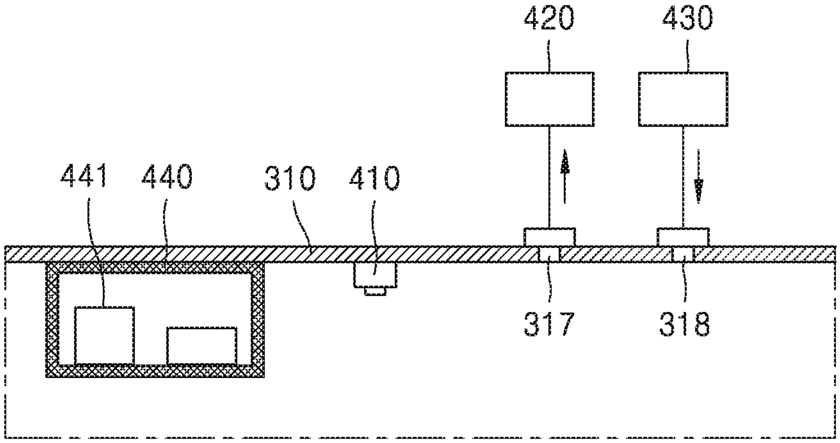
FIG. 29 is a block diagram schematically illustrating a part of a gas supply cabinet according to an example embodiment of the inventive concepts.

FIG. 29 is a block diagram schematically illustrating a part of a gas supply cabinet 300 according to example embodiments of the inventive concept.

Referring to FIG. 29, a gas supply cabinet 300 may include a gas sensor 410 mounted on a cabinet frame 310, an exhaust unit 420, and an inert gas supply unit 430.

The gas sensor 410 may be configured to detect gas in the cabinet frame 310. For example, the gas sensor 410 may be configured to detect a gas composition within the cabinet frame 310 and detect a concentration of a particular gas. For example, the gas sensor 410 may detect a concentration of a gas that is harmful to the human body or has a risk of explosion, such as a combustible gas or a toxic gas in the cabinet frame 310. For example, the gas sensor 410 may include at least one of sensors of a catalytic combustion type, a semiconductor type, a thermal conductivity type, a constant potential electrolysis type, and an infrared type. For example, based on the information on the gas composition in the cabinet frame 310 detected by the gas sensor 410, it may be determined whether gas is leaking from the gas container 50.

The exhaust unit 420 may be configured to exhaust gas in the cabinet frame 310 through the exhaust port 317 of the cabinet frame 310. The exhaust unit 420 may include an exhaust pump and an exhaust line connecting the exhaust pump and the exhaust port 317 of the cabinet frame 310.

The inert gas supply unit 430 may supply an inert gas into the cabinet frame 310 through the inlet port 318 of the cabinet frame 310. For example, the inert gas supply unit 430 may be configured to supply nitrogen gas into the cabinet frame 310. The inert gas supply unit 430 may include a gas source storing an inert gas and a gas supply line connecting the gas source and the inlet port 318 of the cabinet frame 310.

In example embodiments, when a particular gas is detected from the gas sensor 410 in the cabinet frame 310 above the reference value, the control unit or upper-level system of the gas supply cabinet 300 may be configured to operate the exhaust unit 420 to rapidly exhaust the gas in the cabinet frame 310. For example, when the gas sensor 410 detects that gas is leaking from the gas container 50, the exhaust unit 420 may remove combustible or toxic gases in the cabinet frame 310.

In example embodiments, when a particular gas is detected from the gas sensor 410 in the cabinet frame 310 above the reference value, the control unit or upper-level system of the gas supply cabinet 300 operates the inert gas supply unit 430 to supply an inert gas to the inside of the cabinet frame 310. For example, when the gas sensor 410 detects that the combustible gas is leaking from the gas container 50, the inert gas supply unit 430 increases the internal pressure in the cabinet frame 310 by supplying an inert gas into the cabinet frame 310, thereby preventing the inflow of external air, such as oxygen, which may cause a fire.

The gas supply cabinet 300 may include an explosion-proof box 440 that houses the electrical components 441. For example, a camera, a light source sensor such as a photo sensor or a laser sensor, an auto switch, buttons, a black box, a gas sensor, and various actuators such as a motor or an air cylinder may be provided in the explosion-proof box 440. The explosion-proof box 440 may prevent the risk that an electrical spark generated from the electrical component 441 may meet with flammable gas and cause a fire. In addition, even if a fire occurs outside the explosion-proof box 440, because the electrical component 441 in the explosion-proof box 440 is not exposed to the flame, it is possible to prevent a larger fire from occurring. Furthermore, various electronic components provided in the gas supply cabinet 300 may be components operating with low power or low current. Because the electrical components provided in the gas supply cabinet 300 operate at relatively low power or low current, the risk of ignition due to an electric spark or the like may be reduced.

Figure 30:
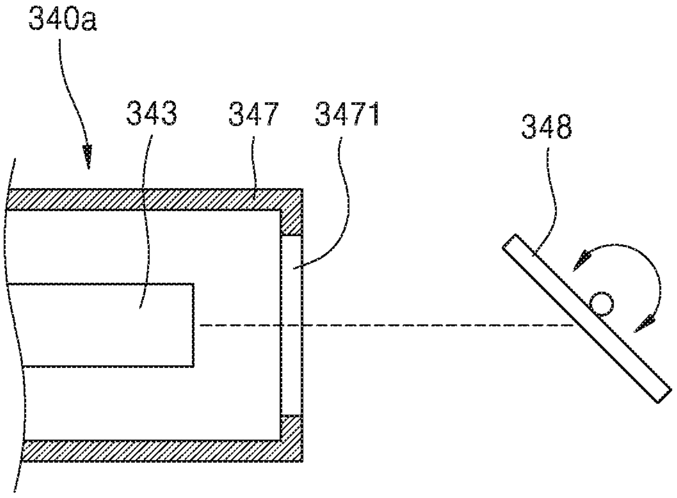
FIG. 30 is a block diagram illustrating a part of a fastening module according to an example embodiment of the inventive concepts.

FIG. 30 is a block diagram illustrating a part of a fastening module 340*a* according to example embodiments of the inventive concept.

Referring to FIG. 30, the fastening module 340*a* may include an explosion-proof case 347 accommodating at least one of the components constituting the fastening module 340*a*. For example, the explosion-proof case 347 may provide a closed space for accommodating any one of a camera, a light source sensor such as a photo sensor or a laser sensor, an auto switch, buttons, a black box, a gas sensor, and various actuators such as a motor or an air cylinder, provided in the fastening module 340*a*. In example embodiments, the vision sensor 343 of the fastening module 340*a* may be housed in an explosion-proof case 347. The vision sensor 343 may be configured to image a sensing target through the window 3471 of the explosion-proof case 347. In the vicinity of the window 3471 of the explosion-proof case 347, a mirror 348 configured to be rotationally movable may be arranged. The mirror 348 may be arranged in the optical path of the vision sensor 343 and may be rotated to adjust the imaging area of the vision sensor 343.

According to the gas supply system 10 according to example embodiments of the inventive concepts, the entire process of handling the gas container 50, that is, an operation of transferring the transfer container carried in the loading/unloading stage 11 to the gas supply cabinet 300 of the gas supply stage 13 and mounting the transfer container in the gas supply cabinet 300; an operation of replacing the gas container 50 in the gas supply cabinet 300, and an operation of taking out the gas container 50 in which the gas has been consumed from the gas supply cabinet 300 to the loading/unloading stage 11, may be automated, thereby preventing operator safety issues caused by gases that are harmful to the human body or explosive, such as combustible gas and toxic gas.

One or more of the elements disclosed above may be controlled by a control system that can include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. In particular, the robots, actuators, sensors and/or other components of the gas supply system can all communicate with the control system.

While the inventive concepts have been particularly shown and described with reference to embodiments thereof, it will be understood that various changes in form and details may be made therein without departing from the spirit and scope of the following claims.

What is claimed is:

1. A storage queue, comprising:
- a frame providing an interior space for accommodating a gas container;
- a base plate positioned within the interior space of the frame, configured to support the gas container, and the base plate including a QR code that includes a position information on a mounting position in which the gas container is mounted;
- a gripper configured to hold the gas container placed on the base plate;
- a barcode reader configured to sense an identification tag of the gas container; and
- an actuator configured to move the barcode reader within the frame,
- wherein the barcode reader is configured to sense the identification tag of the gas container while moving within the frame.

2. The storage queue of claim 1, wherein the base plate includes a sensing plate that is detected by a distance sensor of a transfer robot transporting the gas container to the storage queue.

3. The storage queue of claim 1, wherein the gripper is configured to perform a full-grip posture in which the gripper is in close contact with the gas container and supports the gas container, an un-grip posture in which the gripper is spaced apart from the gas container so as to allow the gas container to be detached from the gripper, and a semi-grip posture in which the gripper is spaced apart at a distance capable of preventing the gas container from falling.

4. The storage queue of claim 3, wherein, when the gripper is in the semi-grip posture, the gripper is separated from the gas container by a distance of 5 mm to 30 mm.

5. The storage queue of claim 1, wherein the gripper includes a load detection sensor configured to detect whether the gas container is loaded.

6. The storage queue of claim 1, further comprising a sliding door configured to open and close the interior space of the frame.

7. A storage queue, comprising:
- a frame providing an interior space for accommodating a gas container;
- a base plate positioned within the interior space of the frame, configured to support the gas container, and the base plate including a QR code that includes a position information on a mounting position in which the gas container is mounted;
- a gripper configured to hold the gas container placed on the base plate;
- a barcode reader configured to sense an identification tag of the gas container; and
- proximity sensors configured to detect a movement of the barcode reader.

8. A gas supply system, comprising:
- a loading/unloading stage where a gas container is provided;
- a buffer stage including a storage queue for temporarily storing the gas container; and
- a cabinet stage including a gas supply cabinet configured to supply gas from the gas container to a gas-consuming facility,
- wherein the storage queue comprises a frame providing an interior space for accommodating the gas container, a base plate positioned within the interior space of the frame, configured to support the gas container, and the base plate including at least one of a sensing plate and a QR code, a first gripper configured to hold the gas container placed on the base plate, and a barcode reader configured to sense an identification tag of the gas container,
- wherein the at least one of the sensing plate and the QR code is positioned to be physically detected by a transfer robot transporting the gas container to the storage queue, and
- wherein the QR code includes a position information on a mounting position in which the gas container is mounted.

9. The gas supply system of claim 8, wherein the buffer stage is positioned between the loading/unloading stage and the cabinet stage, and wherein the storage queue is configured to store the gas container introduced from the loading/unloading stage and the gas container discharged from the gas supply cabinet.

10. The gas supply system of claim 8, wherein the transfer robot is provided in the buffer stage and the cabinet stage and is configured to transport the gas container.

11. The gas supply system of claim 10, wherein the transfer robot comprises a bottom support structure configured to support a bottom of the gas container, and a second gripper configured to hold a side of the gas container.

12. The gas supply system of claim 11, wherein the base plate includes an opening into which the bottom support structure of the transfer robot is inserted, and
- wherein the base plate includes the sensing plate configured to be detected by a distance sensor of the transfer robot to provide position information of the base plate.

13. The gas supply system of claim 11, wherein the first gripper of the storage queue is configured to perform a full-grip posture in which the first gripper is in close contact with the gas container and supports the gas container, an un-grip posture in which the first gripper is spaced apart from the gas container so as to allow the gas container to be detached from the first gripper, and a semi-grip posture in which the first gripper is spaced apart at a distance capable of preventing the gas container from falling, and wherein the second gripper of the transfer robot is configured to perform a full-grip posture in which the second gripper is in close contact with the gas container and supports the gas container, an un-grip posture in which the second gripper is spaced apart from the gas container so as to allow the gas container to be detached from the second gripper, and a semi-grip posture in which the second gripper is spaced apart at a distance capable of preventing the gas container from falling.

14. The gas supply system of claim 13, further comprising a controller configured to control the transfer robot and the storage queue, wherein the controller is configured to sequentially switch the first gripper of the storage queue to the semi-grip posture, switch the second gripper of the transfer robot from the full-grip posture to the semi-grip posture, switch the first gripper of the storage queue from the semi-grip posture to the full-grip posture to hold the gas container, and switch the second gripper of the transfer robot to the un-grip posture while the gas container is being loaded onto the base plate of the storage queue from the transfer robot.

15. The gas supply system of claim 8, further comprising a pneumatic actuator configured to move the barcode reader, and proximity sensors configured to detect a movement of the barcode reader, wherein the barcode reader is configured to read the identification tag of the gas container while moving within the frame.

16. The gas supply system of claim 8, wherein the first gripper includes a load detection sensor configured to detect whether the gas container is loaded.

17. The gas supply system of claim 8, wherein the position information of the QR code includes a horizontal direction and a vertical direction on a mounting position in which the gas container is mounted.

18. A gas supply system, comprising:

a loading/unloading stage into which a gas container is provided; and a gas supply stage comprising a storage queue configured to temporarily store the gas container, a gas supply cabinet configured to supply gas from the gas container to a gas-consuming facility; and a transfer robot configured to transport the gas container, wherein the storage queue comprises:

a frame providing an internal space for accommodating the gas container;

a sliding door configured to open and close the internal space of the frame;

a base plate located within the internal space of the frame, configured to support the gas container, and the base plate including a sensing plate and a QR code, wherein the QR code includes position information on a mounting position in which the gas container is mounted;

a first gripper configured to grip the gas container mounted on the base plate;

a barcode reader configured to sense an identification tag of the gas container;

a pneumatic actuator configured to move the barcode reader; and proximity sensors configured to detect a movement of the barcode reader;

wherein the transfer robot is configured to transport the gas container introduced from the loading/unloading stage to the storage queue or the gas supply cabinet and to transport an emptied gas container from the gas supply cabinet to the storage queue or the loading/unloading stage; and wherein the transfer robot includes a QR reader configured to read the QR code of the base plate and a distance sensor configured to detect the sensing plate of the base plate.

19. The gas supply system of claim 18, wherein the transfer robot comprises a bottom support structure configured to support a bottom of the gas container and a second gripper configured to grip a side of the gas container, and wherein the base plate further comprises an opening into which the bottom support structure of the transfer robot can be inserted.

* * * * *